United States Patent
Westerman

(10) Patent No.: US 10,409,421 B2
(45) Date of Patent: Sep. 10, 2019

(54) DEVICES AND METHODS FOR PROCESSING TOUCH INPUTS BASED ON ADJUSTED INPUT PARAMETERS

(71) Applicant: Apple Inc., Cupertino, CA (US)

(72) Inventor: Wayne C. Westerman, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 15/616,826

(22) Filed: Jun. 7, 2017

(65) Prior Publication Data

US 2017/0357376 A1 Dec. 14, 2017

Related U.S. Application Data

(60) Provisional application No. 62/349,046, filed on Jun. 12, 2016.

(51) Int. Cl.
*G06F 3/041* (2006.01)
*G06F 3/0488* (2013.01)

(52) U.S. Cl.
CPC .......... *G06F 3/0418* (2013.01); *G06F 3/0414* (2013.01); *G06F 3/04883* (2013.01)

(58) Field of Classification Search
CPC .... G06F 3/017; G06F 3/04883; G06F 3/0487; G06F 3/0488; G06F 3/04886; G06F 2203/04808
See application file for complete search history.

(56) References Cited

U.S. PATENT DOCUMENTS

| | | | |
|---|---|---|---|
| 7,683,889 B2 * | 3/2010 | Rimas Ribikauskas | G06F 3/0414 178/18.01 |
| 2009/0160781 A1 * | 6/2009 | Henderson | G06F 3/0338 345/173 |
| 2011/0043457 A1 * | 2/2011 | Oliver | G06F 3/0414 345/173 |
| 2011/0050586 A1 * | 3/2011 | Miller | G06F 3/0412 345/173 |

(Continued)

OTHER PUBLICATIONS

International Search Report and Written Opinion, dated Aug. 8, 2017, received in International Patent Application No. PCT/US2017037002, which corresponds with U.S. Appl. No. 15/616,826, 12 pages.

(Continued)

*Primary Examiner* — William Lu
(74) *Attorney, Agent, or Firm* — Morgan, Lewis & Bockius LLP

(57) ABSTRACT

An electronic device with a display, a touch-sensitive surface, and one or more sensors to detect intensity of contacts with the touch-sensitive surface displays a first user interface of a first software application, detects an input on the touch-sensitive surface while displaying the first user interface, and, in response to detecting the input while displaying the first user interface, performs a first operation in accordance with a determination that the input satisfies intensity input criteria including that the input satisfies an intensity threshold during a first predefined time period, and performs a second operation in accordance with a determination that the input satisfies long press criteria including that the input remains below the intensity threshold during the first predefined time period.

42 Claims, 44 Drawing Sheets

(56) References Cited

U.S. PATENT DOCUMENTS

| | | | | |
|---|---|---|---|---|
| 2011/0050588 A1* | 3/2011 | Li | ................ | G06F 3/0414 |
| | | | | 345/173 |
| 2011/0221690 A1* | 9/2011 | Miyoshi | ................ | G06F 3/0338 |
| | | | | 345/173 |
| 2012/0086666 A1* | 4/2012 | Badaye | ................ | G06F 3/044 |
| | | | | 345/174 |
| 2012/0086667 A1* | 4/2012 | Coni | ................ | G06F 3/0416 |
| | | | | 345/174 |
| 2012/0105367 A1* | 5/2012 | Son | ................ | G06F 3/0414 |
| | | | | 345/174 |
| 2012/0188202 A1* | 7/2012 | Tsujino | ................ | G06F 3/0412 |
| | | | | 345/174 |
| 2013/0268847 A1* | 10/2013 | Kim | ................ | G06F 3/0488 |
| | | | | 715/251 |
| 2013/0332892 A1* | 12/2013 | Matsuki | ................ | G06F 3/0488 |
| | | | | 715/863 |
| 2014/0267134 A1* | 9/2014 | Bulea | ................ | G06F 3/044 |
| | | | | 345/174 |
| 2015/0058723 A1* | 2/2015 | Cieplinski | ................ | G06F 3/04855 |
| | | | | 715/702 |
| 2015/0116205 A1* | 4/2015 | Westerman | ................ | G06F 3/016 |
| | | | | 345/156 |
| 2015/0227280 A1 | 8/2015 | Westerman et al. | | |
| 2016/0034088 A1* | 2/2016 | Richards | ................ | G01L 1/205 |
| | | | | 345/173 |

OTHER PUBLICATIONS

International Preliminary Report on Patentability, dated Dec. 18, 2018, received in International Patent Application No. PCT/US2017/037002, which corresponds with U.S. Appl. No. 15/616,826, 8 pages.

\* cited by examiner

810 In accordance with a determination that the input satisfies intensity input criteria including that an adjusted intensity of the input satisfies an intensity threshold, perform a first operation. The adjusted intensity of the input corresponds to the detected intensity of the input reduced by a first adjustment factor that is based on the detected lateral displacement of the input.

(A)

816 The first adjustment factor does not exceed a first value

818 A magnitude of the first adjustment factor is proportional to a magnitude of the detected lateral displacement of the input 820 The first adjustment factor includes a decay factor that decreases over time at a rate that is independent of a movement of the input

Figure 8B

812 In accordance with a determination that the input satisfies lateral displacement input criteria including that an adjusted lateral displacement of the input satisfies a lateral displacement threshold, perform a second operation that is distinct from the first operation. The adjusted lateral displacement of the input corresponds to the detected lateral displacement of the input reduced by a second adjustment factor that is based on the detected intensity of the input.

(B)

822 The determination that the input satisfies the intensity input criteria is made at a first gesture recognizer and the determination that the input satisfies the input satisfies the lateral displacement input criteria is made at a second gesture recognizer that is distinct from the first gesture recognizer 824 The adjusted intensity of the input is provided to the first gesture recognizer for the determination that the input satisfies the intensity input criteria and the adjusted lateral displacement of the input is provided to the second gesture recognizer for the determination that the input satisfies the lateral displacement input criteria 826 The second adjustment factor does not exceed a second value that is distinct from the first value 828 A magnitude of the second adjustment factor is proportional to a magnitude of the detected intensity of the input 830 The second adjustment factor includes a decay factor that decreases over time at a rate that is independent of an intensity of the input

Figure 8C

814 In accordance with a determination that the input satisfies lateral displacement input criteria including that the detected lateral displacement of the input satisfies a lateral displacement threshold, perform a third operation that is distinct from the first operation (C)

832 The determination that the input satisfies the intensity input criteria is made at a first gesture recognizer and the determination that the input satisfies the input satisfies the lateral displacement input criteria is made at a second gesture recognizer that is distinct from the first gesture recognizer 834 The adjusted intensity of the input is provided to the first gesture recognizer for the determination that the input satisfies the intensity input criteria and the detected lateral displacement of the input is provided to the second gesture recognizer for the determination that the input satisfies the lateral displacement input criteria

Figure 8D

DEVICES AND METHODS FOR PROCESSING TOUCH INPUTS BASED ON ADJUSTED INPUT PARAMETERS

RELATED APPLICATION

This application claims the benefit of, and priority to, U.S. Provisional Patent Application Ser. No. 62/349,046, filed Jun. 12, 2016, which is incorporated by reference herein in its entirety.

TECHNICAL FIELD

This relates generally to electronic devices with touch-sensitive surfaces, including but not limited to electronic devices with sensors to detect intensity of contacts on touch-sensitive surfaces.

BACKGROUND

The use of touch-sensitive surfaces as input devices for computers and other electronic computing devices has increased significantly in recent years. Exemplary touch-sensitive surfaces include touchpads and touch-screen displays. Such surfaces are widely used to manipulate user interface objects on a display.

Exemplary user interface objects include digital images, video, text, icons, control elements such as buttons and other graphics. Exemplary manipulations include adjusting the position and/or size of one or more user interface objects or activating buttons or opening files/applications represented by user interface objects, as well as associating metadata with one or more user interface objects or otherwise manipulating user interfaces. Certain manipulations of user interface objects are associated with certain types of touch inputs, which are referred to as gestures.

Conventional methods and interfaces for processing touch inputs are inefficient in disambiguating certain touch inputs to determine intended gestures and intended manipulations of user interface objects. Thus, it would be desirable to have a framework for improved processing and disambiguation of touch inputs.

SUMMARY

Accordingly, the present disclosure provides electronic devices with faster, more efficient methods for processing touch inputs. Such methods and interfaces optionally complement or replace conventional methods for processing touch inputs. Such methods and interfaces provide a more efficient human-machine interface by more accurately disambiguating and processing touch inputs. Further, such methods reduce the processing power consumed to process touch inputs, conserve power, reduce unnecessary or extraneous or repetitive inputs, and potentially reduce memory usage. For battery-operated devices, such methods and interfaces conserve battery power and increase the time between battery charges.

The above deficiencies and other problems associated with processing touch inputs for electronic devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device is a personal electronic device (e.g., a wearable electronic device, such as a watch). In some embodiments, the device has a touchpad. In some embodiments, the device has a touch-sensitive display (also known as a "touch screen" or "touch-screen display"). In some embodiments, the device has a graphical user interface (GUI), one or more processors, memory and one or more modules, programs or sets of instructions stored in the memory for performing multiple functions. In some embodiments, the user interacts with the GUI primarily through stylus and/or finger contacts and gestures on the touch-sensitive surface. In some embodiments, the functions optionally include image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a non-transitory computer readable storage medium or other computer program product configured for execution by one or more processors. Alternatively, or in addition, executable instructions for performing these functions are, optionally, included in a transitory computer-readable storage medium or other computer program product configured for execution by one or more processors.

In accordance with some embodiments, a method is performed at an electronic device with a display, a touch-sensitive surface, and one or more sensors to detect intensity of contacts with the touch-sensitive surface. The method includes: displaying a first user interface; while displaying the first user interface, detecting an input, on the touch-sensitive surface, with a detected intensity and detected lateral displacement; and, in response to detecting the input, in accordance with a determination that the input satisfies intensity input criteria including that an adjusted intensity of the input satisfies an intensity threshold, performing a first operation. The adjusted intensity of the input corresponds to the detected intensity of the input reduced by a first adjustment factor that is based on the detected lateral displacement of the input.

In accordance with some embodiments, a method is performed at an electronic device with a display, a touch-sensitive surface, and one or more sensors to detect intensity of contacts with the touch-sensitive surface. The method includes: displaying a first user interface; while displaying the first user interface, detecting an input, on the touch-sensitive surface, with a detected intensity and detected lateral displacement; and, in response to detecting the input, in accordance with a determination that the input satisfies lateral displacement input criteria including that an adjusted lateral displacement of the input satisfies a lateral displacement threshold, performing a fourth operation. The adjusted lateral displacement of the input corresponds to the detected lateral displacement of the input reduced by an adjustment factor that is based on the detected intensity of the input.

In accordance with some embodiments, an electronic device includes a display, a touch-sensitive surface, one or more sensors to detect intensity of contacts with the touch-sensitive surface, one or more processors, memory, and one or more programs. The one or more programs are stored in the memory and configured to be executed by the one or more processors and the one or more programs include instructions for performing or causing performance of the operations of any of the methods described herein. In some embodiments, the electronic device includes one or more sensors to detect signals from a stylus associated with the electronic device.

In accordance with some embodiments, a computer readable storage medium (e.g., a non-transitory computer readable storage medium, or alternatively, a transitory computer readable storage medium) has stored therein instructions, which, when executed by an electronic device with a display, a touch-sensitive surface, and one or more sensors to detect intensity of contacts with the touch-sensitive surface, cause the device to perform or cause performance of the operations of any of the methods described herein.

In accordance with some embodiments, a graphical user interface on an electronic device with a display, a touch-sensitive surface, one or more sensors to detect intensity of contacts with the touch-sensitive surface, a memory, and one or more processors to execute one or more programs stored in the memory includes one or more of the elements displayed in any of the methods described above, which are updated in response to inputs, as described in any of the methods described herein.

In accordance with some embodiments, an electronic device includes: a display, a touch-sensitive surface, and one or more sensors to detect intensity of contacts with the touch-sensitive surface; and means for performing or causing performance of the operations of any of the methods described herein.

In accordance with some embodiments, an information processing apparatus, for use in an electronic device with a display and a touch-sensitive surface, and one or more sensors to detect intensity of contacts with the touch-sensitive surface, includes means for performing or causing performance of the operations of any of the methods described herein.

In accordance with some embodiments, an electronic device includes a display unit configured to display one or more user interfaces, a touch-sensitive surface unit configured to receive contacts, one or more sensor units configured to detect intensity of contacts with the touch-sensitive surface unit, and a processing unit coupled with the display unit, the touch-sensitive surface unit, and the one or more sensor units. The processing unit is configured to: enable display of a first user interface; while the first user interface is displayed; detect an input, on the touch-sensitive surface unit, with a detected intensity and detected lateral displacement; and, in response to detecting the input, in accordance with a determination that the input satisfies intensity input criteria including that an adjusted intensity of the input satisfies an intensity threshold, perform a first operation. The adjusted intensity of the input corresponds to the detected intensity of the input reduced by a first adjustment factor that is based on the detected lateral displacement of the input.

In accordance with some embodiments, an electronic device includes a display unit configured to display one or more user interfaces, a touch-sensitive surface unit configured to receive contacts, one or more sensor units configured to detect intensity of contacts with the touch-sensitive surface unit, and a processing unit coupled with the display unit, the touch-sensitive surface unit, and the one or more sensor units. The processing unit is configured to: enable display of a first user interface; while the first user interface is displayed, detect an input, on the touch-sensitive surface unit, with a detected intensity and detected lateral displacement; and, in response to detecting the input, in accordance with a determination that the input satisfies lateral displacement input criteria including that an adjusted lateral displacement of the input satisfies a lateral displacement threshold, perform a fourth operation. The adjusted lateral displacement of the input corresponds to the detected lateral displacement of the input reduced by an adjustment factor that is based on the detected intensity of the input.

Thus, electronic devices with displays, touch-sensitive surfaces and one or more sensors to detect intensity of contacts with the touch-sensitive surface are provided with faster, more efficient methods and interfaces for processing of touch inputs, thereby increasing the effectiveness and efficiency of such devices, and user satisfaction with such devices. Furthermore, such methods and interfaces reduce processing power, reduce memory usage, reduce battery usage, and/or reduce unnecessary or extraneous or repetitive inputs. Furthermore, such methods and interfaces may complement or replace conventional methods for processing of touch inputs.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 8A-8D are flow diagrams illustrating a method of disambiguating a light press input and a pan gesture input in accordance with some embodiments.

DESCRIPTION OF EMBODIMENTS

Many electronic devices have graphical user interfaces that allow certain manipulations of displayed user interface objects in response to certain touch input gestures. However, conventional methods and interfaces for processing touch inputs are inefficient in disambiguating certain touch inputs to determine intended gestures and intended manipulations of user interface objects. The disclosed embodiments address these limitations and disadvantages by enabling improved processing and disambiguation of touch inputs. For example, the disclosed methods and devices allow fast response to touch inputs, which improves user experience with such electronic devices. For battery-operated devices, the disclosed methods and devices conserve battery power and increase the time between battery charges.

Figure 2:
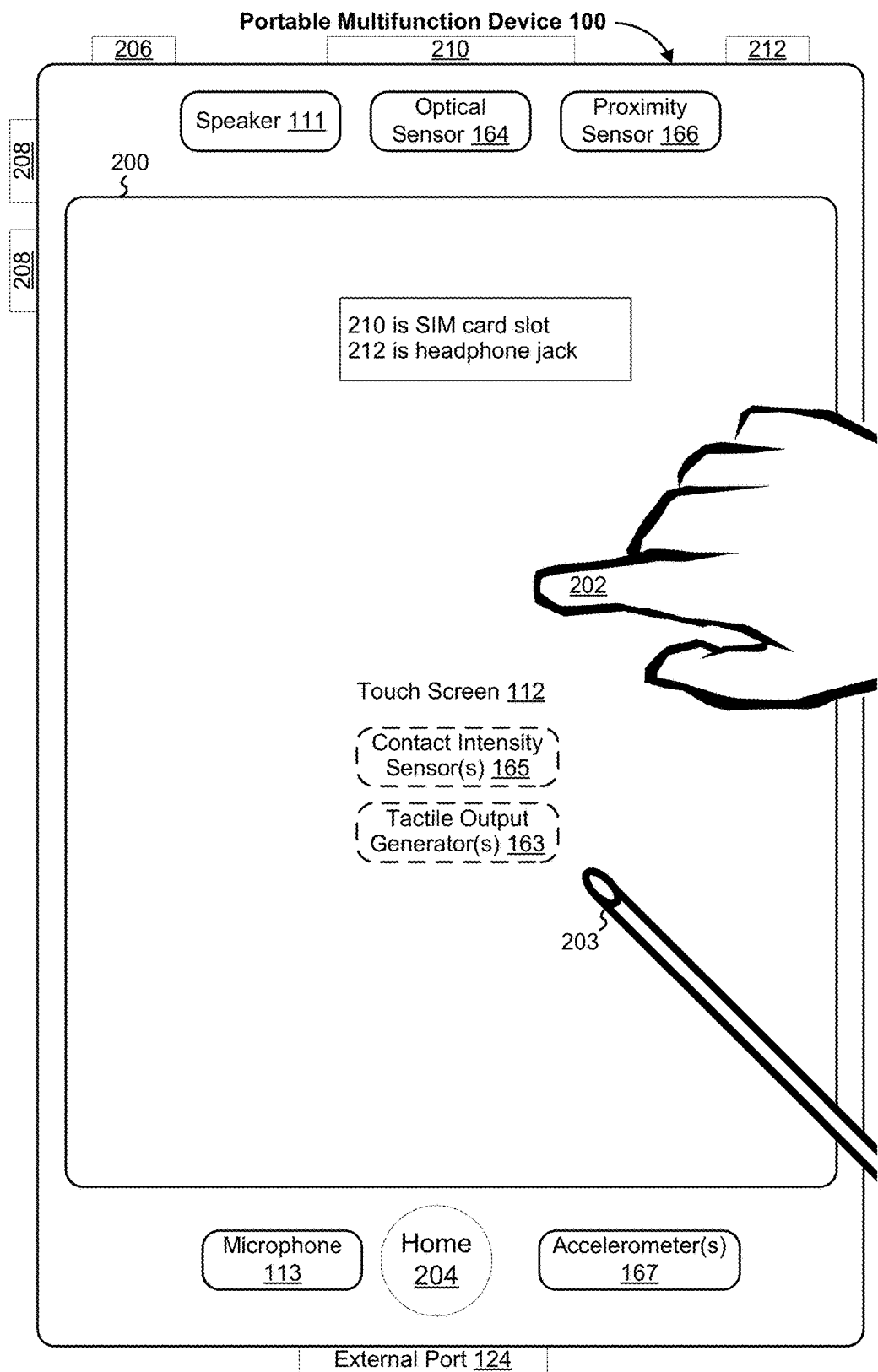
FIG. 2 illustrates a portable multifunction device having a touch screen in accordance with some embodiments.
Figure 3:
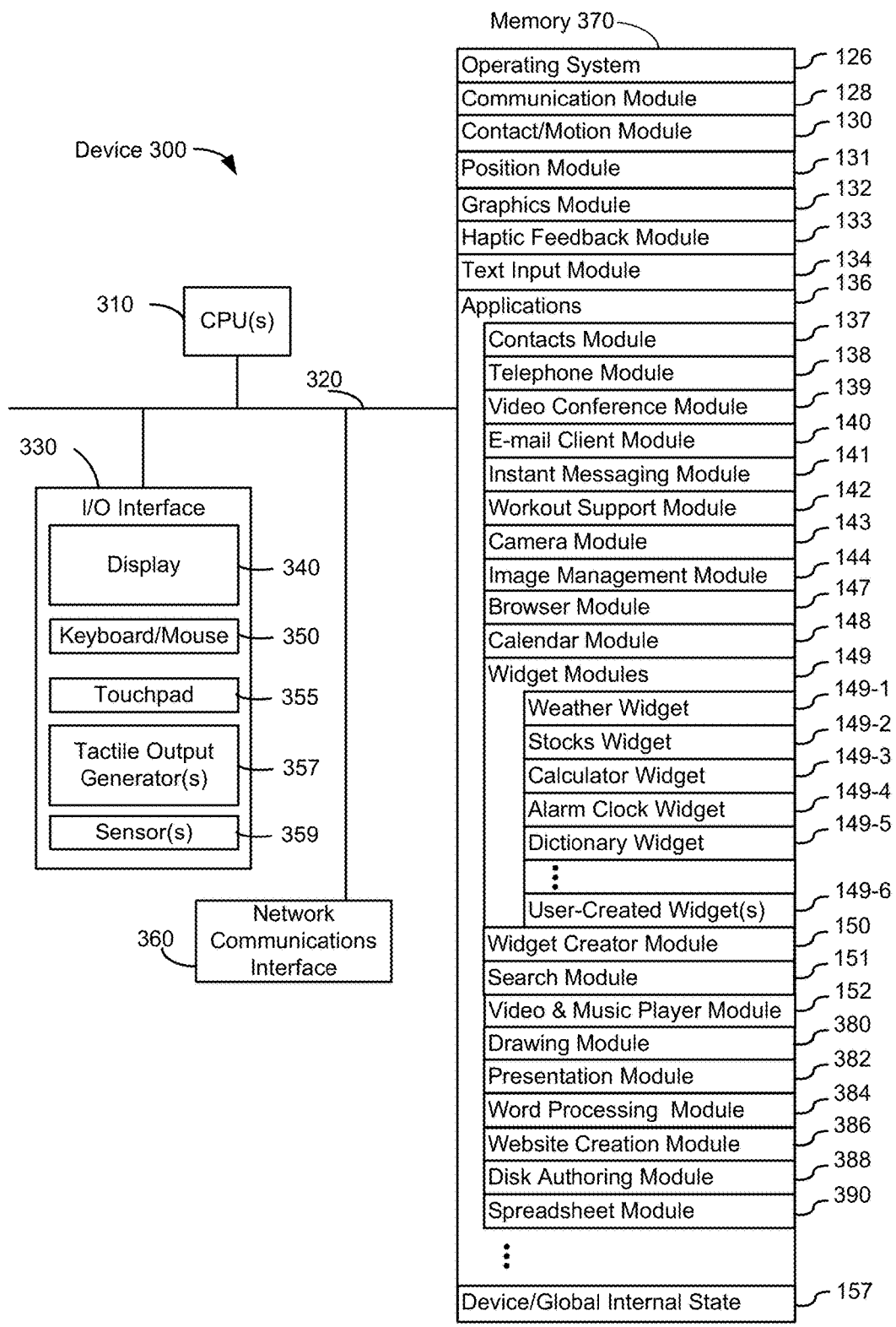
FIG. 3 is a block diagram of an exemplary multifunction device with a display and a touch-sensitive surface in accordance with some embodiments.
Figure 4:
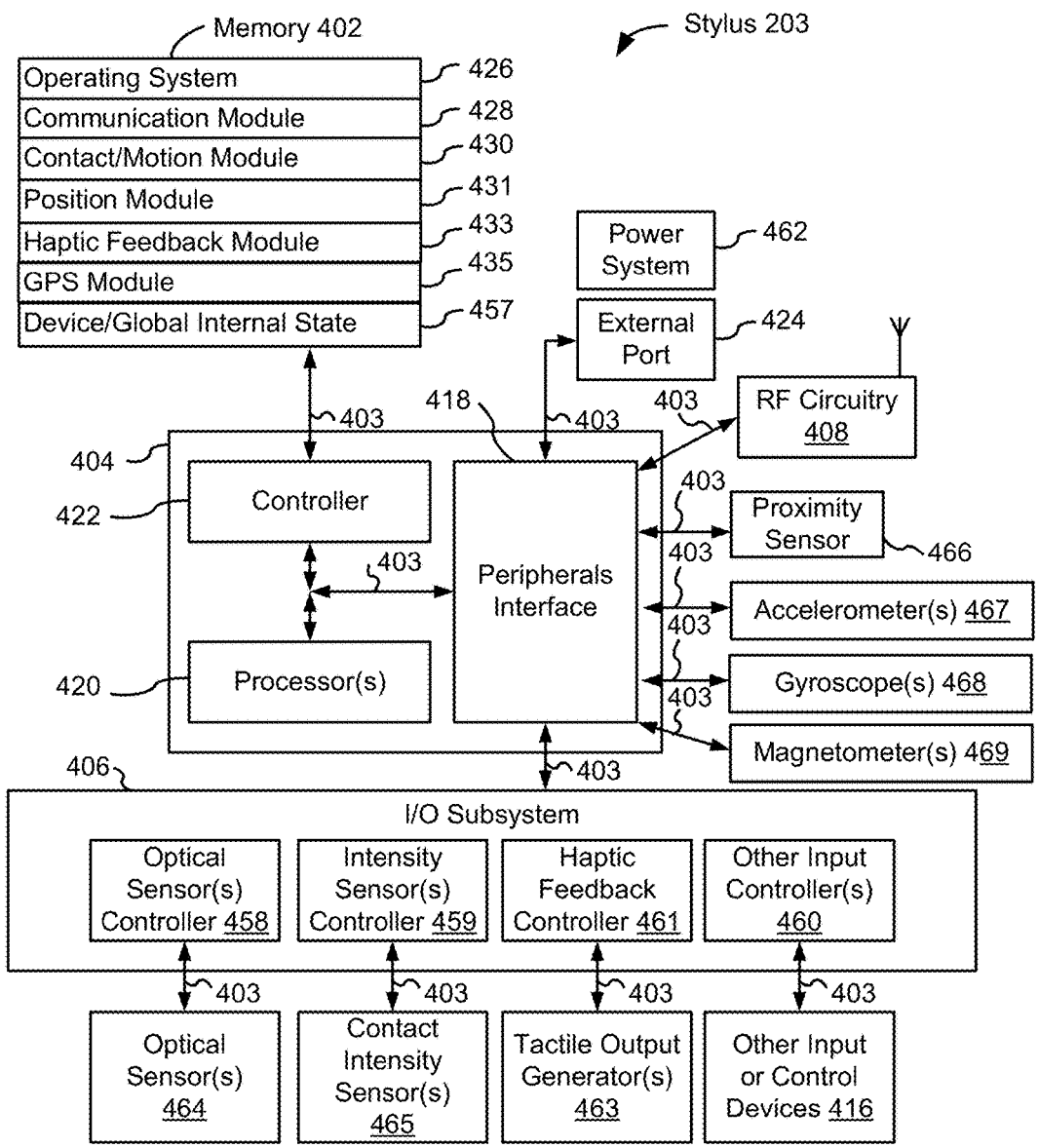
FIG. 4 is a block diagram of an exemplary electronic stylus in accordance with some embodiments.
Figure 5A:
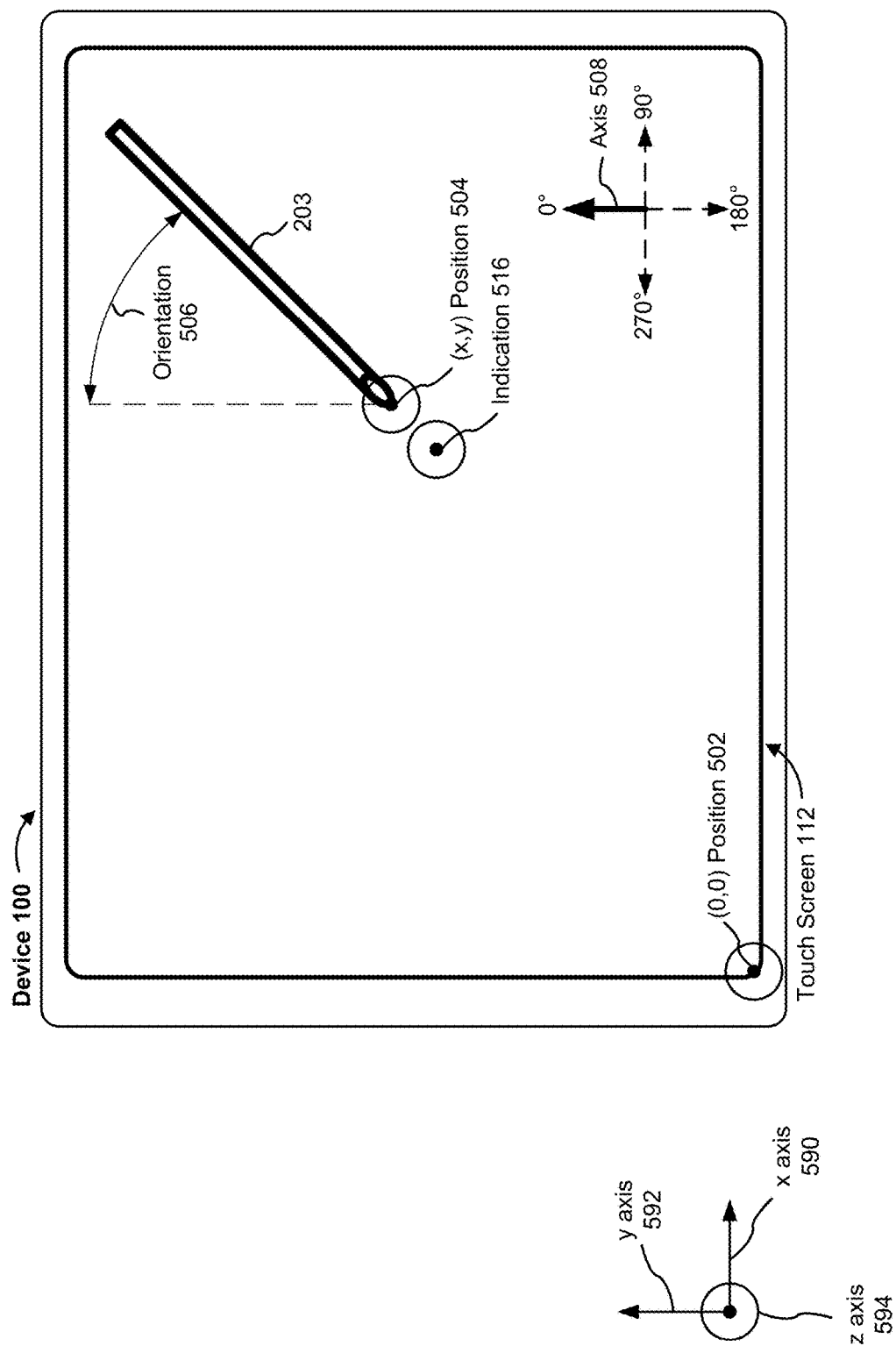
FIGS. 5A-5B illustrate a positional state of a stylus relative to a touch-sensitive surface in accordance with some embodiments.
Figure 5B:
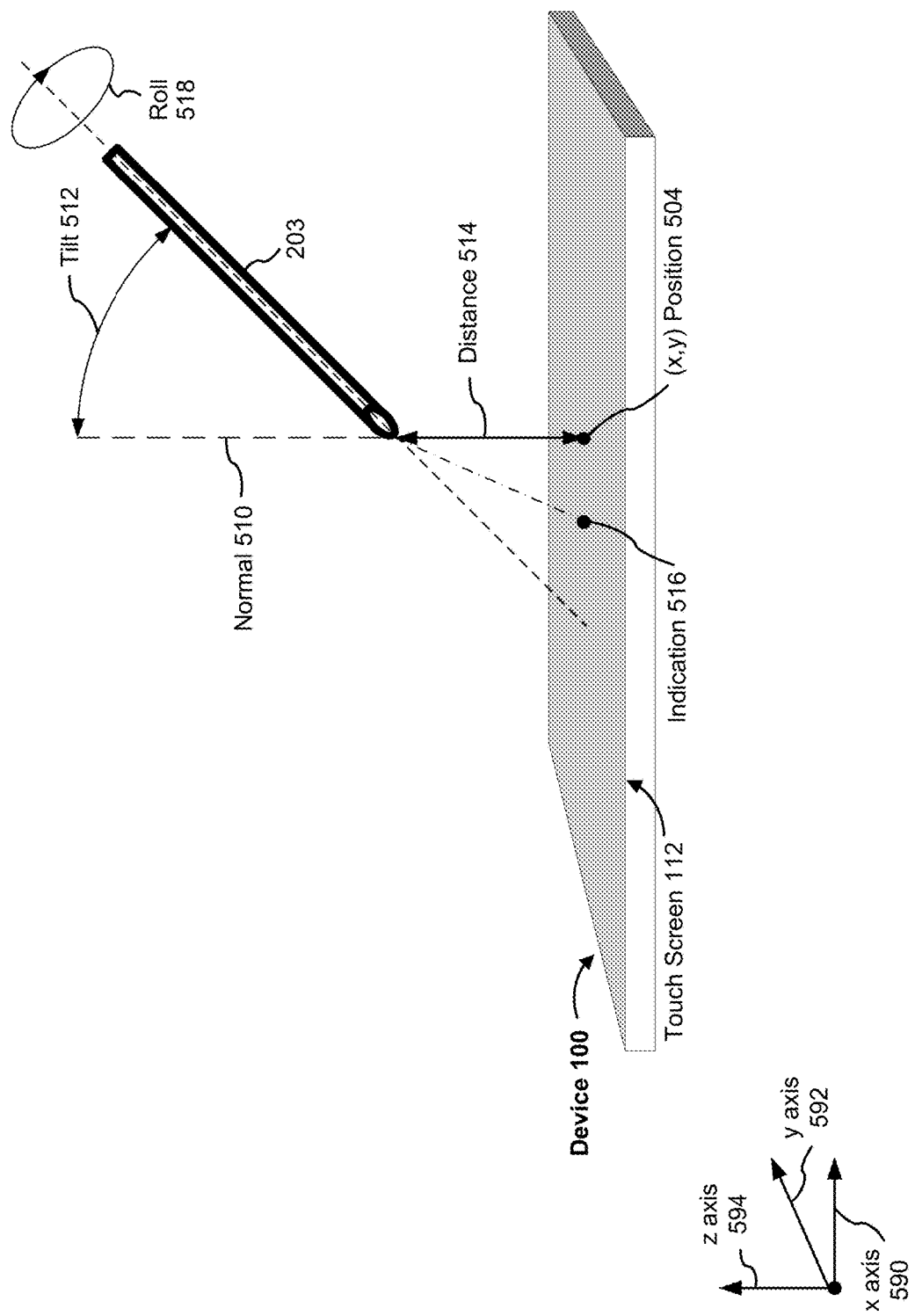

Below, FIGS. 1A-1B, 2, and 3 provide a description of exemplary devices. FIG. 4 provides a description of an exemplary electronic stylus. FIGS. 5A-5B illustrate a positional state of a stylus relative to a touch-sensitive surface. FIGS. 6A-6B and 7A-7CC illustrate exemplary user interfaces for processing touch inputs with instructions in a web page. FIGS. 8A-8D are flow diagrams illustrating a method of disambiguating a light press input and a pan gesture input. The user interfaces in FIGS. 7A-7CC are used to illustrate the processes in FIGS. 8A-8D.

Exemplary Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch-screen displays and/or touchpads), are, optionally, used. It should also be understood that, in some embodiments, the device is not a portable communications device, but is a desktop computer with a touch-sensitive surface (e.g., a touch-screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a note taking application, a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
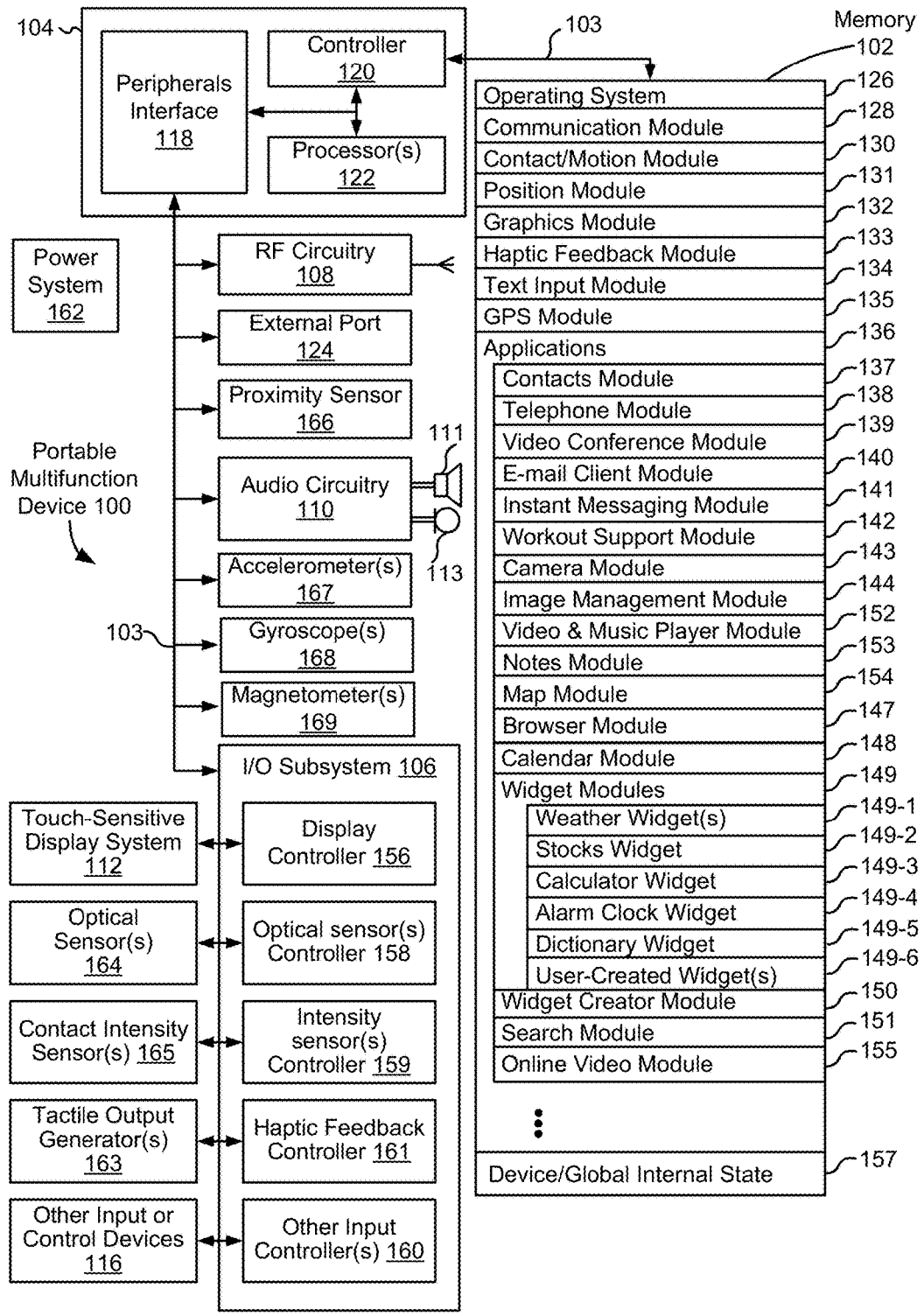
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display system 112 is sometimes called a "touch screen" for convenience, and is sometimes simply called a touch-sensitive display. Device 100 includes memory 102 (which optionally includes one or more non-transitory computer readable storage mediums), memory controller 122, one or more processing units (CPUs) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensity of contacts on device 100 (e.g., a touch-sensitive surface such as touch-sensitive display system 112 of device 100). Device 100 optionally includes one or more tactile output generators 163 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, firmware, or a combination thereof, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU(s) 120 and the peripherals interface 118, is, optionally, controlled by memory controller 122.

Peripherals interface 118 can be used to couple input and output peripherals of the device to CPU(s) 120 and memory 102. The one or more processors 120 run or execute various software programs and/or sets of instructions stored in memory 102 to perform various functions for device 100 and to process data.

In some embodiments, peripherals interface 118, CPU(s) 120, and memory controller 122 are, optionally, implemented on a single chip, such as chip 104. In some embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch-sensitive display system 112 and other input or control devices 116, with peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input or control devices 116. The other input or control devices 116 optionally include physical buttons (e.g., push buttons, rocker buttons, etc.), dials, slider switches, joysticks, click wheels, and so forth. In some alternate embodiments, input controller(s) 160 are, optionally, coupled with any (or none) of the following: a keyboard, infrared port, USB port, stylus, and/or a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display system 112 provides an input interface and an output interface between the device and a user. Display controller 156 receives and/or sends electrical signals from/to touch-sensitive display system 112. Touch-sensitive display system 112 displays visual output to the user. The visual output optionally includes graphics, text, icons, video, and any combination thereof (collectively termed "graphics"). In some embodiments, some or all of the visual output corresponds to user-interface objects.

Touch-sensitive display system 112 has a touch-sensitive surface, sensor or set of sensors that accepts input from the user based on haptic/tactile contact. Touch-sensitive display system 112 and display controller 156 (along with any associated modules and/or sets of instructions in memory 102) detect contact (and any movement or breaking of the contact) on touch-sensitive display system 112 and converts the detected contact into interaction with user-interface objects (e.g., one or more soft keys, icons, web pages or images) that are displayed on touch-sensitive display system 112. In some embodiments, a point of contact between touch-sensitive display system 112 and the user corresponds to a finger of the user or a stylus.

Touch-sensitive display system 112 optionally uses LCD (liquid crystal display) technology, LPD (light emitting polymer display) technology, or LED (light emitting diode) technology, although other display technologies are used in other embodiments. Touch-sensitive display system 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch-sensitive display system 112. In some embodiments, projected mutual capacitance sensing technology is used, such as that found in the iPhone®, iPod Touch®, and iPad® from Apple Inc. of Cupertino, Calif.

Touch-sensitive display system 112 optionally has a video resolution in excess of 100 dpi. In some embodiments, the touch screen video resolution is in excess of 400 dpi (e.g., 500 dpi, 800 dpi, or greater). The user optionally makes contact with touch-sensitive display system 112 using any suitable object or appendage, such as a stylus, a finger, and so forth. In some embodiments, the user interface is designed to work with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch-sensitive display system 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled with optical sensor controller 158 in I/O subsystem 106. Optical sensor(s) 164 optionally include charge-coupled device (CCD) or complementary metal-oxide semiconductor (CMOS) phototransistors. Optical sensor(s) 164 receive light from the environment, projected through one or more lens, and converts the light to data representing an image. In conjunction with imaging module 143 (also called a camera module), optical sensor(s) 164 optionally capture still images and/or video. In some embodiments, an optical sensor is located on the back of device 100, opposite touch-sensitive display system 112 on the front of the device, so that the touch screen is enabled for use as a viewfinder for still and/or video image acquisition. In some embodiments, another optical sensor is located on the front of the device so that the user's image is obtained (e.g., for selfies, for videoconferencing while the user views the other video conference participants on the touch screen, etc.).

Device 100 optionally also includes one or more contact intensity sensors 165. FIG. 1A shows a contact intensity sensor coupled with intensity sensor controller 159 in I/O subsystem 106. Contact intensity sensor(s) 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor(s) 165 receive contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch-screen display system 112 which is located on the front of device 100.

Device 100 optionally also includes one or more proximity sensors 166. FIG. 1A shows proximity sensor 166 coupled with peripherals interface 118. Alternately, proximity sensor 166 is coupled with input controller 160 in I/O subsystem 106. In some embodiments, the proximity sensor turns off and disables touch-sensitive display system 112 when the multifunction device is placed near the user's ear (e.g., when the user is making a phone call).

Device 100 optionally also includes one or more tactile output generators 163. FIG. 1A shows a tactile output generator coupled with haptic feedback controller 161 in I/O subsystem 106. Tactile output generator(s) 163 optionally include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). In some embodiments, tactile output generator(s) 163 receive tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch-sensitive display system 112, which is located on the front of device 100.

Device 100 optionally also includes one or more accelerometers 167, gyroscopes 168, and/or magnetometers 169 (e.g., as part of an inertial measurement unit (IMU)) for obtaining information concerning the position (e.g., attitude) of the device. FIG. 1A shows sensors 167, 168, and 169 coupled with peripherals interface 118. Alternately, sensors 167, 168, and 169 are, optionally, coupled with an input controller 160 in I/O subsystem 106. In some embodiments, information is displayed on the touch-screen display in a portrait view or a landscape view based on an analysis of data received from the one or more accelerometers. Device 100 optionally includes a GPS (or GLONASS or other global navigation system) receiver (not shown) for obtaining information concerning the location of device 100.

In some embodiments, the software components stored in memory 102 include operating system 126, communication module (or set of instructions) 128, contact/motion module (or set of instructions) 130, position module (or set of instructions) 131, graphics module (or set of instructions) 132, haptic feedback module (or set of instructions) 133, text input module (or set of instructions) 134, Global Positioning System (GPS) module (or set of instructions) 135, and applications (or sets of instructions) 136. Furthermore, in some embodiments, memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch-sensitive display system 112; sensor state, including information obtained from the device's various sensors and other input or control devices 116; and location and/or positional information concerning the device's location and/or attitude.

Operating system 126 (e.g., iOS, Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used in some iPhone®, iPod Touch®, and iPad® devices from Apple Inc. of Cupertino, Calif. In some embodiments, the external port is a Lightning connector that is the same as, or similar to and/or compatible with the Lightning connector used in some iPhone®, iPod Touch®, and iPad® devices from Apple Inc. of Cupertino, Calif.

Contact/motion module 130 optionally detects contact with touch-sensitive display system 112 (in conjunction with display controller 156) and other touch-sensitive devices (e.g., a touchpad or physical click wheel). Contact/motion module 130 includes software components for performing various operations related to detection of contact (e.g., by a finger or by a stylus), such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts or stylus contacts) or to multiple simultaneous contacts (e.g., "multitouch"/multiple finger contacts and/or stylus contacts). In some embodiments, contact/motion module 130 and display controller 156 detect contact on a touchpad.

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event. Similarly, tap, swipe, drag, and other gestures are optionally detected for a stylus by detecting a particular contact pattern for the stylus.

Position module 131, in conjunction with accelerometers 167, gyroscopes 168, and/or magnetometers 169, optionally detects positional information concerning the device, such as the device's attitude (roll, pitch, and/or yaw) in a particular frame of reference. Position module 131 includes software components for performing various operations related to detecting the position of the device and detecting changes to the position of the device. In some embodiments, position module 131 uses information received from a stylus being used with the device to detect positional information concerning the stylus, such as detecting the positional state of the stylus relative to the device and detecting changes to the positional state of the stylus.

Graphics module 132 includes various known software components for rendering and displaying graphics on touch-sensitive display system 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions (e.g., instructions used by haptic feedback controller 161) to produce tactile outputs using tactile output generator(s) 163 at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:
- contacts module 137 (sometimes called an address book or contact list);
- telephone module 138;
- video conferencing module 139;
- e-mail client module 140;
- instant messaging (IM) module 141;
- workout support module 142;
- camera module 143 for still and/or video images;
- image management module 144;
- browser module 147;
- calendar module 148;
- widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which is, optionally, made up of a video player module and a music player module;
- notes module 153;
- map module 154; and/or
- online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch-sensitive display system 112, display controller 156, contact module 130, graphics module 132, and text input module 134, contacts module 137 includes executable instructions to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers and/or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch-sensitive display system 112, display controller 156, contact module 130, graphics module 132, and text input module 134, telephone module 138 includes executable instructions to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch-sensitive display system 112, display controller 156, optical sensor(s) 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch-sensitive display system 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch-sensitive display system 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, Apple Push Notification Service (APNs) or IMPS for Internet-based instant messages), to receive instant messages and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, APNs, or IMPS).

In conjunction with RF circuitry 108, touch-sensitive display system 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (in sports devices and smart watches); receive workout sensor data; calibrate sensors used to monitor a workout; select and play music for a workout; and display, store and transmit workout data.

In conjunction with touch-sensitive display system 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, and/or delete a still image or video from memory 102.

In conjunction with touch-sensitive display system 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch-sensitive display system 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch-sensitive display system 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch-sensitive display system 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch-sensitive display system 112, display system controller 156, contact module 130, graphics module 132, text input module 134, and browser module 147, the widget creator module 150 includes executable instructions to create widgets (e.g., turning a user-specified portion of a web page into a widget).

In conjunction with touch-sensitive display system 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch-sensitive display system 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch-sensitive display system 112, or on an external display connected wirelessly or via external port 124). In some embodiments, device 100 optionally includes the functionality of an MP3 player, such as an iPod (trademark of Apple Inc.).

In conjunction with touch-sensitive display system 112, display controller 156, contact module 130, graphics module 132, and text input module 134, notes module 153 includes executable instructions to create and manage notes, to do lists, and the like in accordance with user instructions.

In conjunction with RF circuitry 108, touch-sensitive display system 112, display system controller 156, contact module 130, graphics module 132, text input module 134, GPS module 135, and browser module 147, map module 154 includes executable instructions to receive, display, modify, and store maps and data associated with maps (e.g., driving directions; data on stores and other points of interest at or near a particular location; and other location-based data) in accordance with user instructions.

In conjunction with touch-sensitive display system 112, display system controller 156, contact module 130, graphics module 132, audio circuitry 110, speaker 111, RF circuitry 108, text input module 134, e-mail client module 140, and browser module 147, online video module 155 includes executable instructions that allow the user to access, browse, receive (e.g., by streaming and/or download), play back (e.g., on touch screen 112, or on an external display connected wirelessly or via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
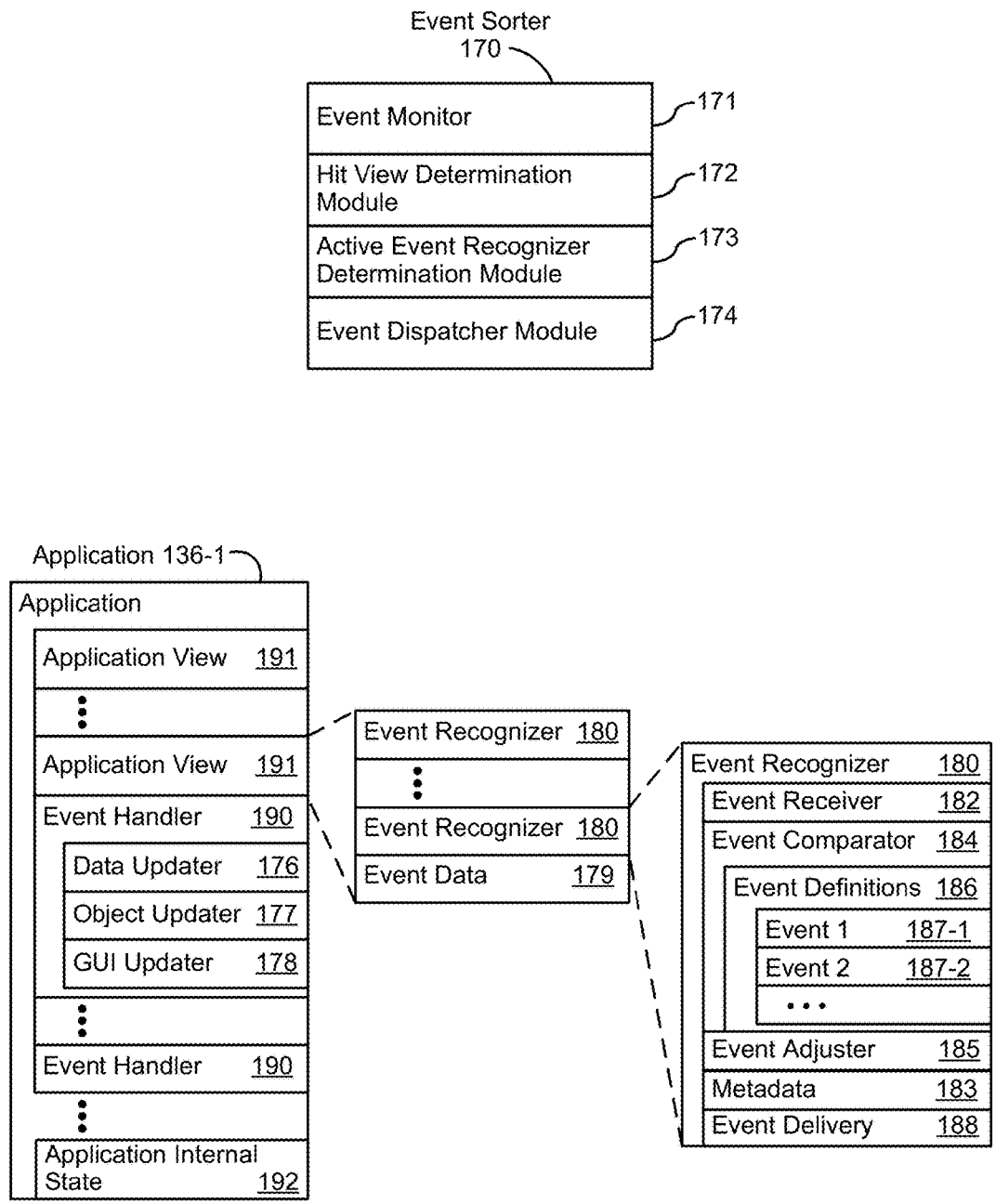
FIG. 1B is a block diagram illustrating exemplary components for event handling in accordance with some embodiments.

FIG. 1B is a block diagram illustrating exemplary components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 136, 137-155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display system 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display system 112, as part of a multi-touch gesture). Peripherals interface 118 transmits information it receives from I/O subsystem 106 or a sensor, such as proximity sensor 166, accelerometer(s) 167, gyroscope(s) 168, magnetometer(s) 169, and/or microphone 113 (through audio circuitry 110). Information that peripherals interface 118 receives from I/O subsystem 106 includes information from touch-sensitive display system 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch-sensitive display system 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

As used herein, a force event refers to a device-generated signal or device-generated data (e.g., a signal or a data object generated or updated by device 100) to indicate status or a change in status of a touch input, such as beginning (e.g., satisfying a minimum force intensity threshold), changing intensity (e.g., increasing or decreasing intensity of the touch input), or changing intensity status (e.g., hard press to exceed an intensity threshold or release the touch input so that the intensity falls below the intensity threshold) of the touch input. Although force events are associated with physical touches (e.g., touches with a finger and/or a stylus) on the touch-sensitive surface, the force events, as described herein, are distinct from the physical touches.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: event adjuster 185, metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display system 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display system 112, when a touch is detected on touch-sensitive display system 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes an event adjuster 185. Event adjuster 185, if included, is configured to adjust event information in the received event (e.g., increases or decreases event parameters, such as lateral displacement and/or intensity of an input). In some embodiments, event adjuster 185 is configured to adjust the event information before the comparison by event comparator 184. This allows event comparator 184 to compare the adjusted event information to predefined event or sub-event definitions and, based on the comparison, determine an event or sub-event (e.g., the adjusted event information corresponds to a predefined event or sub-event), or determine or updates the state of an event or sub-event (e.g., the adjusted event information is recognized as a beginning of a predefined gesture event, a change to the predefined gesture event, or an ending of the predefined gesture event). In some embodiments, event adjuster 185 is located outside an event recognizer 180 (e.g., within contact/motion module 130 described below with respect to FIG. 1C).

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 1C:
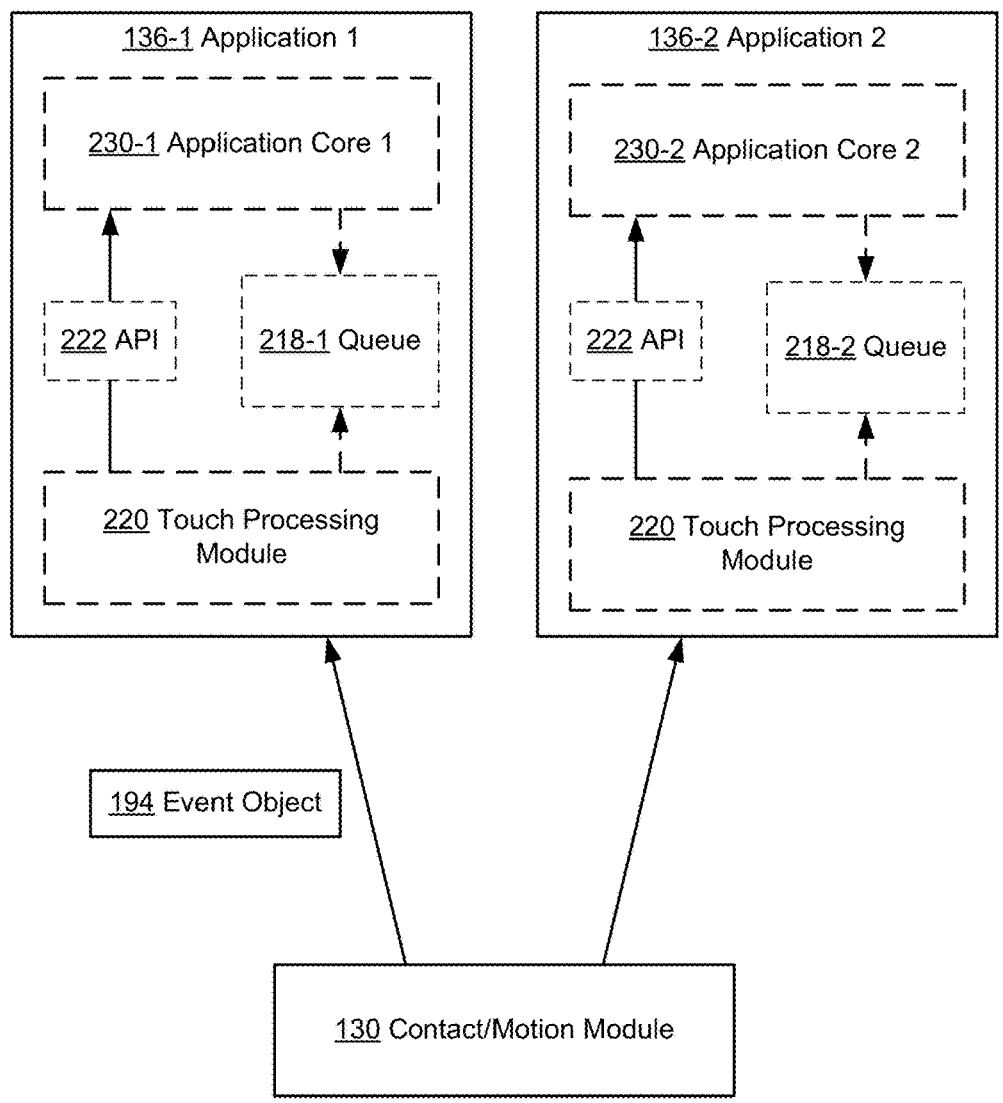
FIG. 1C is a block diagram illustrating transfer of an event object in accordance with some embodiments.

FIG. 1C is a block diagram illustrating transfer of event object 194 in accordance with some embodiments.

As described above with respect to FIG. 1A, contact/motion module 130 determines status and/or a change in the status of a touch input. In some embodiments, the device generates signals or data (e.g., in the form of a data object) to transfer the determined status and/or the determined change in the status of a touch input to one or more software components. In some embodiments, the data object is called an event object (e.g., event object 194). An event object includes data that represents the status of a corresponding touch input. In some embodiments, event object 194 is a mouse event object (because the touch input is equivalent to an input by a mouse). For example, in such embodiments, a touch input moving across a touch-sensitive surface corresponds to a mouse movement (e.g., a mouse moved event). In some other embodiments, event object 194 is a touch event object that is distinct from a mouse event object. In some embodiments, the touch event object includes data that represents touch-specific properties of a corresponding touch input (e.g., a number of concurrent touches, an orientation of a finger contact or a stylus, etc.). In some embodiments, event object 194 is a force event object that is distinct from a mouse event object (or a touch event object). In some embodiments, the force event object includes data that represents force event specific properties of a corresponding touch input (e.g., an intensity applied by the touch input, a stage or phase of the touch input, etc.). In some embodiments, the event object includes any combination of such properties (e.g., mouse event specific properties, touch event specific properties, and force event specific properties).

In some embodiments, contact/motion module 130 generates (or updates) an event object and sends an event object to one or more applications (e.g., application 136-1, such as e-mail client module 140 in FIG. 1A, and/or application 136-2, such as browser module 147). Alternatively, contact/information module 130 sends information regarding contacts (e.g., raw coordinates of contacts) to one or more applications (e.g., application 1 (136-1) and/or application 2 (136-2)), and an application that receives the information generates (or updates) one or more event objects. In some embodiments, an application includes touch-processing module 220 that generates (or updates) one or more event objects and sends the one or more event objects to a portion of the application other than touch-processing module 220.

In some embodiments, touch-processing module 220 is application-independent (e.g., the same touch-processing module, or an instance of the same touch-processing module, is included in each of multiple distinct applications, such as e-mail client application, browser application, etc.). As used herein, that touch-processing module 220 is application-independent means that touch-processing module 220 is not designed specifically for a particular software application. That touch-processing module 220 is application-independent does not necessarily mean that touch-processing module 220 is located separate from its associated application. Although touch-processing module 220, in some embodiments, is distinct and separate from its associated application, as shown in FIG. 1C, touch-processing module 220 is included in its associated application in some embodiments. In some embodiments, the application also includes an application core that is specific to the application.

It is noted that in some embodiments, contact/motion module 130 is also application-independent, in the sense that contact/motion module 130 is not designed specifically for a particular software application.

In FIG. 1C, each of application 1 (136-1, such as an e-mail client application) and application 2 (136-2, such as a browser application) includes a distinct instance (e.g., a distinct copy) of touch processing module 220. In addition, application 1 (136-1) includes application core 1 (230-1) that is specific to application 1 (136-1) and/or application 2 (136-2) includes application core 2 (230-2) that is specific to application 2 (136-2). For example, application core 1 (230-1) includes instructions for performing operations specific to application 1 (136-1) (e.g., retrieving e-mails from one or more e-mail servers) and application core 2 (230-2) includes instructions for performing operations specific to application 2 (136-2) (e.g., bookmarking a web page).

In some embodiments, event object 194 is sent directly to the destination (e.g., a software component, such as application core 1 (230-1)). Optionally, event object 194 is sent through application programming interface 222. In some embodiments, event object 194 is sent by posting event object 194 (e.g., in queue 218-1) for retrieval by application core 1 (230-1).

In some embodiments, event object 194 includes force information. In some embodiments, a mouse event object includes force information (e.g., raw or normalized force applied by the touch input). In some embodiments, a touch event object includes force information. In some embodiments, a force event object includes force information.

FIG. 2 illustrates a portable multifunction device 100 having a touch screen (e.g., touch-sensitive display system 112, FIG. 1A) in accordance with some embodiments. The touch screen optionally displays one or more graphics within user interface (UI) 200. In these embodiments, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally executed on device 100. Alternatively, in some embodiments, the menu button is implemented as a soft key in a GUI displayed on the touch-screen display.

In some embodiments, device 100 includes the touch-screen display, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In some embodiments, device 100 also accepts verbal input for activation or deactivation of some functions through microphone 113. Device 100 also, optionally, includes one or more contact intensity sensors 165 for detecting intensity of contacts on touch-sensitive display system 112 and/or one or more tactile output generators 163 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch-screen display. I/O interface 330 also optionally includes a keyboard and/or mouse (or other pointing device) 350 and touchpad 355, tactile output generator 357 for generating tactile outputs on device 300 (e.g., similar to tactile output generator(s) 163 described above with reference to FIG. 1A), sensors 359 (e.g., touch-sensitive, optical, contact intensity, proximity, acceleration, attitude, and/or magnetic sensors similar to sensors 112, 164, 165, 166, 167, 168, and 169 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 is, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

FIG. 4 is a block diagram of an exemplary electronic stylus 203 in accordance with some embodiments. Electronic stylus 203 is sometimes simply called a stylus. Stylus 203 includes memory 402 (which optionally includes one or more computer readable storage mediums), memory controller 422, one or more processing units (CPUs) 420, peripherals interface 418, RF circuitry 408, input/output (I/O) subsystem 406, and other input or control devices 416. Stylus 203 optionally includes external port 424 and one or more optical sensors 464. Stylus 203 optionally includes one or more intensity sensors 465 for detecting intensity of contacts of stylus 203 on device 100 (e.g., when stylus 203 is used with a touch-sensitive surface such as touch-sensitive display system 112 of device 100) or on other surfaces (e.g., a desk surface). Stylus 203 optionally includes one or more tactile output generators 463 for generating tactile outputs on stylus 203. These components optionally communicate over one or more communication buses or signal lines 403.

In some embodiments, the term "tactile output," discussed above, refers to physical displacement of an accessory (e.g., stylus 203) of a device (e.g., device 100) relative to a previous position of the accessory, physical displacement of a component of an accessory relative to another component of the accessory, or displacement of the component relative to a center of mass of the accessory that will be detected by a user with the user's sense of touch. For example, in situations where the accessory or the component of the accessory is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the accessory or the component of the accessory. For example, movement of a component (e.g., the housing of stylus 203) is, optionally, interpreted by the user as a "click" of a physical actuator button. In some cases, a user will feel a tactile sensation such as a "click" even when there is no movement of a physical actuator button associated with the stylus that is physically pressed (e.g., displaced) by the user's movements. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., a "click,"), unless otherwise stated, the generated tactile output corresponds to physical displacement of the device or a component thereof that will generate the described sensory perception for a typical (or average) user.

It should be appreciated that stylus 203 is only one example of an electronic stylus, and that stylus 203 optionally has more or fewer components than shown, optionally combines two or more components, or optionally has a different configuration or arrangement of the components. The various components shown in FIG. 4 are implemented in hardware, software, firmware, or a combination thereof, including one or more signal processing and/or application specific integrated circuits.

Memory 402 optionally includes high-speed random access memory and optionally also includes non-volatile memory, such as one or more flash memory devices, or other non-volatile solid-state memory devices. Access to memory 402 by other components of stylus 203, such as CPU(s) 420 and the peripherals interface 418, is, optionally, controlled by memory controller 422.

Peripherals interface 418 can be used to couple input and output peripherals of the stylus to CPU(s) 420 and memory 402. The one or more processors 420 run or execute various software programs and/or sets of instructions stored in memory 402 to perform various functions for stylus 203 and to process data.

In some embodiments, peripherals interface 418, CPU(s) 420, and memory controller 422 are, optionally, implemented on a single chip, such as chip 404. In some other embodiments, they are, optionally, implemented on separate chips.

RF (radio frequency) circuitry 408 receives and sends RF signals, also called electromagnetic signals. RF circuitry 408 converts electrical signals to/from electromagnetic signals and communicates with device 100 or 300, communications networks, and/or other communications devices via the electromagnetic signals. RF circuitry 408 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 408 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

I/O subsystem 406 couples input/output peripherals on stylus 203, such as other input or control devices 416, with peripherals interface 418. I/O subsystem 406 optionally includes optical sensor controller 458, intensity sensor controller 459, haptic feedback controller 461, and one or more input controllers 460 for other input or control devices. The one or more input controllers 460 receive/send electrical signals from/to other input or control devices 416. The other input or control devices 416 optionally include physical buttons (e.g., push buttons, rocker buttons, etc.), dials, slider switches, click wheels, and so forth. In some alternate embodiments, input controller(s) 460 are, optionally, coupled with any (or none) of the following: an infrared port and/or a USB port.

Stylus 203 also includes power system 462 for powering the various components. Power system 462 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices and/or portable accessories.

Stylus 203 optionally also includes one or more optical sensors 464. FIG. 4 shows an optical sensor coupled with optical sensor controller 458 in I/O subsystem 406. Optical sensor(s) 464 optionally include charge-coupled device (CCD) or complementary metal-oxide semiconductor (CMOS) phototransistors. Optical sensor(s) 464 receive light from the environment, projected through one or more lens, and converts the light to data representing an image.

Stylus 203 optionally also includes one or more contact intensity sensors 465. FIG. 4 shows a contact intensity sensor coupled with intensity sensor controller 459 in I/O subsystem 406. Contact intensity sensor(s) 465 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a surface). Contact intensity sensor(s) 465 receive contact intensity information (e.g., pressure information or a proxy for pressure information) from the environment. In some embodiments, at least one contact intensity sensor is collocated with, or proximate to, a tip of stylus 203.

Stylus 203 optionally also includes one or more proximity sensors 466. FIG. 4 shows proximity sensor 466 coupled with peripherals interface 418. Alternately, proximity sensor 466 is coupled with input controller 460 in I/O subsystem 406. In some embodiments, the proximity sensor determines proximity of stylus 203 to an electronic device (e.g., device 100).

Stylus 203 optionally also includes one or more tactile output generators 463. FIG. 4 shows a tactile output generator coupled with haptic feedback controller 461 in I/O subsystem 406. Tactile output generator(s) 463 optionally include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Tactile output generator(s) 463 receive tactile feedback generation instructions from haptic feedback module 433 and generates tactile outputs on stylus 203 that are capable of being sensed by a user of stylus 203. In some embodiments, at least one tactile output generator is collocated with, or proximate to, a length (e.g., a body or a housing) of stylus 203 and, optionally, generates a tactile output by moving stylus 203 vertically (e.g., in a direction parallel to the length of stylus 203) or laterally (e.g., in a direction normal to the length of stylus 203).

Stylus 203 optionally also includes one or more accelerometers 467, gyroscopes 468, and/or magnetometers 470 (e.g., as part of an inertial measurement unit (IMU)) for obtaining information concerning the location and positional state of stylus 203. FIG. 4 shows sensors 467, 469, and 470 coupled with peripherals interface 418. Alternately, sensors 467, 469, and 470 are, optionally, coupled with an input controller 460 in I/O subsystem 406. Stylus 203 optionally includes a GPS (or GLONASS or other global navigation system) receiver (not shown) for obtaining information concerning the location of stylus 203.

In some embodiments, the software components stored in memory 402 include operating system 426, communication module (or set of instructions) 428, contact/motion module (or set of instructions) 430, position module (or set of instructions) 431, and Global Positioning System (GPS) module (or set of instructions) 435. Furthermore, in some embodiments, memory 402 stores device/global internal state 457, as shown in FIG. 4. Device/global internal state 457 includes one or more of: sensor state, including information obtained from the stylus's various sensors and other input or control devices 416; positional state, including information regarding the stylus's position (e.g., position, orientation, tilt, roll and/or distance, as shown in FIGS. 5A and 5B) relative to a device (e.g., device 100); and location information concerning the stylus's location (e.g., determined by GPS module 435).

Operating system 426 (e.g., iOS, Darwin, RTXC, LINUX, UNIX, OS X, WINDOWS, or an embedded operating system such as VxWorks) includes various software components and/or drivers for controlling and managing general system tasks (e.g., memory management, power management, etc.) and facilitates communication between various hardware and software components.

Communication module 428 optionally facilitates communication with other devices over one or more external ports 424 and also includes various software components for handling data received by RF circuitry 408 and/or external port 424. External port 424 (e.g., Universal Serial Bus (USB), FIREWIRE, etc.) is adapted for coupling directly to other devices or indirectly over a network (e.g., the Internet, wireless LAN, etc.). In some embodiments, the external port is a Lightning connector that is the same as, or similar to and/or compatible with the Lightning connector used in some iPhone®, iPod Touch®, and iPad® devices from Apple Inc. of Cupertino, Calif.

Contact/motion module 430 optionally detects contact with stylus 203 and other touch-sensitive devices of stylus 203 (e.g., buttons or other touch-sensitive components of stylus 203). Contact/motion module 430 includes software components for performing various operations related to detection of contact (e.g., detection of a tip of the stylus with a touch-sensitive display, such as touch screen 112 of device 100, or with another surface, such as a desk surface), such as determining if contact has occurred (e.g., detecting a touch-down event), determining an intensity of the contact (e.g., the force or pressure of the contact or a substitute for the force or pressure of the contact), determining if there is movement of the contact and tracking the movement (e.g., across touch screen 112 of device 100), and determining if the contact has ceased (e.g., detecting a lift-off event or a break in contact). In some embodiments, contact/motion module 430 receives contact data from I/O subsystem 406. Determining movement of the point of contact, which is represented by a series of contact data, optionally includes determining speed (magnitude), velocity (magnitude and direction), and/or an acceleration (a change in magnitude and/or direction) of the point of contact. As noted above, in some embodiments, one or more of these operations related to detection of contact are performed by the device using contact/motion module 130 (in addition to or in place of the stylus using contact/motion module 430).

Contact/motion module 430 optionally detects a gesture input by stylus 203. Different gestures with stylus 203 have different contact patterns (e.g., different motions, timings, and/or intensities of detected contacts). Thus, a gesture is, optionally, detected by detecting a particular contact pattern. For example, detecting a single tap gesture includes detecting a touch-down event followed by detecting a lift-off event at the same position (or substantially the same position) as the touch-down event (e.g., at the position of an icon). As another example, detecting a swipe gesture includes detecting a touch-down event followed by detecting one or more stylus-dragging events, and subsequently followed by detecting a lift-off event. As noted above, in some embodiments, gesture detection is performed by the device using contact/motion module 130 (in addition to or in place of the stylus using contact/motion module 430).

Position module 431, in conjunction with accelerometers 467, gyroscopes 468, and/or magnetometers 469, optionally detects positional information concerning the stylus, such as the stylus's attitude (roll, pitch, and/or yaw) in a particular frame of reference. Position module 431, in conjunction with accelerometers 467, gyroscopes 468, and/or magnetometers 469, optionally detects stylus movement gestures, such as flicks, taps, and rolls of the stylus. Position module 431 includes software components for performing various operations related to detecting the position of the stylus and detecting changes to the position of the stylus in a particular frame of reference. In some embodiments, position module 431 detects the positional state of the stylus relative to the device and detects changes to the positional state of the stylus relative to the device. As noted above, in some embodiments, device 100 or 300 determines the positional state of the stylus relative to the device and changes to the positional state of the stylus using position module 131 (in addition to or in place of the stylus using position module 431).

Haptic feedback module 433 includes various software components for generating instructions used by tactile output generator(s) 463 to produce tactile outputs at one or more locations on stylus 203 in response to user interactions with stylus 203.

GPS module 435 determines the location of the stylus and provides this information for use in various applications (e.g., to applications that provide location-based services such as an application to find missing devices and/or accessories).

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 402 optionally stores a subset of the modules and data structures identified above. Furthermore, memory 402 optionally stores additional modules and data structures not described above.

FIGS. 5A-5B illustrate a positional state of stylus 203 relative to a touch-sensitive surface (e.g., touch screen 112 of device 100) in accordance with some embodiments. In some embodiments, the positional state of stylus 203 corresponds to (or indicates): a position of a projection of a tip (or other representative portion) of the stylus on the touch-sensitive surface (e.g., (x,y) position 504, FIG. 5A), an orientation of the stylus relative to the touch-sensitive surface (e.g., orientation 506, FIG. 5A), a tilt of the stylus relative to the touch-sensitive surface (e.g., tilt 512, FIG. 5B), and/or a distance of the stylus relative to the touch-sensitive surface (e.g., distance 514, FIG. 5B). In some embodiments, the positional state of stylus 203 corresponds to (or indicates) a pitch, yaw, and/or roll of the stylus (e.g., an attitude of the stylus relative to a particular frame of reference, such as a touch-sensitive surface (e.g., touch screen 112) or the ground). In some embodiments, the positional state includes a set of positional parameters (e.g., one or more positional parameters). In some embodiments, the positional state is detected in accordance with one or more measurements from stylus 203 that are sent to an electronic device (e.g., device 100). For example, the stylus measures the tilt (e.g., tilt 512, FIG. 5B) and/or the orientation (e.g., orientation 506, FIG. 5A) of the stylus and sends the measurement to device 100. In some embodiments, the positional state is detected in accordance with raw output, from one or more electrodes in the stylus, that is sensed by a touch-sensitive surface (e.g., touch screen 112 of device 100) instead of, or in combination with positional state detected in accordance with one or more measurements from stylus 203. For example, the touch-sensitive surface receives raw output from one or more electrodes in the stylus and calculates the tilt and/or the orientation of the stylus based on the raw output (optionally, in conjunction with positional state information provided by the stylus based on sensor measurements generated by the stylus).

FIG. 5A illustrates stylus 203 relative to a touch-sensitive surface (e.g., touch screen 112 of device 100) from a viewpoint directly above the touch-sensitive surface, in accordance with some embodiments. In FIG. 5A, z axis 594 points out of the page (i.e., in a direction normal to a plane of touch screen 112), x axis 590 is parallel to a first edge (e.g., a length) of touch screen 112, y axis 592 is parallel to a second edge (e.g., a width) of touch screen 112, and y axis 592 is perpendicular to x axis 590.

FIG. 5A illustrates the tip of stylus 203 at (x,y) position 504. In some embodiments, the tip of stylus 203 is a terminus of the stylus configured for determining proximity of the stylus to a touch-sensitive surface (e.g., touch screen 112). In some embodiments, the projection of the tip of the stylus on the touch-sensitive surface is an orthogonal projection. In other words, the projection of the tip of the stylus on the touch-sensitive surface is a point at the end of a line from the stylus tip to the touch-sensitive surface that is normal to a surface of the touch-sensitive surface (e.g., (x,y) position 504 at which the tip of the stylus would touch the touch-sensitive surface if the stylus were moved directly along a path normal to the touch-sensitive surface). In some embodiments, the (x,y) position at the lower left corner of touch screen 112 is position (0,0) (e.g., (0,0) position 502) and other (x,y) positions on touch screen 112 are relative to the lower left corner of touch screen 112. Alternatively, in some embodiments, the (0,0) position is located at another position of touch screen 112 (e.g., in the center of touch screen 112) and other (x,y) positions are relative to the (0,0) position of touch screen 112.

Further, FIG. 5A illustrates stylus 203 with orientation 506. In some embodiments, orientation 506 is an orientation of a projection of stylus 203 onto touch screen 112 (e.g., an orthogonal projection of a length of stylus 203 or a line corresponding to the line between the projection of two different points of stylus 203 onto touch screen 112). In some embodiments, orientation 506 is relative to at least one axis in a plane parallel to touch screen 112. In some embodiments, orientation 506 is relative to a single axis in a plane parallel to touch screen 112 (e.g., axis 508, with a clockwise rotation angle from axis 508 ranging from 0 degrees to 360 degrees, as shown in FIG. 5A). Alternatively, in some embodiments, orientation 506 is relative to a pair of axes in a plane parallel to touch screen 112 (e.g., x axis 590 and y axis 592, as shown in FIG. 5A, or a pair of axes associated with an application displayed on touch screen 112).

In some embodiments, an indication (e.g., indication 516) is displayed on a touch-sensitive display (e.g., touch screen 112 of device 100). In some embodiments, indication 516 shows where the stylus will touch (or mark) the touch-sensitive display before the stylus touches the touch-sensitive display. In some embodiments, indication 516 is a portion of a mark that is being drawn on the touch-sensitive display. In some embodiments, indication 516 is separate from a mark that is being drawn on the touch-sensitive display and corresponds to a virtual "pen tip" or other element that indicates where a mark will be drawn on the touch-sensitive display.

In some embodiments, indication 516 is displayed in accordance with the positional state of stylus 203. For example, in some circumstances, indication 516 is displaced from (x,y) position 504 (as shown in FIGS. 5A and 5B), and in other circumstances, indication 516 is not displaced from (x,y) position 504 (e.g., indication 516 is displayed at or near (x,y) position 504 when tilt 512 is zero degrees). In some embodiments, indication 516 is displayed, in accordance with the positional state of the stylus, with varying color, size (or radius or area), opacity, and/or other characteristics. In some embodiments, the displayed indication accounts for thickness of a glass layer on the touch-sensitive display, so as to carry through the indication "onto the pixels" of the touch-sensitive display, rather than displaying the indication "on the glass" that covers the pixels.

FIG. 5B illustrates stylus 203 relative to a touch-sensitive surface (e.g., touch screen 112 of device 100) from a side viewpoint of the touch-sensitive surface, in accordance with some embodiments. In FIG. 5B, z axis 594 points in a direction normal to the plane of touch screen 112, x axis 590 is parallel to a first edge (e.g., a length) of touch screen 112, y axis 592 is parallel to a second edge (e.g., a width) of touch screen 112, and y axis 592 is perpendicular to x axis 590.

FIG. 5B illustrates stylus 203 with tilt 512. In some embodiments, tilt 512 is an angle relative to a normal (e.g., normal 510) to a surface of the touch-sensitive surface (also called simply the normal to the touch-sensitive surface). As shown in FIG. 5B, tilt 512 is zero when the stylus is perpendicular/normal to the touch-sensitive surface (e.g., when stylus 203 is parallel to normal 510) and the tilt increases as the stylus is tilted closer to being parallel to the touch-sensitive surface.

Further, FIG. 5B illustrates distance 514 of stylus 203 relative to the touch-sensitive surface. In some embodiments, distance 514 is the distance from the tip of stylus 203 to the touch-sensitive surface, in a direction normal to the touch-sensitive surface. For example, in FIG. 5B, distance 514 is the distance from the tip of stylus 203 to (x,y) position 504.

Although the terms, "x axis," "y axis," and "z axis" are used herein to illustrate certain directions in particular figures, it will be understood that these terms do not refer to absolute directions. In other words, an "x axis" could be any respective axis, and a "y axis" could be a particular axis that is distinct from the x axis. Typically, the x axis is perpendicular to the y axis. Similarly, a "z axis" is distinct from the "x axis" and the "y axis," and is typically perpendicular to both the "x axis" and the "y axis."

Further, FIG. 5B illustrates roll 518, a rotation about the length (long axis) of stylus 203.

Attention is now directed towards embodiments of user interfaces ("UI") that are, optionally, implemented on portable multifunction device 100.

Figure 6A:
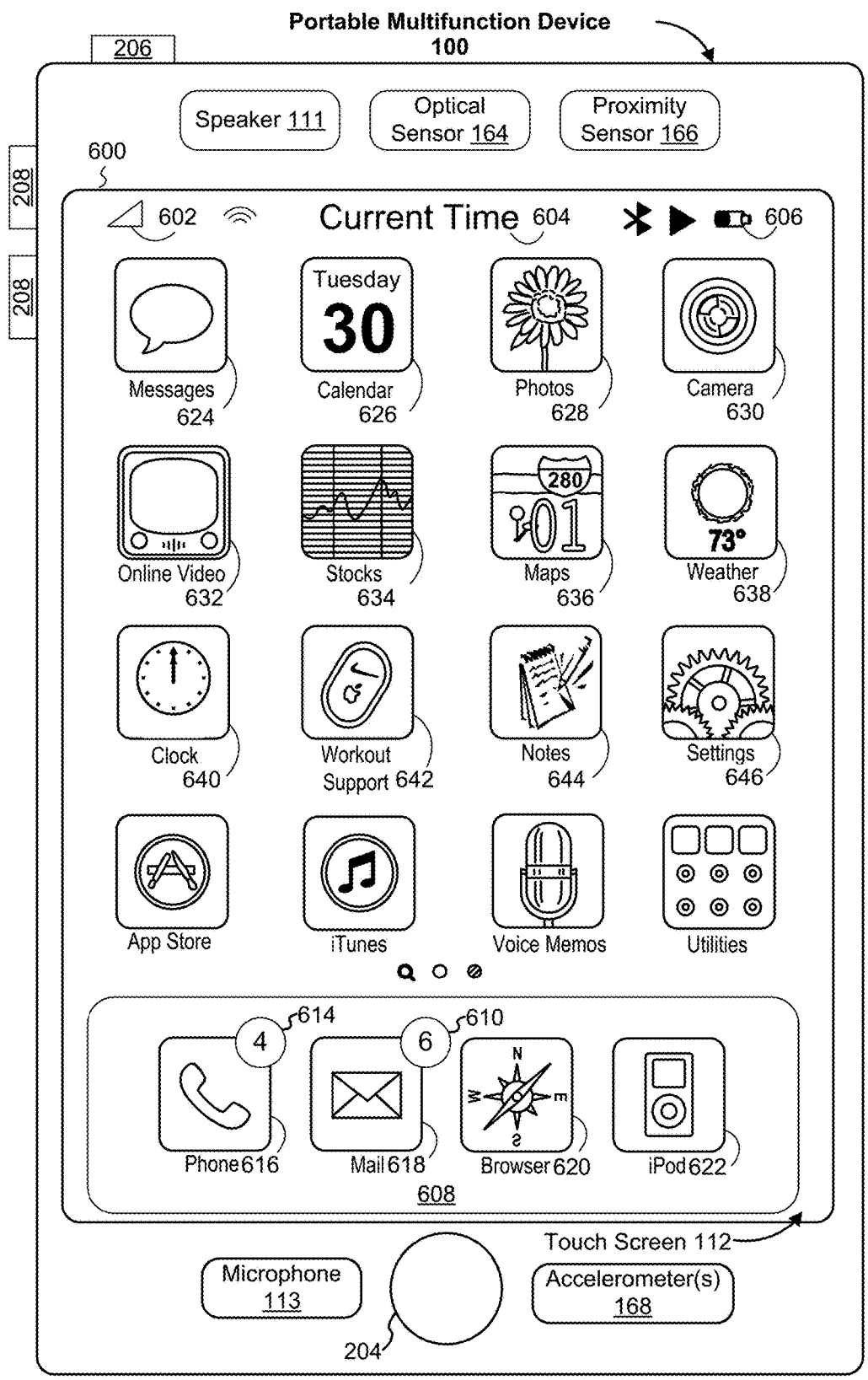
FIG. 6A illustrates an exemplary user interface for a menu of applications on a portable multifunction device in accordance with some embodiments.

FIG. 6A illustrates an exemplary user interface for a menu of applications on portable multifunction device 100 in accordance with some embodiments. Similar user interfaces are, optionally, implemented on device 300. In some embodiments, user interface 600 includes the following elements, or a subset or superset thereof:

Signal strength indicator(s) 602 for wireless communication(s), such as cellular and Wi-Fi signals;
Time 604;
a Bluetooth indicator;
Battery status indicator 606;
Tray 608 with icons for frequently used applications, such as:
Icon 616 for telephone module 138, labeled "Phone," which optionally includes an indicator 614 of the number of missed calls or voicemail messages;
Icon 618 for e-mail client module 140, labeled "Mail," which optionally includes an indicator 610 of the number of unread e-mails;
Icon 620 for browser module 147, labeled "Browser;" and
Icon 622 for video and music player module 152, also referred to as iPod (trademark of Apple Inc.) module 152, labeled "iPod;" and
Icons for other applications, such as:
Icon 624 for IM module 141, labeled "Messages;"
Icon 626 for calendar module 148, labeled "Calendar;"
Icon 628 for image management module 144, labeled "Photos;"
Icon 630 for camera module 143, labeled "Camera;"
Icon 632 for online video module 155, labeled "Online Video;"
Icon 634 for stocks widget 149-2, labeled "Stocks;"
Icon 636 for map module 154, labeled "Maps;"
Icon 638 for weather widget 149-1, labeled "Weather;"
Icon 640 for alarm clock widget 169-6, labeled "Clock;"
Icon 642 for workout support module 142, labeled "Workout Support;"
Icon 644 for notes module 153, labeled "Notes;" and
Icon 646 for a settings application or module, which provides access to settings for device 100 and its various applications 136.

It should be noted that the icon labels illustrated in FIG. 6A are merely exemplary. For example, in some embodiments, icon 622 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 6B:
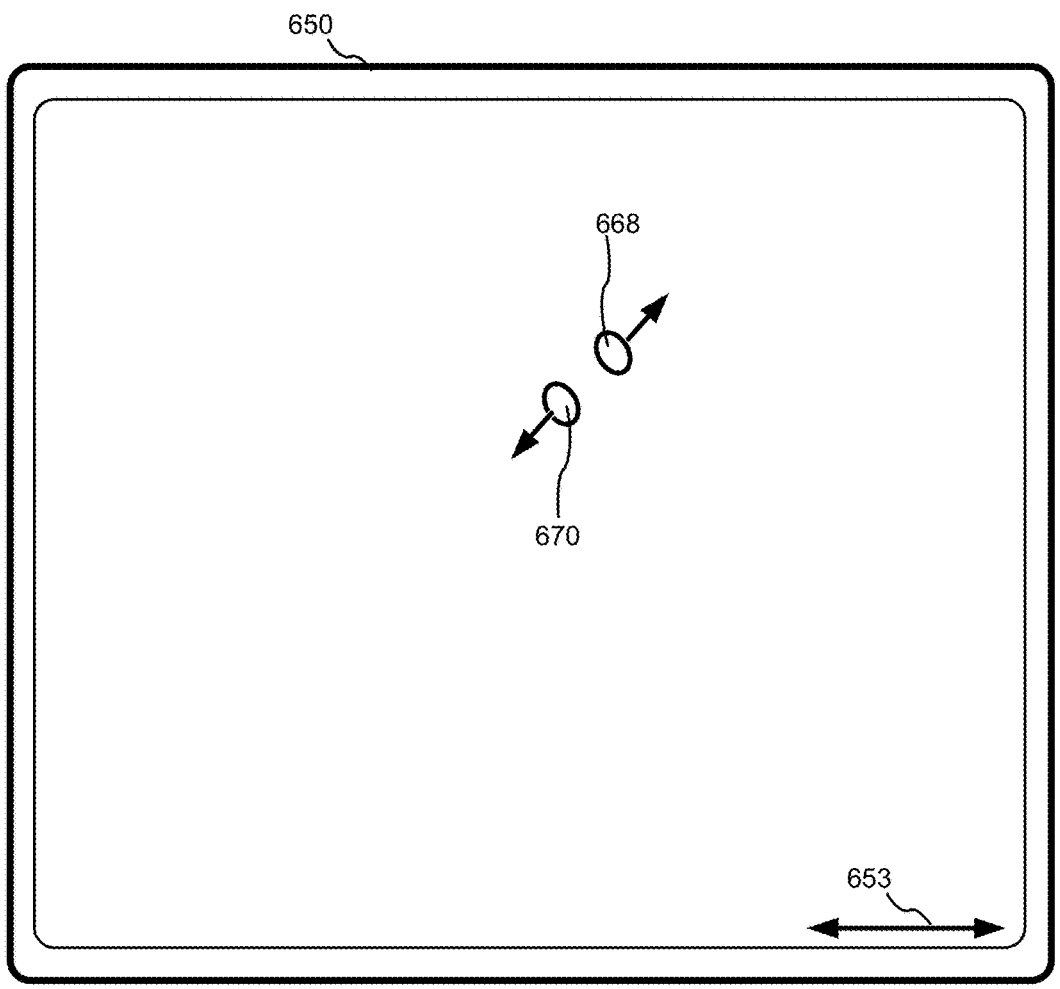
FIG. 6B illustrates an exemplary user interface for a multifunction device with a touch-sensitive surface that is separate from the display in accordance with some embodiments.
Figure 6B:
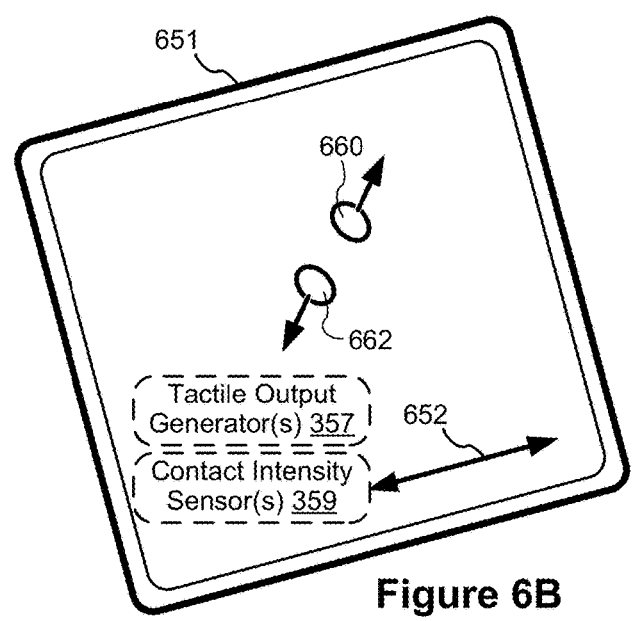

FIG. 6B illustrates an exemplary user interface on a device (e.g., device 300, FIG. 3) with a touch-sensitive surface 651 (e.g., a tablet or touchpad 355, FIG. 3) that is separate from display 650. Device 300 also, optionally, includes one or more contact intensity sensors (e.g., one or more of sensors 359) for detecting intensity of contacts on touch-sensitive surface 651 and/or one or more tactile output generators 357 for generating tactile outputs for a user of device 300.

Many of the examples that follow will be given with reference to a device that detects inputs on a touch-sensitive surface that is separate from the display, as shown in FIG. 6B. In some embodiments, the touch-sensitive surface (e.g., 651 in FIG. 6B) has a primary axis (e.g., 652 in FIG. 6B) that corresponds to a primary axis (e.g., 653 in FIG. 6B) on the display (e.g., 650). In accordance with these embodiments, the device detects contacts (e.g., 660 and 662 in FIG. 6B) with touch-sensitive surface 651 at locations that correspond to respective locations on the display (e.g., in FIG. 6B, 660 corresponds to 668 and 662 corresponds to 670). In this way, user inputs (e.g., contacts 660 and 662, and movements thereof) detected by the device on the touch-sensitive surface (e.g., 651 in FIG. 6B) are used by the device to manipulate the user interface on the display (e.g., 650 in FIG. 6B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures, etc.), it should be understood that, in some embodiments, one or more of the finger inputs are replaced with input from another input device (e.g., a stylus input).

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 651 in FIG. 6B) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A or the touch screen in FIG. 6A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations, focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "intensity" of a contact on a touch-sensitive surface refers to the force or pressure (force per unit area) of a contact (e.g., a finger contact or a stylus contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average or a sum) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be readily accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

In some embodiments, contact/motion module 130 and/or 430 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch-screen display can be set to any of a large range of predefined thresholds values without changing the trackpad or touch-screen display hardware. Additionally, in some embodiments, a user of the device is provided with software settings for adjusting one or more of the set of intensity thresholds (e.g., by adjusting individual intensity thresholds and/or by adjusting a plurality of intensity thresholds at once with a system-level click "intensity" parameter).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds may include a first intensity threshold and a second intensity threshold. In this example, a contact with a characteristic intensity that does not exceed the first intensity threshold results in a first operation, a contact with a characteristic intensity that exceeds the first intensity threshold and does not exceed the second intensity threshold results in a second operation, and a contact with a characteristic intensity that exceeds the second intensity threshold results in a third operation. In some embodiments, a comparison between the characteristic intensity and one or more intensity thresholds is used to determine whether or not to perform one or more operations (e.g., whether to perform a respective option or forgo performing the respective operation) rather than being used to determine whether to perform a first operation or a second operation.

In some embodiments, a portion of a gesture is identified for purposes of determining a characteristic intensity. For example, a touch-sensitive surface may receive a continuous swipe contact transitioning from a start location and reaching an end location (e.g., a drag gesture), at which point the intensity of the contact increases. In this example, the characteristic intensity of the contact at the end location may be based on only a portion of the continuous swipe contact, and not the entire swipe contact (e.g., only the portion of the swipe contact at the end location). In some embodiments, a smoothing algorithm may be applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The user interface figures (e.g., FIGS. 7A-7CC) described below optionally include various intensity diagrams that show the current intensity of the contact on the touch-sensitive surface relative to one or more intensity thresholds (e.g., a first intensity threshold $I_L$, a second intensity threshold $I_M$, a third intensity threshold $I_H$, and/or one or more other intensity thresholds). This intensity diagram is typically not part of the displayed user interface, but is provided to aid in the interpretation of the figures. In some embodiments, the first intensity threshold corresponds to an intensity at which the device will perform operations typically associated with clicking a button of a physical mouse or a trackpad. In some embodiments, the second and third intensity thresholds correspond to intensities at which the device will perform operations that are different from operations typically associated with clicking a button of a physical mouse or a trackpad. In some embodiments, when a contact is detected with a characteristic intensity below the first intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

In some embodiments, the response of the device to inputs detected by the device depends on criteria based on the contact intensity during the input. For example, for some inputs, the intensity of a contact exceeding a first intensity threshold during the input triggers a first response. In some embodiments, the response of the device to inputs detected by the device depends on criteria that include both the contact intensity during the input and time-based criteria. For example, for some inputs, the intensity of a contact exceeding a second intensity threshold during the input, greater than the first intensity threshold (e.g., for a light press), triggers a second response only if a delay time has elapsed between meeting the first intensity threshold and meeting the second intensity threshold. This delay time is typically less than 200 ms in duration (e.g., 40, 100, or 120 ms, depending on the magnitude of the second intensity threshold, with the delay time increasing as the second intensity threshold increases). This delay time helps to avoid accidental triggering of the second response. As another example, for some inputs, there is a reduced-sensitivity time period that occurs after the time at which the first intensity threshold is met. During the reduced-sensitivity time period, the second intensity threshold is increased. This temporary increase in the second intensity threshold also helps to avoid accidental triggering of the second response. For other inputs, the second response does not depend on time-based criteria.

In some embodiments, one or more of the input intensity thresholds and/or the corresponding outputs vary based on one or more factors, such as user settings, contact motion, input timing, application running, rate at which the intensity is applied, number of concurrent inputs, user history, environmental factors (e.g., ambient noise), focus selector position, and the like. Exemplary factors are described in U.S. patent application Ser. Nos. 14/399,606 and 14/624,296, which are incorporated by reference herein in their entireties.

An increase of characteristic intensity of the contact from an intensity below the intensity threshold $I_L$ to an intensity between the intensity threshold $I_L$ and the intensity threshold $I_M$ is sometimes referred to as a "light press" input. An increase of characteristic intensity of the contact from an intensity below the intensity threshold $I_M$ to an intensity above the intensity threshold $I_M$ is sometimes referred to as a "deep press" input. In some embodiments, an increase of characteristic intensity of the contact from an intensity below the intensity threshold $I_H$ to an intensity above the intensity threshold $I_H$ is also called a "deep press" input. An increase of characteristic intensity of the contact from an intensity below a contact-detection intensity threshold to an intensity between the contact-detection intensity threshold and the intensity threshold $I_L$ is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero. In some of the illustrations shown in FIGS. 7A-7CC, a shaded circle or oval is used to represent intensity of a contact on the touch-sensitive surface. In some these illustrations, a circle or oval without shading is used represent a respective contact on the touch-sensitive surface without specifying the intensity of the respective contact.

In some embodiments, described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., the respective operation is performed on a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., the respective operation is performed on an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., the respective operation is performed on an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the description of operations performed in response to a press input associated with a press-input intensity threshold or in response to a gesture including the press input are, optionally, triggered in response to detecting: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold. As described above, in some embodiments, the triggering of these responses also depends on time-based criteria being met (e.g., a delay time has elapsed between a low intensity threshold being met and a high intensity threshold being met).

User Interfaces and Associated Processes

Attention is now directed towards embodiments of user interfaces ("UI") and associated processes that may be implemented on an electronic device, such as portable multifunction device 100 or device 300, with a display, a touch-sensitive surface, and one or more sensors to detect intensity of contacts with the touch-sensitive surface.

Figure 7A:
FIGS. 7A-7CC illustrate exemplary user interfaces and intensity and lateral movement of touch inputs for processing touch inputs based on adjusted input parameters in accordance with some embodiments.
Figure 7A:
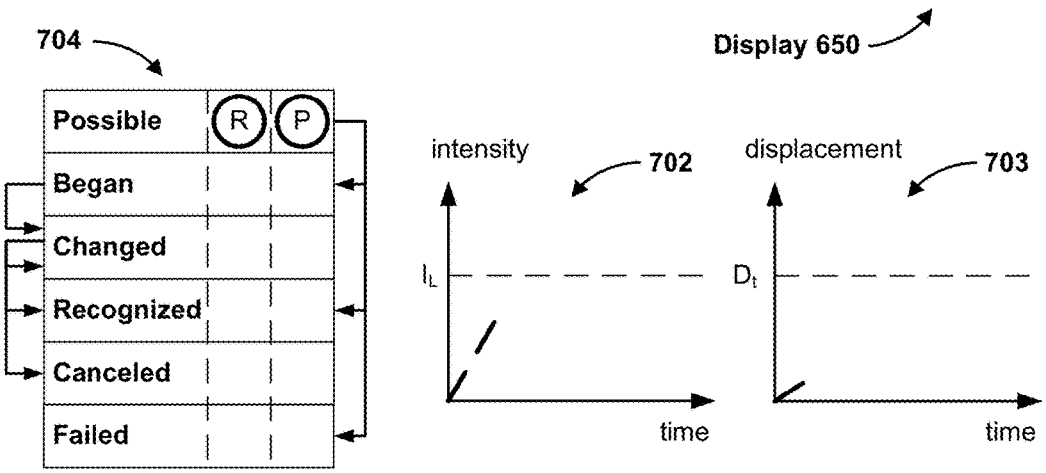
Figure 7B:
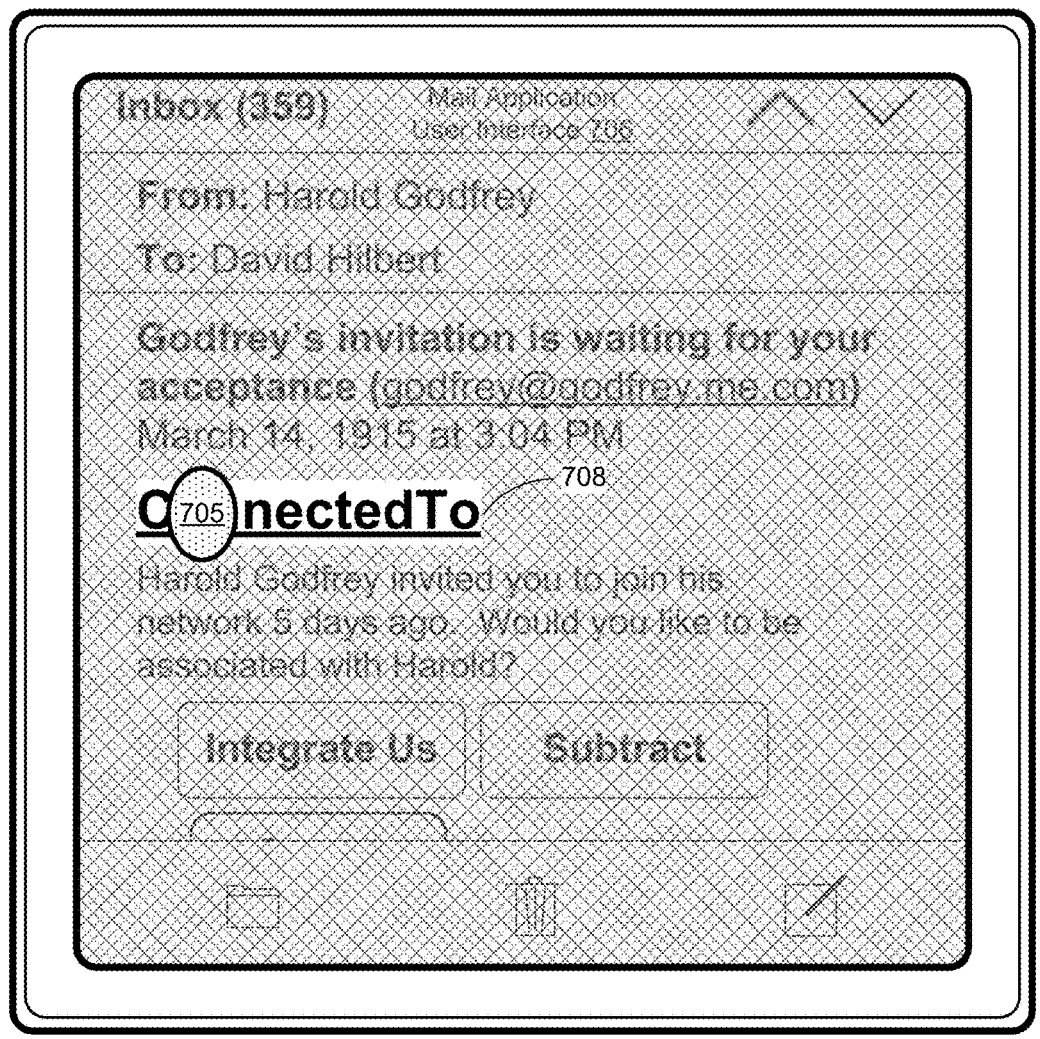
Figure 7B:
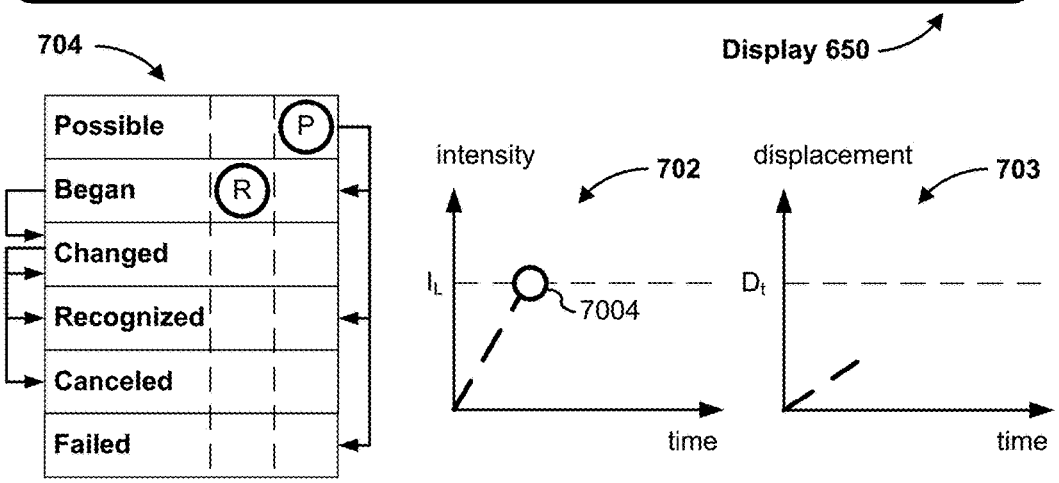
Figure 7C:
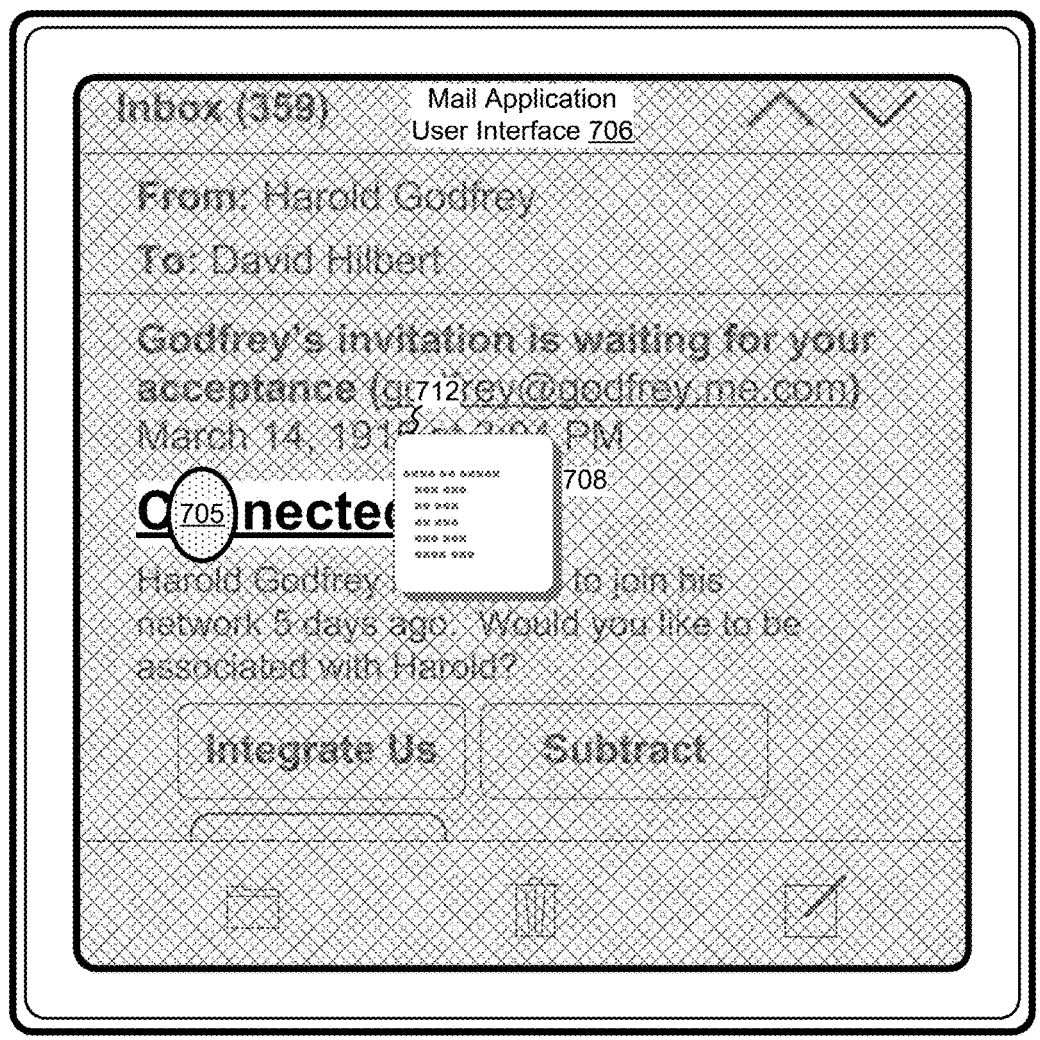
Figure 7C:
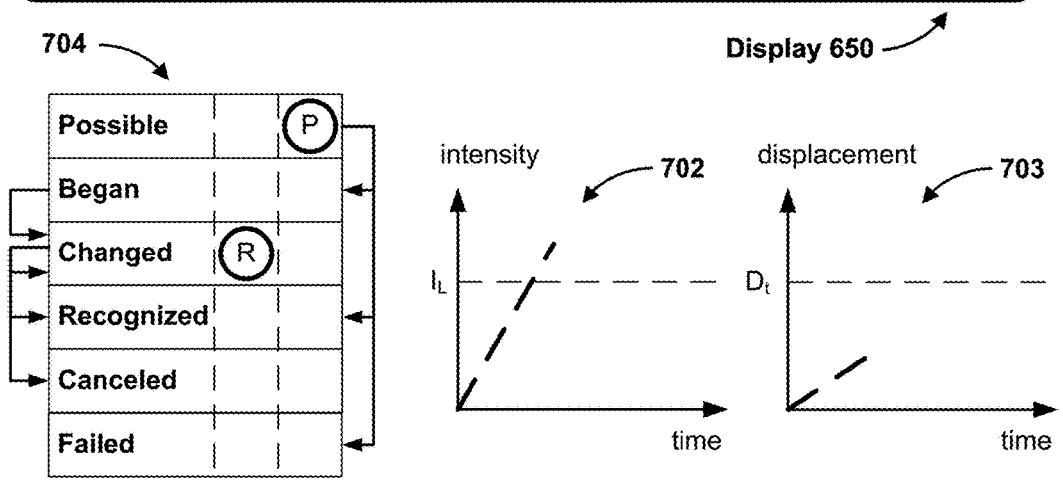

FIGS. 7A-7CC illustrate exemplary user interfaces and intensity and lateral movement of touch inputs for processing touch inputs based on adjusted input parameters in accordance with some embodiments. The user interfaces in these figures are used to illustrate the processes described below, including the processes in FIGS. 8A-8D. Although some of the examples which follow will be given with reference to inputs on touch-sensitive surface 651 that is separate from display 650, in some embodiments, the device detects inputs on a touch-screen display (where the touch-sensitive surface and the display are combined), as shown in FIG. 6A.

FIG. 7A illustrates a user interface 706 on display 650; user interface 706, in the example shown in FIGS. 7A-7CC, includes a user interface of a mail application (e.g., e-mail client module 140, FIG. 1A).

FIG. 7A also illustrates state machines 704 for gesture recognizers. In this example, state machines 704 for two gesture recognizers are shown, each represented in FIG. 7A by a single letter: a reveal gesture recognizer (R) and a pan gesture recognizer (P).

FIG. 7A shows the position of focus selector 705 positioned over user interface object 708 or feature in user interface 706. The position of focus selector 705 corresponds to the position of a corresponding user input on a touch-sensitive surface (e.g., touch-sensitive surface 651 or a touch-sensitive surface of touch-screen display 650, FIG. 6B).

As shown in user input intensity graph 702, the intensity (also called contact intensity) of the user input is initially below the intensity threshold $I_L$.

As shown in user input lateral displacement graph 703, the lateral displacement (e.g., the displacement from an initial contact position of the user input) of the user input is initially below the lateral displacement threshold $D_t$.

As shown in user input intensity graph 702 and user input lateral displacement graph 703 of FIG. 7A, an intensity threshold (e.g., intensity threshold $I_L$) is associated with the reveal gesture recognizer (R), and a lateral displacement threshold (e.g., lateral displacement threshold $D_t$) is associated with the pan gesture recognizer (P).

FIG. 7B illustrates a transition of user interface 706 from the state of that user interface in 7A. In particular, in accordance with a determination that the intensity of the user input satisfies intensity input criteria for the reveal gesture recognizer (R), the reveal gesture recognizer transitions to the Began state. In some embodiments, the intensity of the user input satisfies intensity input criteria for the reveal gesture recognizer (R) when the intensity of the user input reaches the intensity threshold $I_L$. In some embodiments, the intensity of the user input satisfies intensity input criteria for the reveal gesture recognizer (R) when the intensity of the user input exceeds the intensity threshold $I_L$. In addition, the lateral displacement of the user input has increased from the lateral displacement of the user input in FIG. 7A but does not satisfy the lateral displacement threshold $D_t$. Thus, the pan gesture recognizer (P) does not transition to the Began state.

Optionally, when the reveal gesture recognizer transitions to the Began state, focus selector 705 is displayed, or provided for display, with a different appearance than when the reveal gesture recognizer is in the Possible state. Furthermore, user interface 706 is blurred, or transitions to a blur state, excluding user interface object 708, corresponding to the position of the user input, which is not blurred. In this way, the user is notified that an action or operation with respect to user interface object 708 will occur if the user continues to increase the intensity of the user input.

In some embodiments, in accordance with a determination that the intensity of the user input satisfies intensity input criteria for the reveal gesture recognizer (R), internal event 7004 is generated (e.g., by event sorter 170, or event dispatcher module 174, or contact/motion module 130), indicating that the intensity of the user input satisfies intensity input criteria for the reveal gesture recognizer (R). Internal event 7004 is provided (e.g., by event sorter 170, or event dispatcher module 174, or contact/motion module 130) to the reveal gesture recognizer (R), which transitions to the Began state in response to receiving internal event 7004.

In FIG. 7C, the intensity of the user input has changed from an intensity shown in FIG. 7B (e.g., equal or approximately equal to the intensity threshold $I_L$ in user input intensity graph 702) to an intensity above the intensity threshold $I_L$. In addition, as shown in user input lateral displacement graph 703, the lateral displacement of the user input has increased from the lateral displacement of the user input in FIG. 7B, but still does not satisfy the lateral displacement threshold $D_t$. Thus, the pan gesture recognizer (P) does not transition to the Began state. Furthermore, the state of the reveal gesture recognizer (R) transitions to the Changed state, and a small version of preview area 712, sometimes called the preview platter, is displayed in or over user interface 706, which remains blurred except for object 708.

Figure 7D:
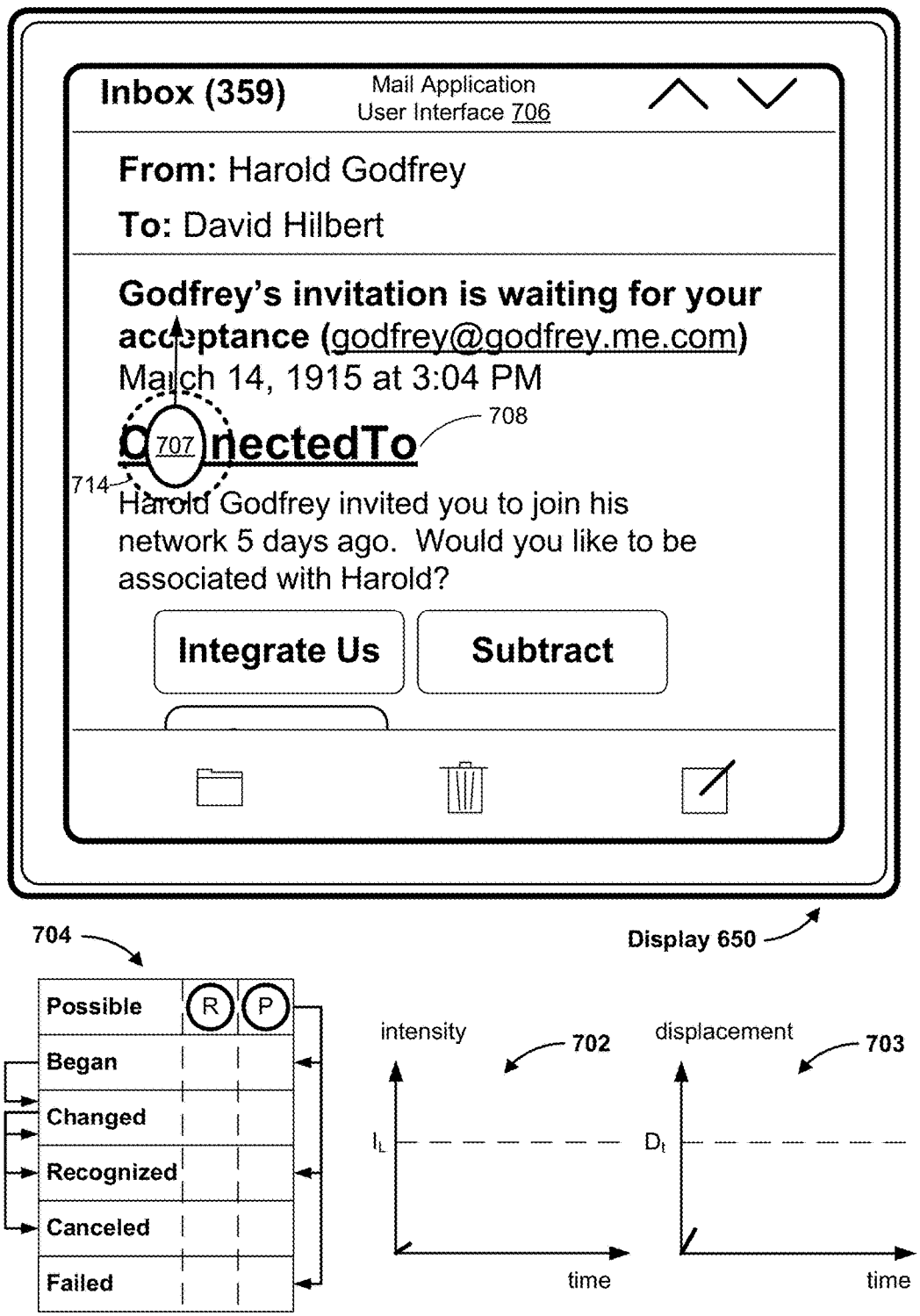

FIG. 7D is similar to FIG. 7A except that FIG. 7D shows the position of focus selector 707, instead of focus selector 705 shown in FIG. 7A, located over user interface object 708. The position of focus selector 707 corresponds to the position of a corresponding user input on a touch-sensitive surface (e.g., touch-sensitive surface 651 or a touch-sensitive surface of touch-screen display 650 shown in FIG. 6B). FIG. 7D also shows input movement limit zone 714, shown as a dashed line circle or other shape surrounding an initial contact position of focus selector 707. Input movement limit zone 714 represents an area of input movement utilized by one or more of the gesture recognizers (e.g., the pan gesture recognizer (P)) for determining whether focus selector 707 or the corresponding user input has traveled by at least a predefined distance (e.g., when focus selector 707 moves out of input movement limit zone 714, focus selector 707 or the corresponding user input is deemed to have traveled by at least the predefined distance). As shown in user input intensity graph 702 and user input lateral displacement graph 703, the intensity of the user input is initially below the intensity threshold $I_L$, and the lateral displacement of the user input is initially below the lateral displacement threshold $D_t$.

Figure 7E:
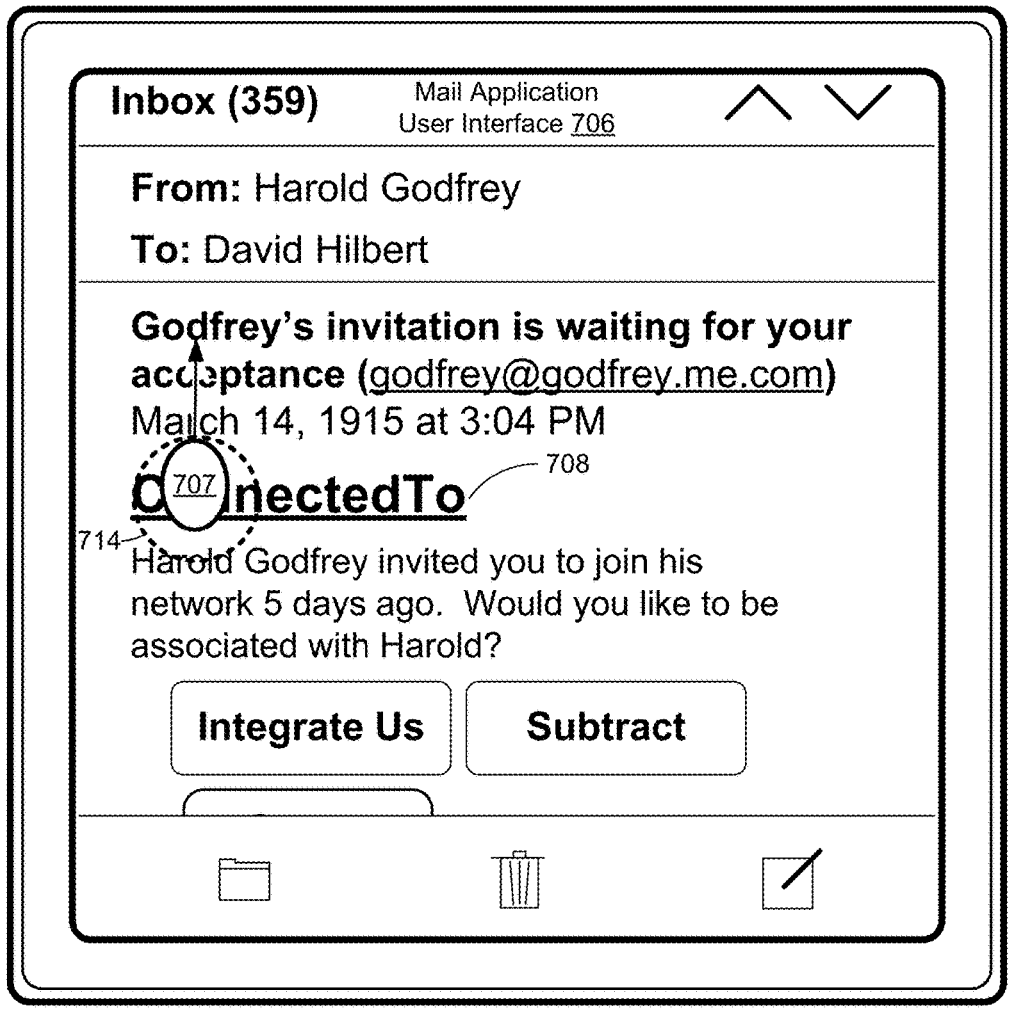
Figure 7E:
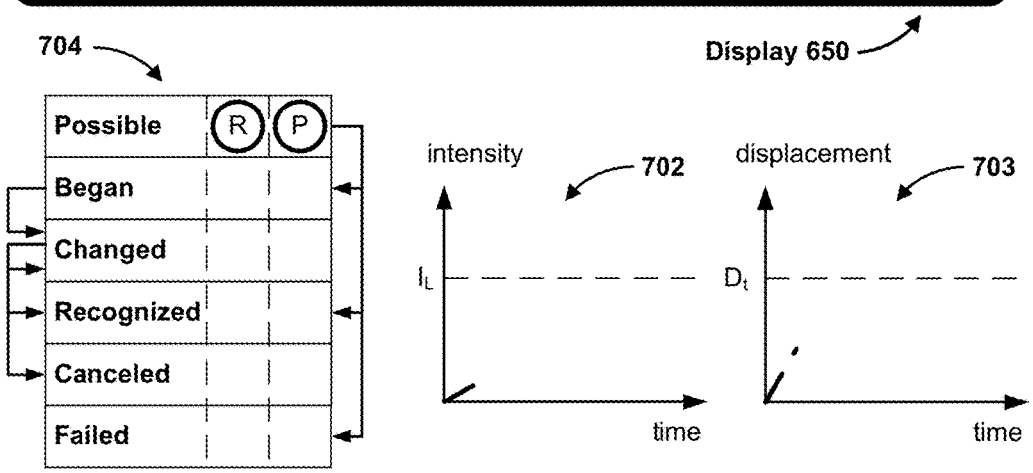

FIG. 7E illustrates a transition of user interface 706 from the state of that user interface in 7D. In particular, focus selector 707 moves from the position shown in FIG. 7D to the position shown in FIG. 7E (due to a movement of the corresponding user input), but remains within input movement limit zone 714. As shown in user input intensity graph 702, the intensity of the user input has increased from the intensity of the user input in FIG. 7D, but still does not satisfy the intensity threshold $I_L$. In addition, the lateral displacement of the user input has increased from the lateral displacement of the user input in FIG. 7D, but still does not satisfy the lateral displacement threshold $D_t$. The reveal gesture recognizer (R) and the pan gesture recognizer (P) remain in the Possible state.

Figure 7F:
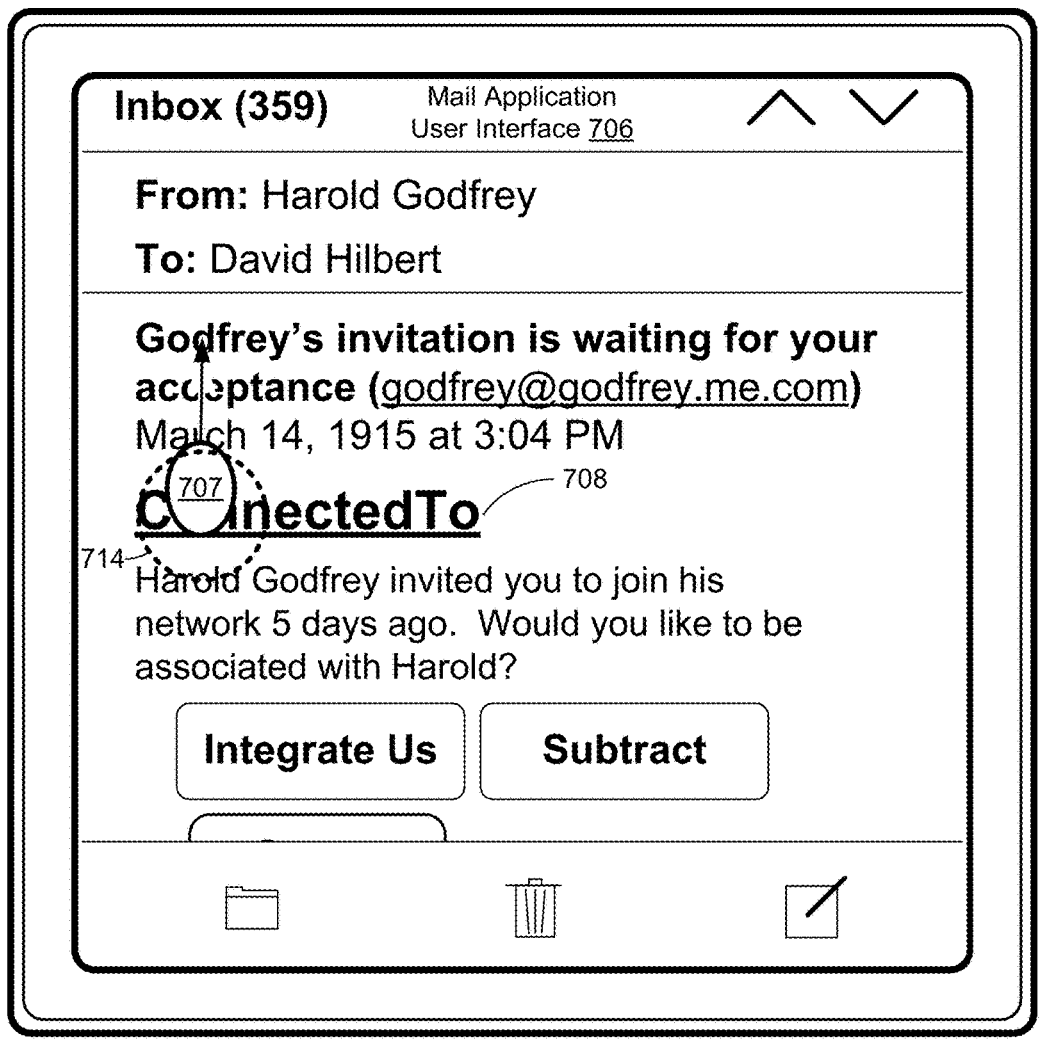
Figure 7F:
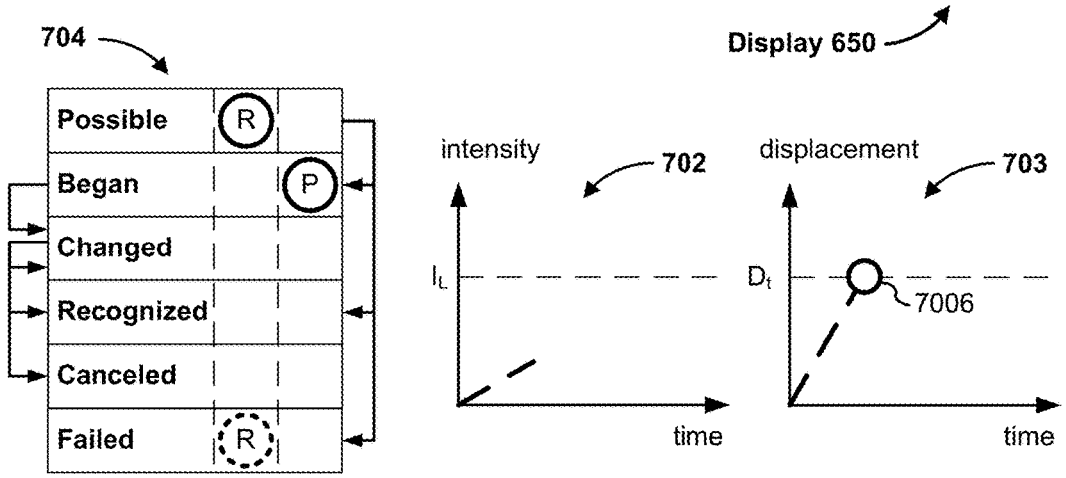

When focus selector 707 moves from the position shown in FIG. 7E to the position shown in FIG. 7F (due to a movement of the corresponding user input), the input has moved across the touch-sensitive surface by at least a predefined distance, as reflected by focus selector 707 having moved at least partially past a boundary of input movement limit zone 714. In response to the input moving across the touch-sensitive surface by at least the predefined distance, the pan gesture recognizer (P) transitions to the Began state. In particular, in accordance with a determination that the lateral displacement of the user input satisfies lateral displacement input criteria for the pan gesture recognizer (P), the pan gesture recognizer transitions to the Began state. In some embodiments, the lateral displacement of the user input satisfies lateral displacement input criteria for the pan gesture recognizer (P) when the lateral displacement of the user input reaches the lateral displacement threshold $D_t$. In some embodiments, the lateral displacement of the user input satisfies lateral displacement input criteria for the pan gesture recognizer (P) when the lateral displacement of the user input exceeds the lateral displacement threshold $D_t$.

In some embodiments, in accordance with a determination that the lateral displacement of the user input satisfies lateral displacement input criteria for the pan gesture recognizer (P), internal event 7006 is generated (e.g., by event sorter 170, or event dispatcher module 174, or contact/motion module 130), indicating that the lateral displacement of the user input satisfies lateral displacement input criteria for the pan gesture recognizer (P). Internal event 7006 is provided (e.g., by event sorter 170, or event dispatcher module 174, or contact/motion module 130) to the pan gesture recognizer (P), which transitions to the Began state in response to receiving internal event 7006.

In addition, as shown in user input intensity graph 702 of FIG. 7F, the intensity of the user input has increased from the intensity of the user input in FIG. 7E, but still does not satisfy the intensity threshold $I_L$. Thus, the reveal gesture recognizer (R) does not transition to the Began state. In some embodiments, in response to the pan gesture recognizer (P) transitioning to the Began state, the reveal gesture recognizer (R) transitions to a Failed state (due to the competition between the pan gesture recognizer (P) and the reveal gesture recognizer (R)), and remains in the Failed state until the reveal gesture recognizer is reset (to the Possible state).

Figure 7G:
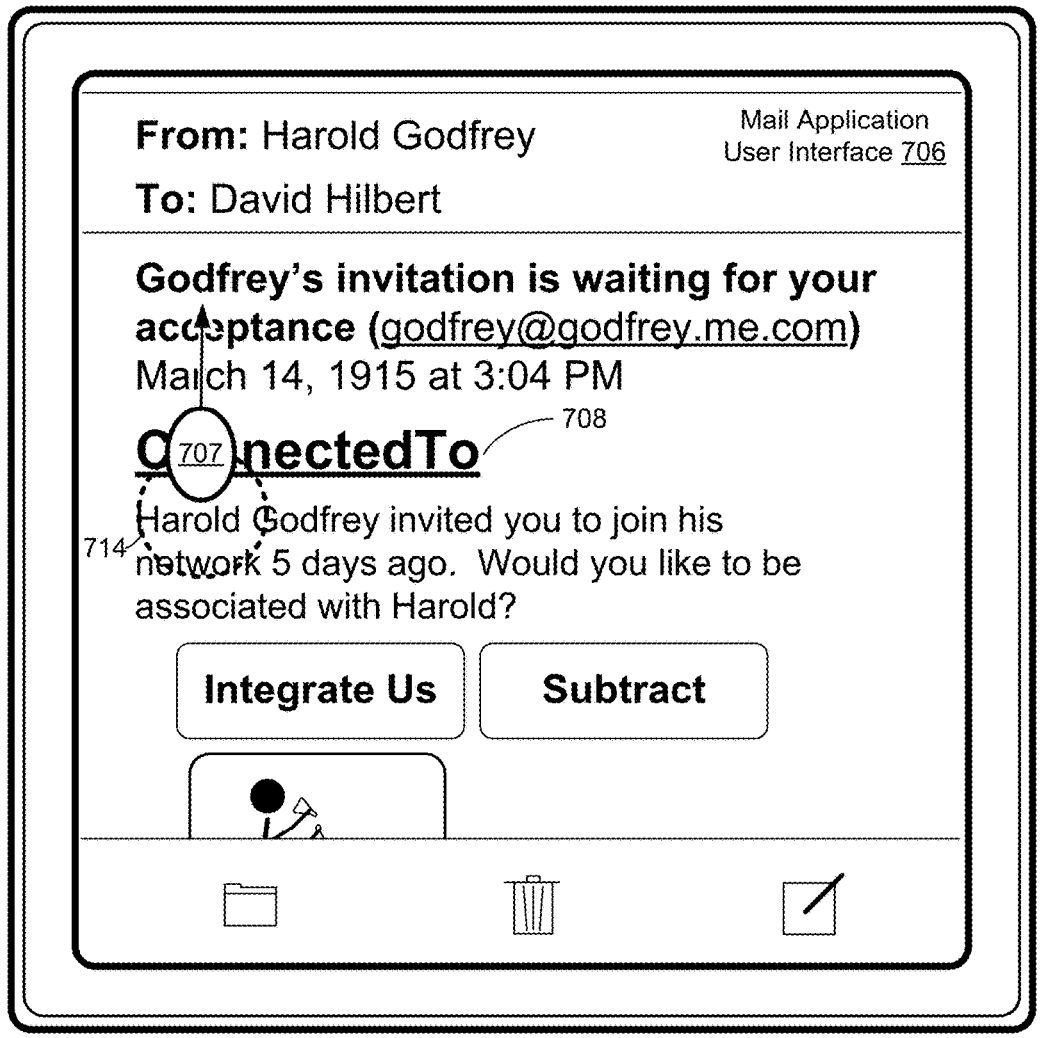
Figure 7G:
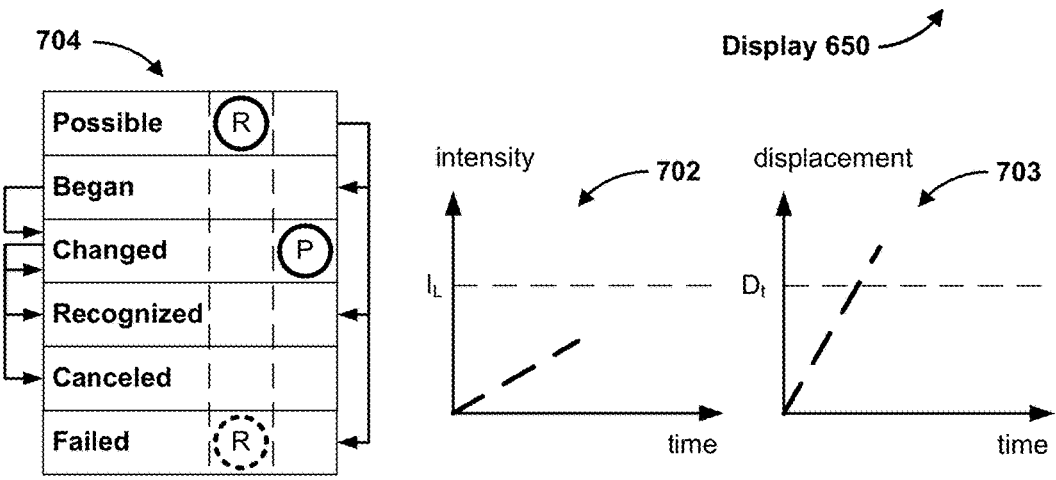

In FIG. 7G, the input continues to move across the touch-sensitive surface, as represented by further movement of focus selector 707. As shown in user input lateral displacement graph 703, the lateral displacement of the user input has changed from a lateral displacement shown in FIG. 7F (e.g., equal or approximately equal to the lateral displacement threshold $D_t$) to a lateral displacement above the lateral displacement threshold $D_t$. In response to this movement of the user input, the pan gesture recognizer (P) transitions to the Changed state. As a result, the graphical user interface 706 pans or scrolls by an amount corresponding to the distance moved by the input on the touch-sensitive surface.

In addition, as shown in user input intensity graph 702 of FIG. 7G, the intensity of the user input has increased from the intensity of the user input in FIG. 7F, but still does not satisfy the intensity threshold $I_L$. Thus, the reveal gesture recognizer (R) does not transition to the Began state (e.g., the reveal gesture recognizer (R) remains in the Possible state or the Failed state).

In FIGS. 7A-7C, the detected intensity of the user input is used for determining whether the user input satisfies the intensity threshold $I_L$. In FIGS. 7D-7G, the detected lateral displacement is used for determining whether the user input satisfies the lateral displacement threshold $D_t$. The use of adjusted intensity and/or adjusted lateral displacement is described below with respect to FIGS. 7H-7P and other subsequent figures.

Figure 7H:
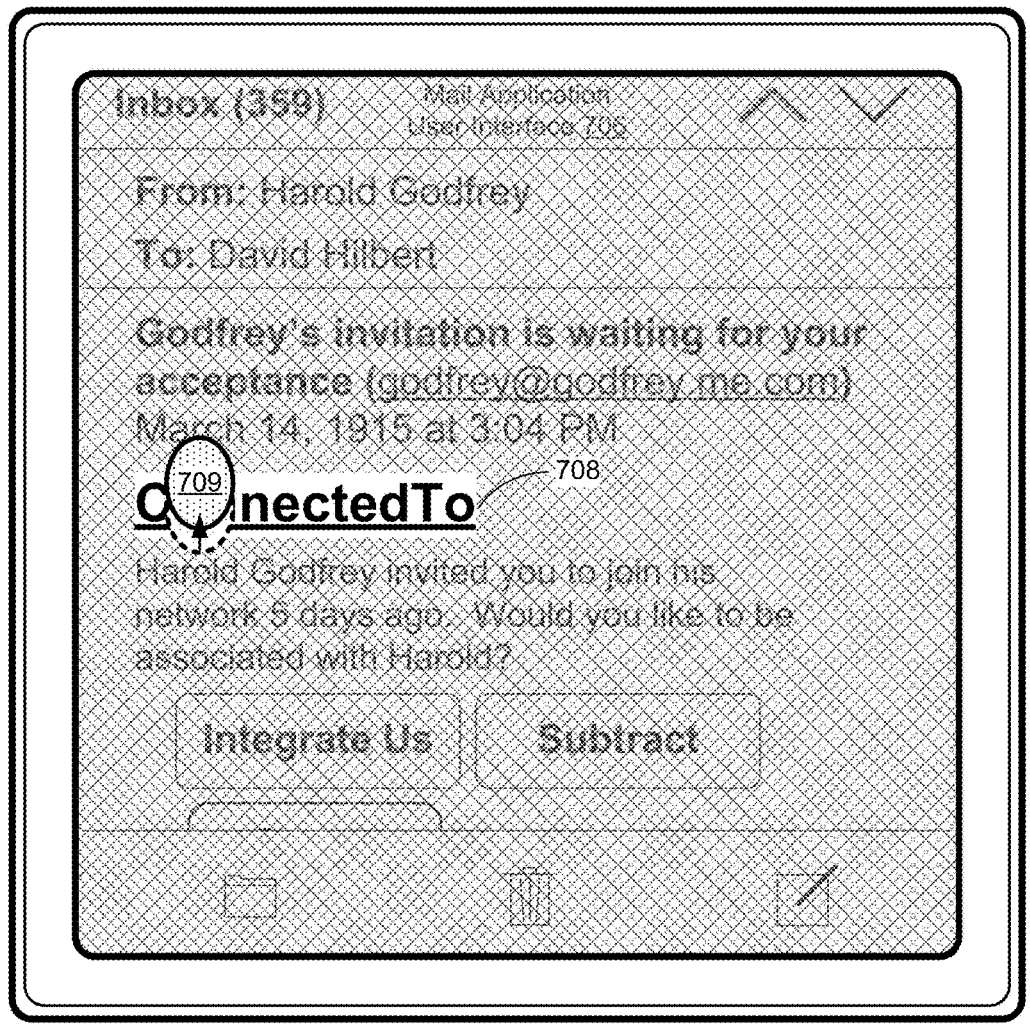
Figure 7H:
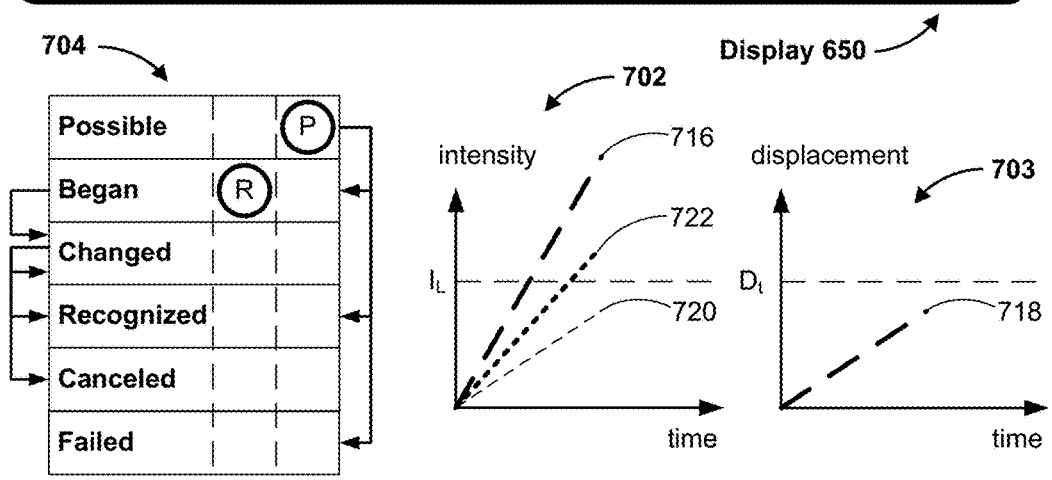

FIG. 7H illustrates adjustment of intensity based on lateral displacement, in accordance with some embodiments. In FIG. 7H, the set of active gesture recognizers includes a reveal gesture recognizer (R) and a pan gesture recognizer (P). An intensity threshold (e.g., intensity threshold $I_L$) is associated with the reveal gesture recognizer, and a lateral displacement threshold (e.g., lateral displacement threshold $D_t$) is associated with the pan gesture recognizer.

In FIG. 7H, focus selector 709 is positioned over a user interface object 708. The position of focus selector 709 corresponds to the position of a corresponding user input on a touch-sensitive surface (e.g., touch-sensitive surface 651 or a touch-sensitive surface of a touch-screen display 650 in FIG. 6B). The movement of the focus selector 709 from an initial contact position is indicated in FIG. 7H by a dashed line oval, corresponding to the initial contact position of the user input, and an arrow, positioned at least partially over user interface object 708. The dashed line oval and arrow are not actually displayed, and instead represent the initial contact position and subsequent displacement from the initial contact position.

As shown in user input intensity graph 702, adjusted intensity 722, instead of detected intensity 716 of the user input, is used for determining whether the user input satisfies the intensity threshold $I_L$.

In FIG. 7H, an adjusted intensity 722 of the user input is determined. Adjusted intensity 722 of the user input corresponds to detected intensity 716 of the user input reduced by first adjustment factor 720. In some embodiments, first adjustment factor 720 is based on detected lateral displacement 718 of the user input. In some embodiments, a magnitude of first adjustment factor 720 is proportional to a magnitude of detected lateral displacement 718 of the user input. In some embodiments, the magnitude of first adjustment factor 720 corresponds to magnitude of the detected lateral displacement 718 of the user input multiplied by a first conversion factor. In some embodiments, the first conversion factor is 50 g/mm.

As an illustrative example, the adjusted intensity may be determined according to the following equation:

$$I_{adj}=I_{det}-\alpha_1=I_{det}-R_1*D_{det}.$$

where $I_{adj}$ is the adjusted intensity, $I_{det}$ is the detected intensity, and $\alpha_1$ is the first adjustment factor. In this example, $R_1$ is the first conversion factor and $D_{det}$ is the detected lateral displacement, such that the first adjustment factor $\alpha_1$ corresponds to $R_1*D_{det}$.

In accordance with a determination that adjusted intensity 722 of the user input satisfies an intensity threshold (e.g., intensity threshold $I_L$), a first operation is performed. In particular, in some embodiments, in accordance with a determination that adjusted intensity 722 of the user input satisfies intensity input criteria for the reveal gesture recognizer (R), the reveal gesture recognizer transitions to the Began state, and, optionally, focus selector 709 is displayed, or provided for display, with a different appearance than when the reveal gesture recognizer is in the Possible state. Furthermore, user interface 706 is blurred, or transitions to a blur state, excluding the user interface object 708, corresponding to the initial contact position of the user input, which is not blurred.

Figure 7I:
Figure 7I:
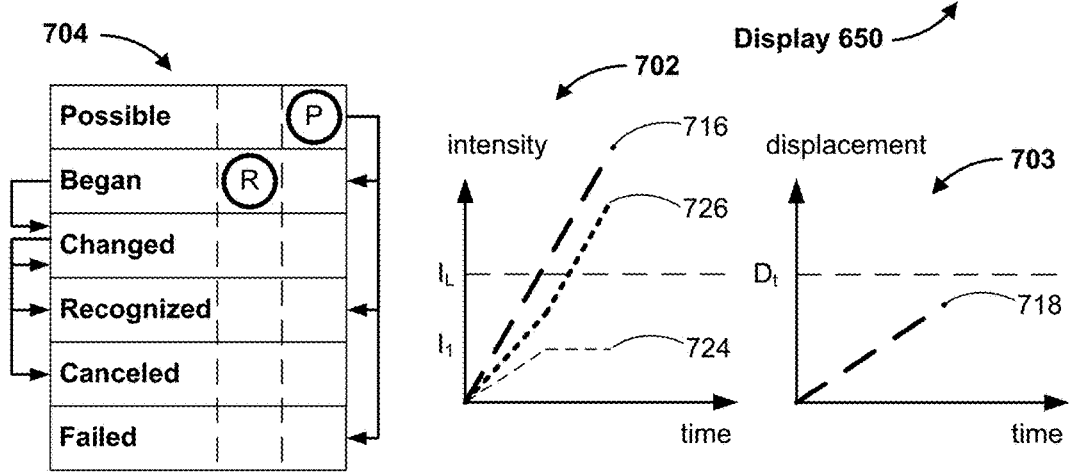

FIG. 7I illustrates adjustment of intensity based on lateral displacement, in accordance with some embodiments. In FIG. 7I, adjusted intensity 726 of the user input corresponds to detected intensity 716 of the user input reduced by first adjustment factor 724. In some embodiments, first adjustment factor 724 is based on detected lateral displacement 718 of the user input. In some embodiments, first adjustment factor 724 does not exceed a first value (e.g., $I_1$), as shown in user input intensity graph 702. As an illustrative example, the adjusted intensity may be determined in these embodiments according to the following equation:

$$I_{adj}=I_{det}-\alpha_1=I_{det}-\min(R_1*D_{det},I_1),$$

where $I_{adj}$ is the adjusted intensity, $I_{det}$ is the detected intensity, $D_{det}$ is the detected lateral displacement, and $I_1$ is the first value. Thus, in this example, the first adjustment factor $\alpha_1$ corresponds to the lesser of $R_1*D_{det}$ and $I_1$, such that the first adjustment factor $\alpha_1$ does not exceed the first value $I_1$. In some embodiments, the first value is 100 g.

Furthermore, as described above with respect to FIG. 7H, in accordance with a determination that adjusted intensity 726 of the user input satisfies an intensity threshold (e.g., intensity threshold $I_L$), a first operation is performed. For example, in accordance with a determination that the adjusted intensity 726 of the user input satisfies intensity input criteria for the reveal gesture recognizer (R), the reveal gesture recognizer transitions to the Began state, and, optionally, focus selector 709 is displayed with a different appearance and/or user interface 706 is blurred.

Figure 7J:
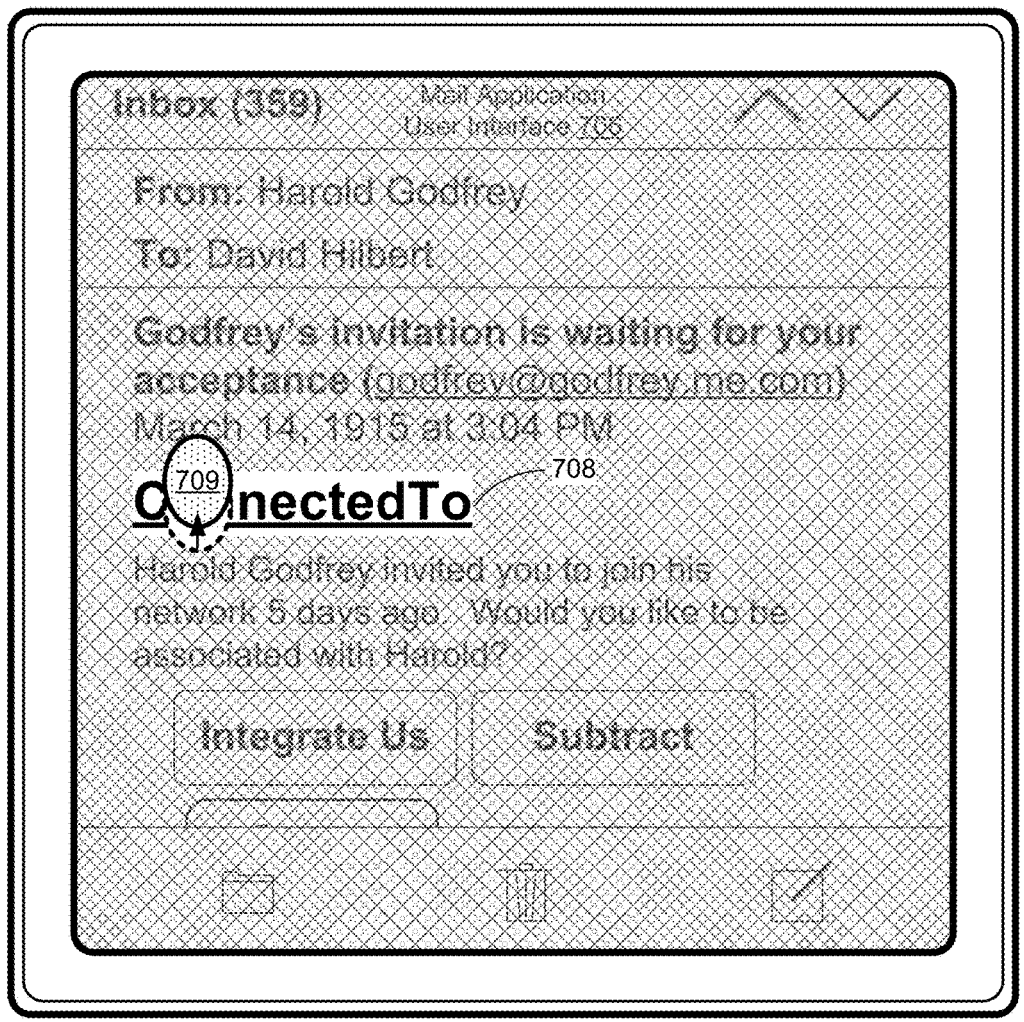
Figure 7J:
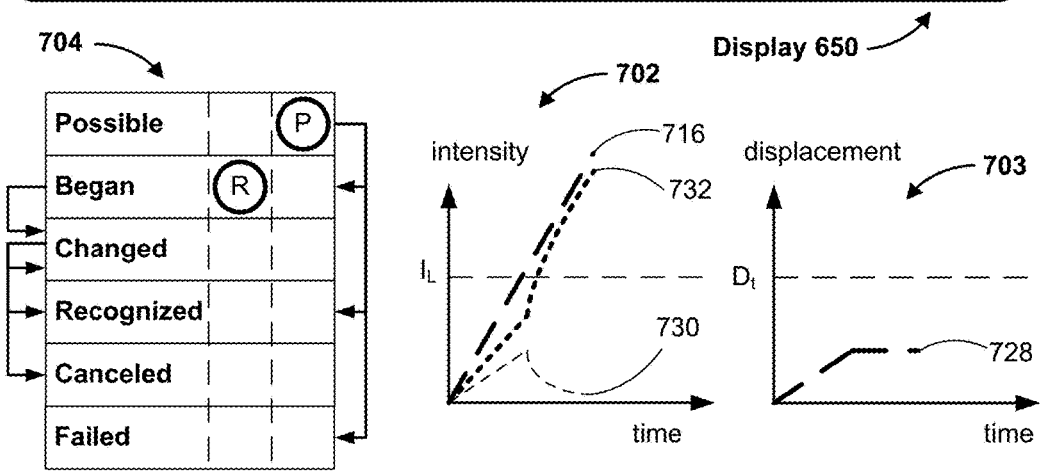

FIG. 7J illustrates adjustment of intensity based on lateral displacement, in accordance with some embodiments. In FIG. 7J, adjusted intensity 732 of the user input corresponds to detected intensity 716 of the user input reduced by first adjustment factor 730. In some embodiments, first adjustment factor 730 is based on detected lateral displacement 728 of the user input. In some embodiments, first adjustment factor 730 includes a decay factor that decreases over time at a rate that is independent of a movement of the user input. For example, as shown in user input intensity graph 702, first adjustment factor 730 decays over time even when detected lateral displacement 728 of the user input does not change. In some embodiments, the first adjustment factor decays over time with a time constant that is independent of the detected lateral displacement of the user input.

As an illustrative example, the adjusted intensity may be determined in these embodiments according to the following equation:

$$I_{adj}=I_{det}-\alpha_1=I_{det}-R_1*D_{det}*\min(1,e^{-k(t-\tau_p)}),$$

where $I_{adj}$ is the adjusted intensity, bet is the detected intensity, and $D_{det}$ is the detected lateral displacement. In this example, the first adjustment factor $\alpha_1$ includes a decay factor that decays over time t with a time constant k. In some embodiments, the first adjustment factor $\alpha_1$ begins to decay over time at time $\tau_p$. In some embodiments, the time $\tau_p$ corresponds to when the detected displacement of the user input ceases to increase (or when the detected displacement of the user input does not increase by more than a predefined threshold), as shown in user input intensity graph 702). In some embodiments, the time $\tau_p$ is predefined.

Figure 7K:
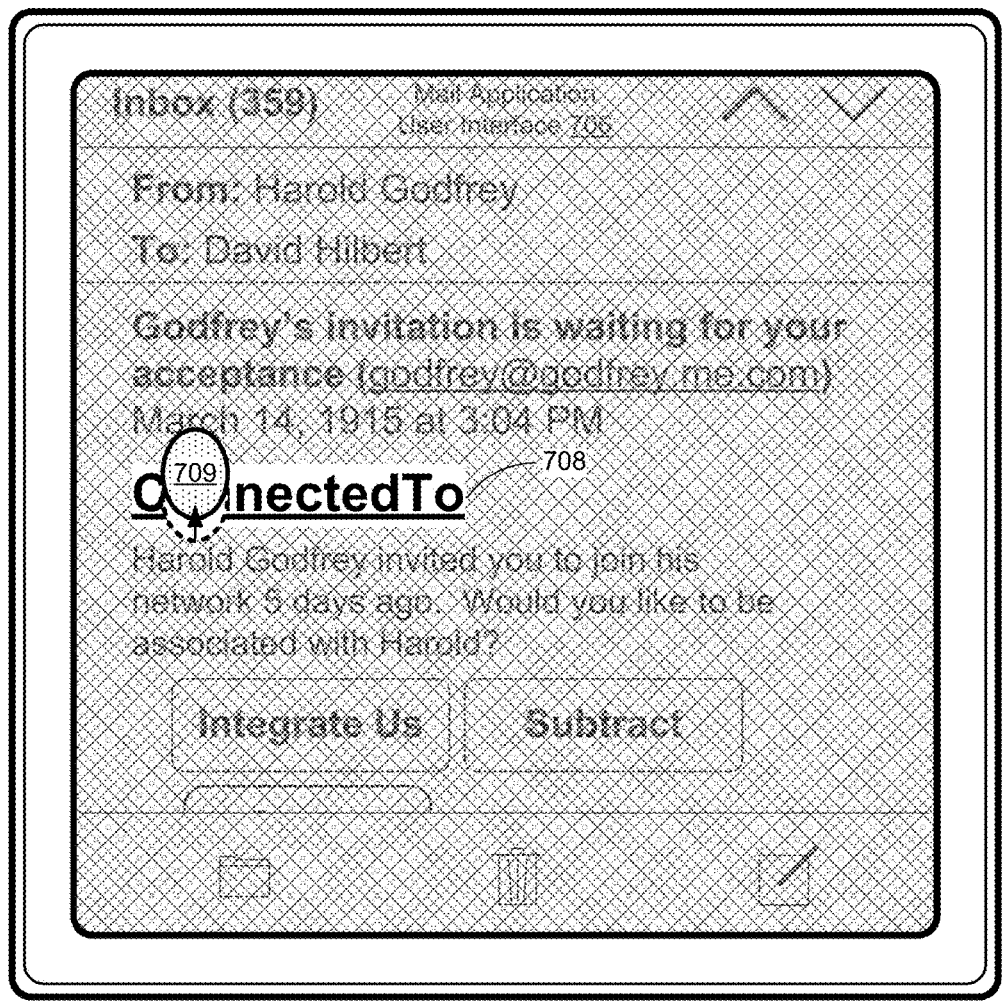
Figure 7K:
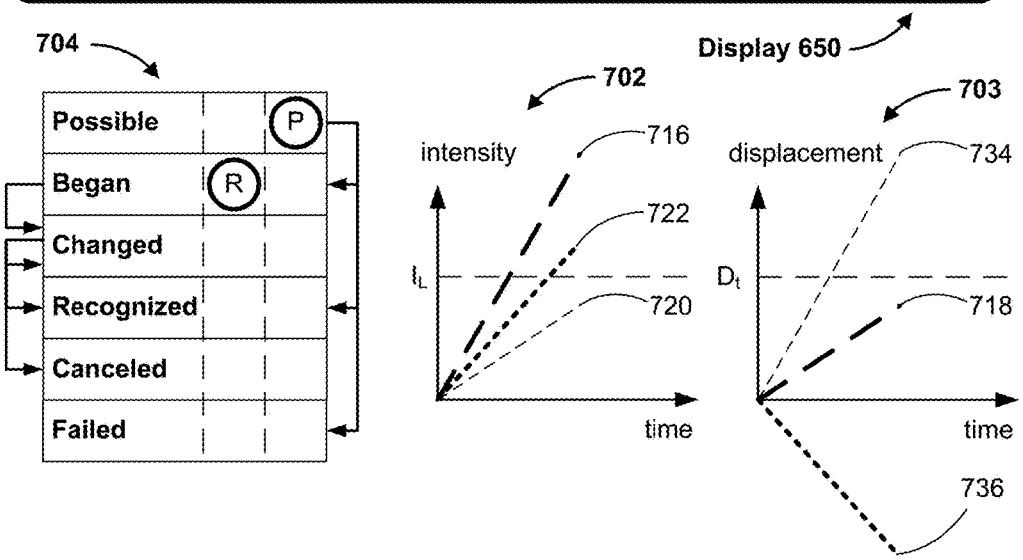

FIG. 7K illustrates adjustment of both intensity and lateral displacement, in accordance with some embodiments. In FIG. 7K, detected intensity of a user input is adjusted based on detected lateral displacement of the user input and the detected lateral displacement of the user input is adjusted based on the detected intensity of the user input. In FIG. 7K, adjusted intensity 722 of the user input is determined with respect to detected intensity 716 of the user input and first adjustment factor 720, as described above with respect to FIG. 7H.

In addition, adjusted lateral displacement 736 of the user input corresponds to detected lateral displacement 718 of the user input reduced by second adjustment factor 734. In some embodiments, second adjustment factor 734 is based on detected intensity 716 of the user input. In some embodiments, a magnitude of second adjustment factor 734 is proportional to a magnitude of detected intensity 716 of the user input. In some embodiments, the magnitude of second adjustment factor 734 corresponds to the magnitude of detected intensity 716 of the user input multiplied by a second conversion factor. In some embodiments, the second conversion factor is 0.02 mm/g.

In some embodiments represented by FIG. 7K, adjusted intensity 722 of the user input satisfies the intensity threshold $I_L$. As described above with respect to FIG. 7H, in accordance with a determination that adjusted intensity 722 of the user input satisfies an intensity threshold (e.g., intensity threshold $I_L$), a first operation is performed. For example, in accordance with a determination that adjusted intensity 722 of the user input satisfies intensity input criteria for the reveal gesture recognizer (R), the reveal gesture recognizer transitions to the Began state, and, optionally, focus selector 709 is displayed with a different appearance and/or user interface 706 is blurred. In FIG. 7K, adjusted lateral displacement 736 of the user input does not satisfy the lateral displacement threshold $D_t$, such that the pan gesture recognizer (P) does not transition to the Began state.

Figure 7L:
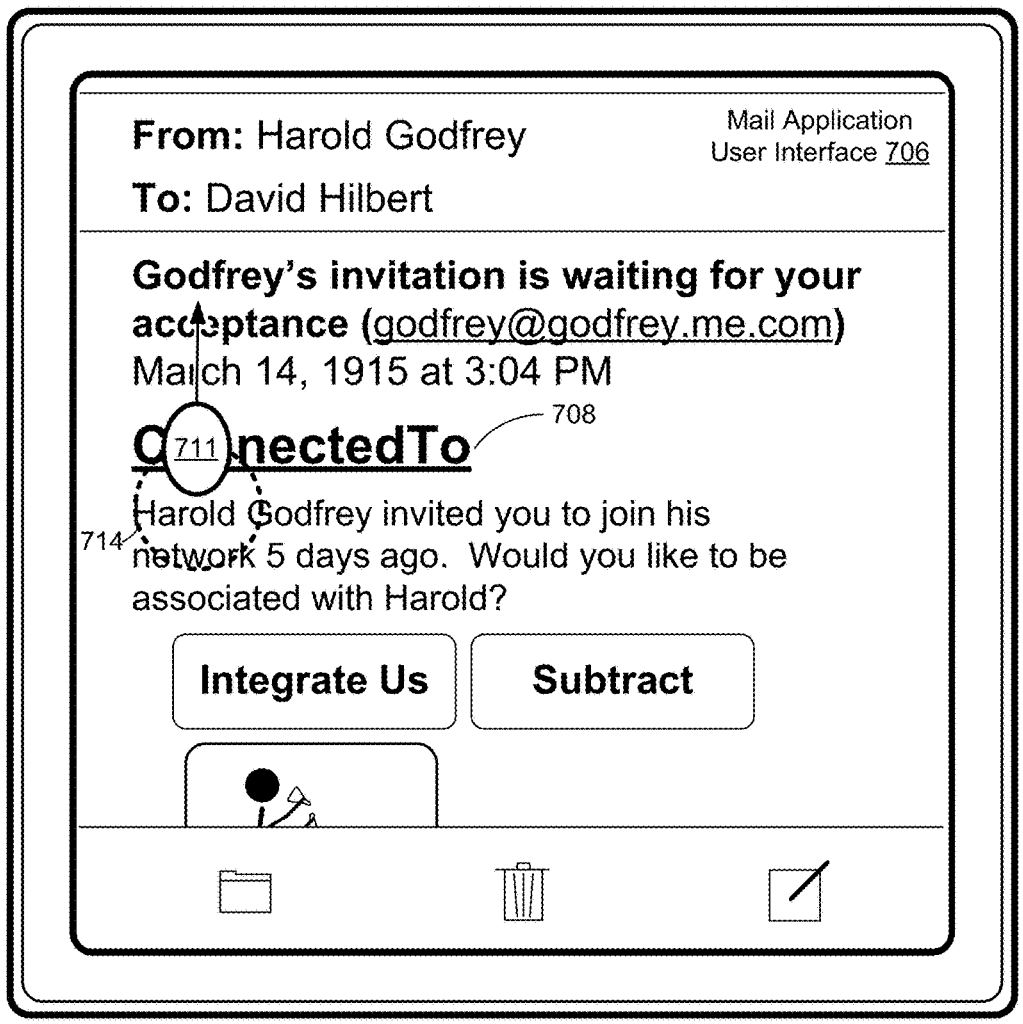
Figure 7L:
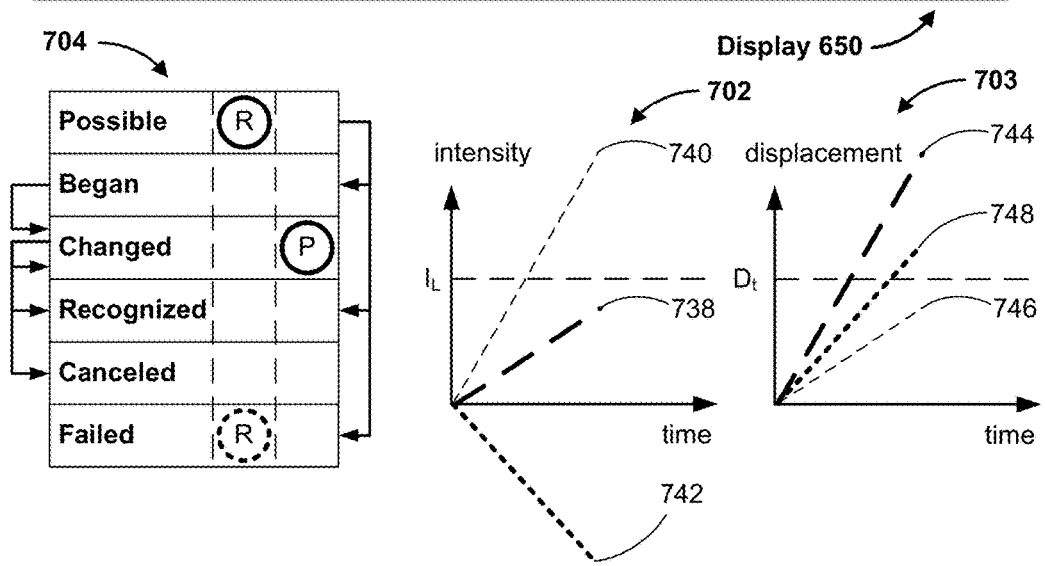

FIG. 7L illustrates adjustment of both intensity and lateral displacement, in accordance with some embodiments. As described above with respect to FIG. 7K, in FIG. 7L, detected intensity of a user input is adjusted based on detected lateral displacement of the user input and the detected lateral displacement of the user input is adjusted based on the detected intensity of the user input. In FIG. 7L, adjusted lateral displacement 748 of the user input is determined with respect to detected lateral displacement 744 of the user input and second adjustment factor 746, as described above with respect to FIG. 7K. In addition, adjusted intensity 742 of the user input is determined with respect to detected intensity 738 of the user input and first adjustment factor 740, as described above with respect to FIG. 7H.

In accordance with a determination that adjusted lateral displacement 748 of the user input satisfies a lateral displacement threshold (e.g., lateral displacement threshold $D_t$), a second operation that is distinct from the first operation is performed. In some embodiments, the second operation includes scrolling at least a portion of the user interface 706. In particular, in some embodiments represented by FIG. 7L, the user input has moved across the touch-sensitive surface by at least a predefined distance (e.g., at least partially past input movement limit perimeter 714), and adjusted lateral displacement 748 of the user input satisfies the lateral displacement threshold $D_t$. In response to this movement of the user input, the pan gesture recognizer (P) transitions to the Changed state, as described above with respect to FIG. 7G. As a result, graphical user interface 706 pans or scrolls by an amount corresponding to the distance moved by the input on the touch-sensitive surface. In addition, in FIG. 7L, the adjusted intensity 742 of the user input does not satisfy the intensity threshold $I_L$, such that the reveal gesture recognizer (R) does not transition to the Began state. In some embodiments, in response to the pan gesture recognizer (P) transitioning to the Began state, the reveal gesture recognizer (R) transitions to a Failed state (due to the competition between the pan gesture recognizer (P) and the reveal gesture recognizer (R)), and remains in the Failed state until the reveal gesture recognizer is reset (to the Possible state).

Figure 7M:
Figure 7M:
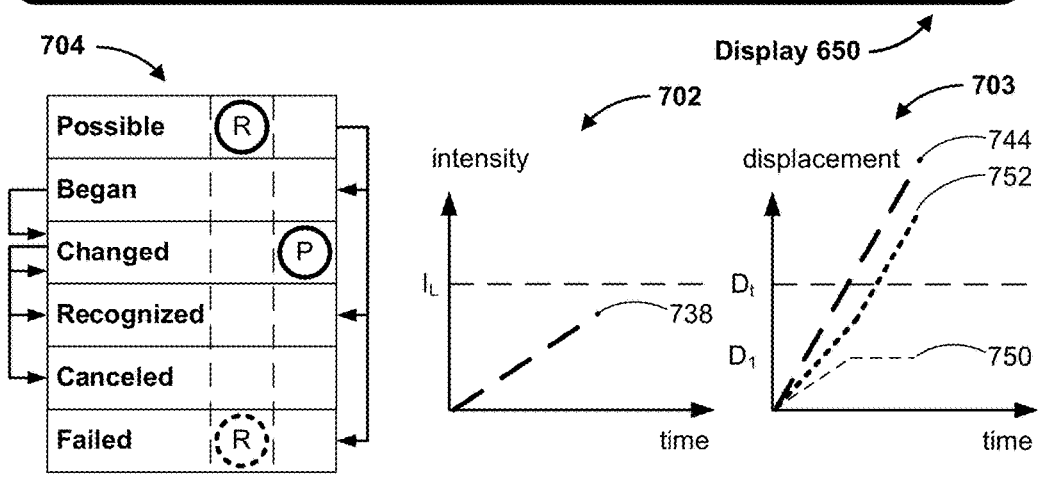

FIG. 7M illustrates adjustment of lateral displacement based on detected intensity, in accordance with some embodiments. In FIG. 7M, adjusted lateral displacement 752 of the user input is determined, wherein adjusted lateral displacement 752 of the user input corresponds to detected lateral displacement 744 of the user input reduced by adjustment factor 750. In some embodiments, adjustment factor 750 is based on detected intensity 738 of the user input. In some embodiments, adjustment factor 750 does not exceed a second value (e.g., $D_1$), as shown in user input lateral displacement graph 703. In some embodiments, the second value is distinct from the first value (e.g., the first value $I_1$, as shown in user input intensity graph 702 of FIG. 7I). For example, an exemplary first value is 100 g, and an exemplary second value is 2 mm.

In some embodiments, the second value is 2 mm. Furthermore, as described above with respect to FIG. 7L, in accordance with a determination that adjusted lateral displacement 752 of the user input satisfies a lateral displacement threshold (e.g., lateral displacement threshold $D_t$), a second operation is performed, such as scrolling at least a portion of the user interface 706.

Although not shown in FIG. 7M, in some embodiments, an adjusted intensity is determined based on the detected lateral displacement 744 of the user input, as shown in user input intensity graph 702 of FIG. 7L.

Figure 7N:
Figure 7N:
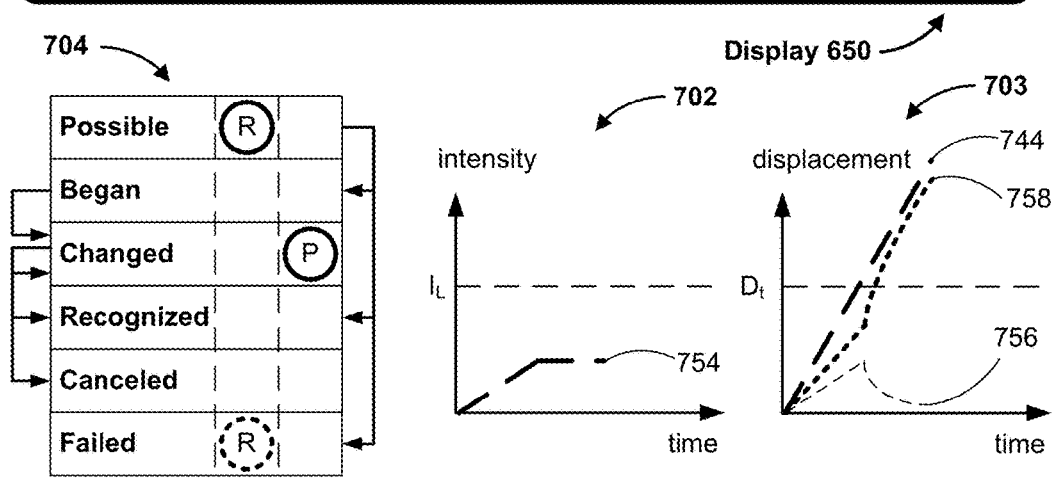

FIG. 7N illustrates adjustment of lateral displacement based on intensity, in accordance with some embodiments. In FIG. 7N, adjusted lateral displacement 758 of the user input is determined. Adjusted lateral displacement 758 of the user input corresponds to detected lateral displacement 744 of the user input reduced by second adjustment factor 756. In some embodiments, second adjustment factor 756 is based on detected intensity 754 of the user input. In some embodiments, second adjustment factor 756 includes a decay factor that decreases over time at a rate that is independent of an intensity of the user input. For example, as shown in user input lateral displacement graph 703, second adjustment factor 756 decays over time even when detected intensity 754 of the input does not change. In some embodiments, second adjustment factor 756 decays over time with a time constant that is independent of the detected intensity of the input.

Although not shown in FIG. 7N, in some embodiments, an adjusted intensity is determined based on detected lateral displacement 744 of the user input, as described above with respect to FIGS. 7H-7J.

Figure 7O:
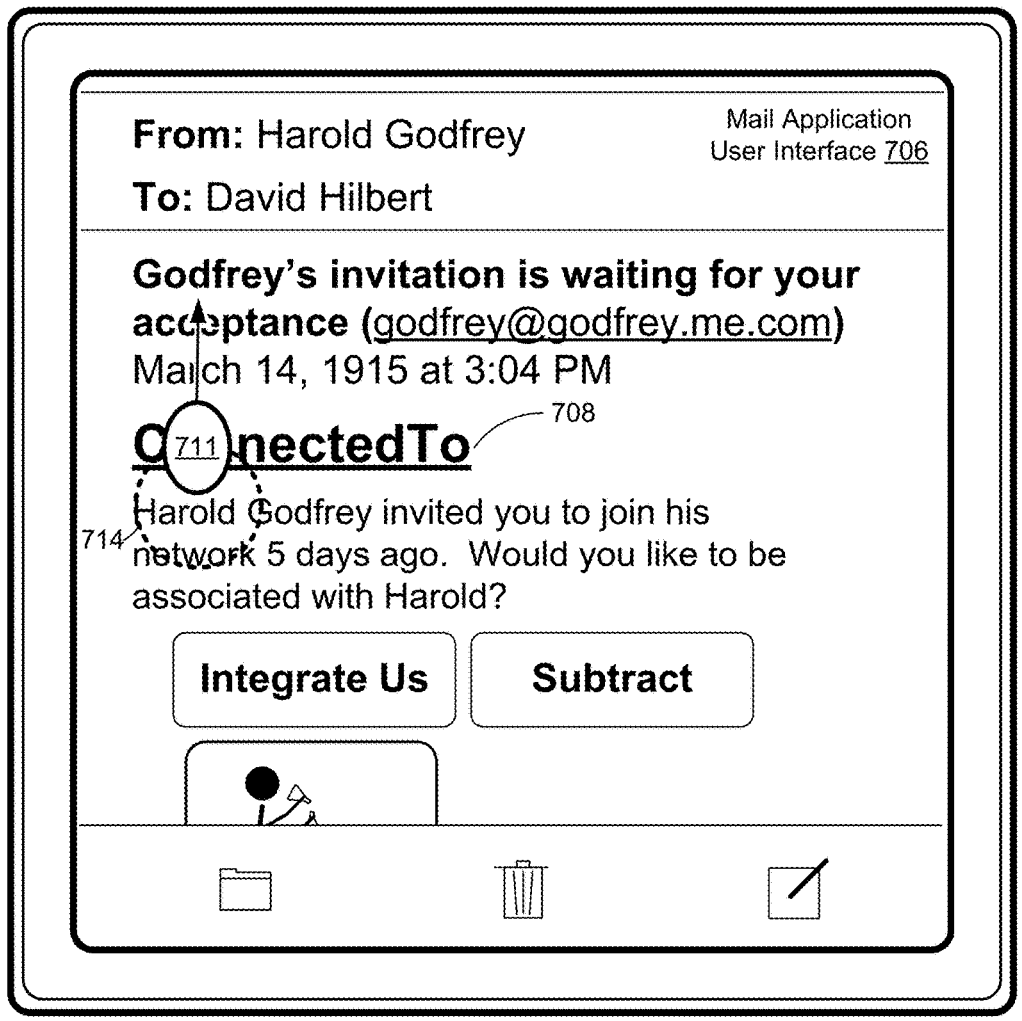
Figure 7O:
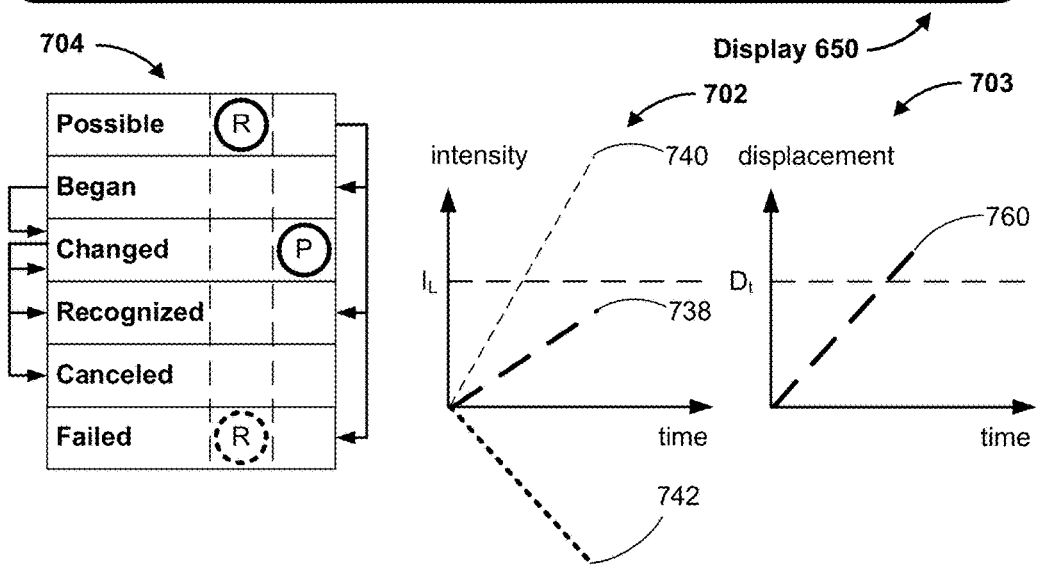

FIG. 7O illustrates adjustment of intensity based on lateral displacement, in accordance with some embodiments. In FIG. 7O, adjusted intensity 742 of the user input is determined with respect to detected intensity 738 of the user input and first adjustment factor 740, as described above with respect to FIG. 7L. In FIG. 7O, detected lateral displacement 760 of the user input is used for determining whether the user input satisfies the lateral displacement threshold $D_t$ (e.g., the adjusted lateral displacement is not determined or not used for determining whether the user input satisfies the lateral displacement threshold).

In accordance with a determination that detected lateral displacement 760 of the user input satisfies a lateral displacement threshold (e.g., lateral displacement threshold $D_t$), a third operation that is distinct from the first operation is performed. In some embodiments, the third operation is identical to the second operation (e.g., a second operation such as scrolling at least a portion of user interface 706, as described above with respect to FIGS. 7L and 7M). In some embodiments, the third operation is distinct from the second operation. An exemplary third operation includes manipulating a user interface object (e.g., resizing the user interface object) without scrolling user interface 706.

Figure 7P:
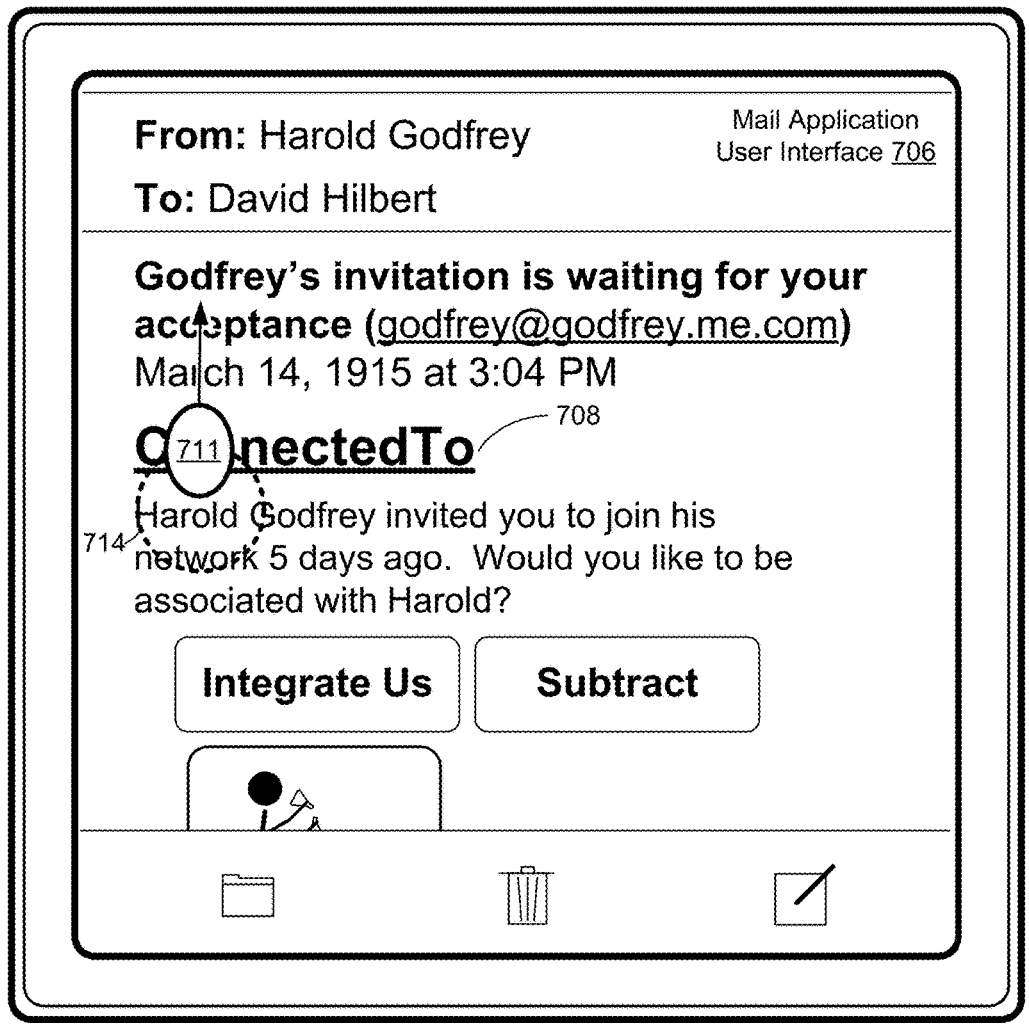
Figure 7P:
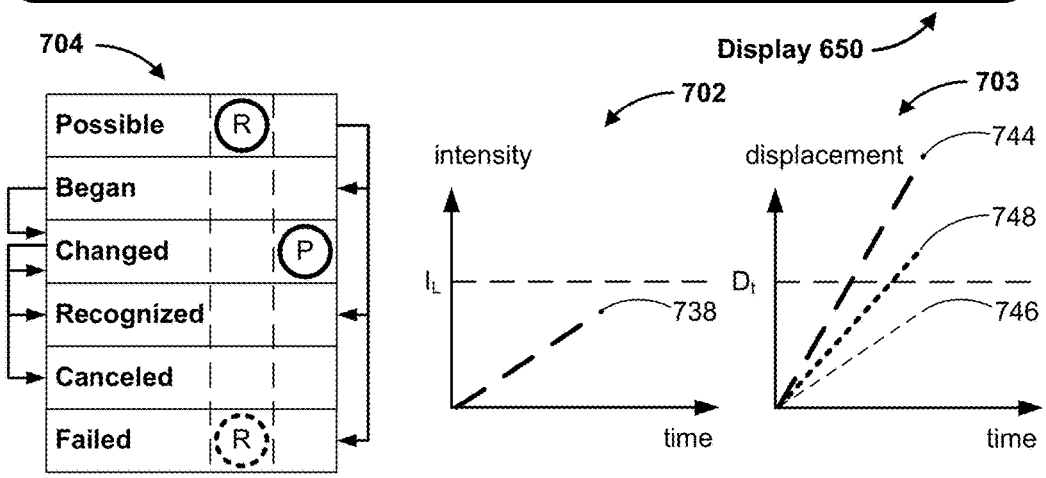

FIG. 7P illustrates adjustment of lateral displacement based on intensity, in accordance with some embodiments. In FIG. 7P, adjusted lateral displacement 748 of the user input is determined, wherein adjusted lateral displacement 748 of the user input corresponds to detected lateral displacement 744 of the user input reduced by adjustment factor 746 (also called herein the second adjustment factor). In some embodiments, adjustment factor 746 is based on detected intensity 738 of the user input. In some embodiments, a magnitude of adjustment factor 746 is proportional to a magnitude of the detected intensity 738 of the user input. In some embodiments, the magnitude of the adjustment factor 746 corresponds to the magnitude of detected intensity 738 of the user input multiplied by a conversion factor. In FIG. 7P, detected intensity 738 of the user input is used for determining whether the user input satisfies the intensity threshold $I_L$ (e.g., the adjusted intensity is not determined or not used for determining whether the user input satisfies the intensity threshold).

In accordance with a determination that adjusted lateral displacement 748 of the user input satisfies a lateral displacement threshold (e.g., lateral displacement threshold $D_t$), a fourth operation is performed. In some embodiments, the fourth operation is identical to the second operation or the third operation (or both, if the second operation and the third operation are identical to each other). In some embodiments, the fourth operation is distinct from the second and third operations.

Figure 7Q:
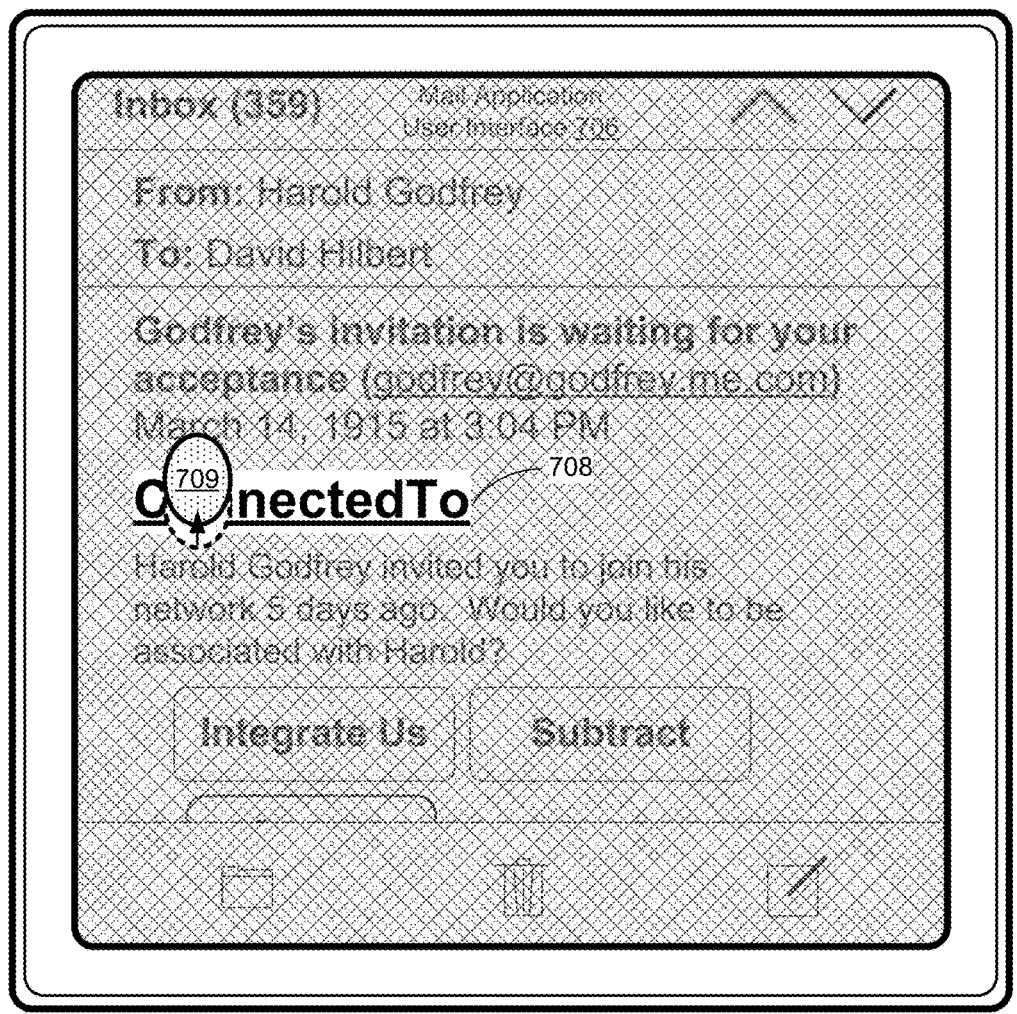
Figure 7Q:
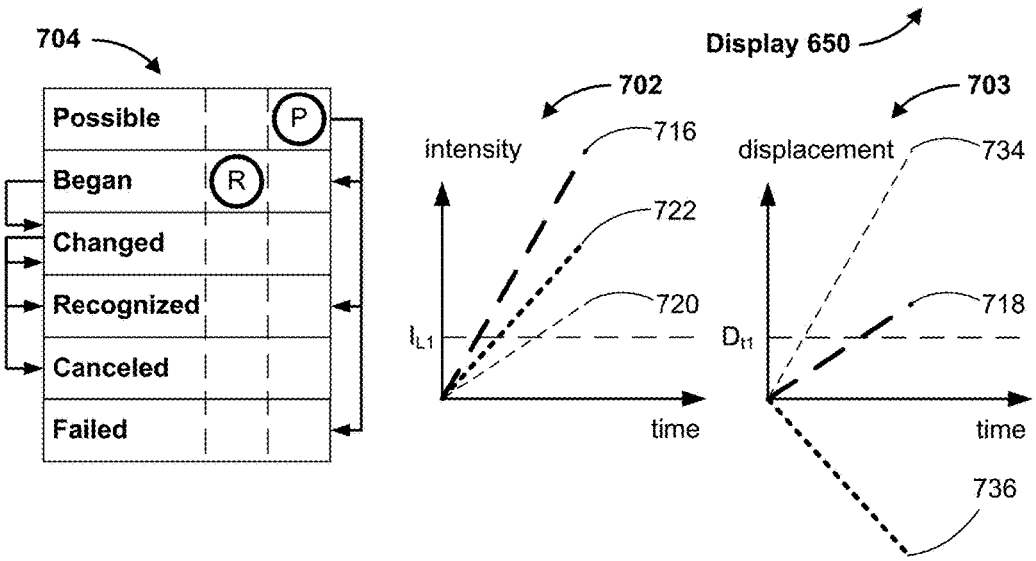

In FIGS. 7A-7P, that the same intensity threshold $I_L$ is used for the detected intensity (when the detected intensity is used to determine whether the input satisfies intensity input criteria is made) and the adjusted intensity (when the adjusted intensity is used to determine whether the input satisfies the intensity input criteria). However, because the methods describe above provide a more robust way to disambiguate a light press input and a pan gesture input, in some embodiments, an intensity threshold $IL_1$ that is lower than the intensity threshold $I_L$ (used when the detected intensity is used to determine whether the input satisfies the intensity input criteria) is used when the adjusted intensity is used to determine whether the input satisfies intensity input criteria (e.g., see FIG. 7Q). This allows a faster determination of whether the input is a light press input or not, thereby making the user interface more responsive to the input. In addition, because the methods described herein do not utilize time-based criteria (e.g., a time interval requirement), the user interface can respond more rapidly to the input.

Figure 7R:
Figure 7R:
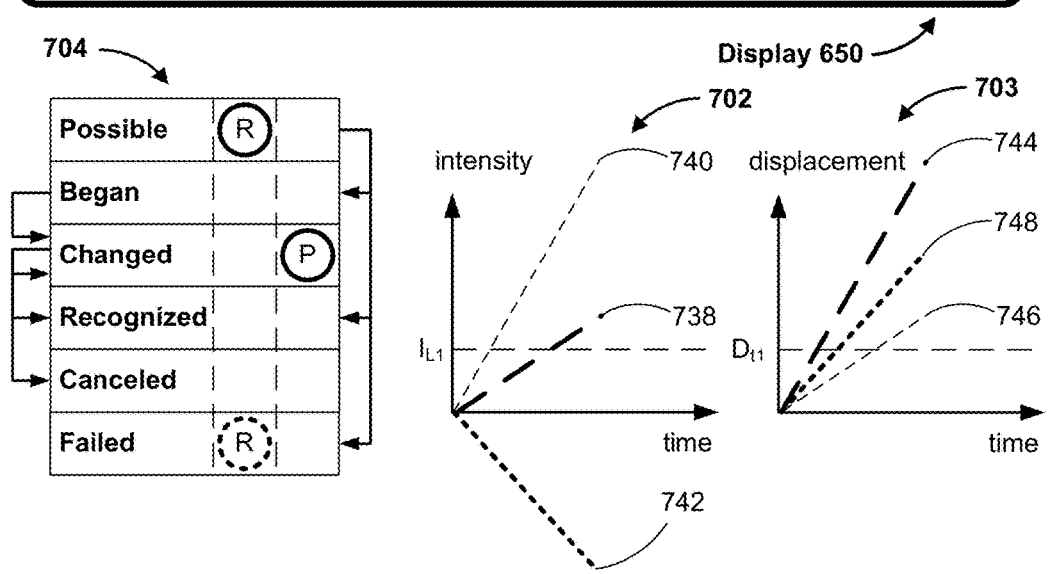

Similarly, a lateral displacement threshold $D_{t1}$ that is lower than the lateral displacement threshold $D_t$ (used when the detected lateral displacement is used to determine whether the input satisfies the lateral displacement criteria) is used when the adjusted lateral displacement is used to determine whether the input satisfies lateral displacement criteria (e.g., see FIG. 7R). This allows a faster determination of whether the input is a pan gesture input or not, thereby making the user interface more responsive to the input. In addition, because the methods described herein do not utilize time-based criteria (e.g., a time interval requirement), the user interface can respond more rapidly to the input.

Figure 7S:
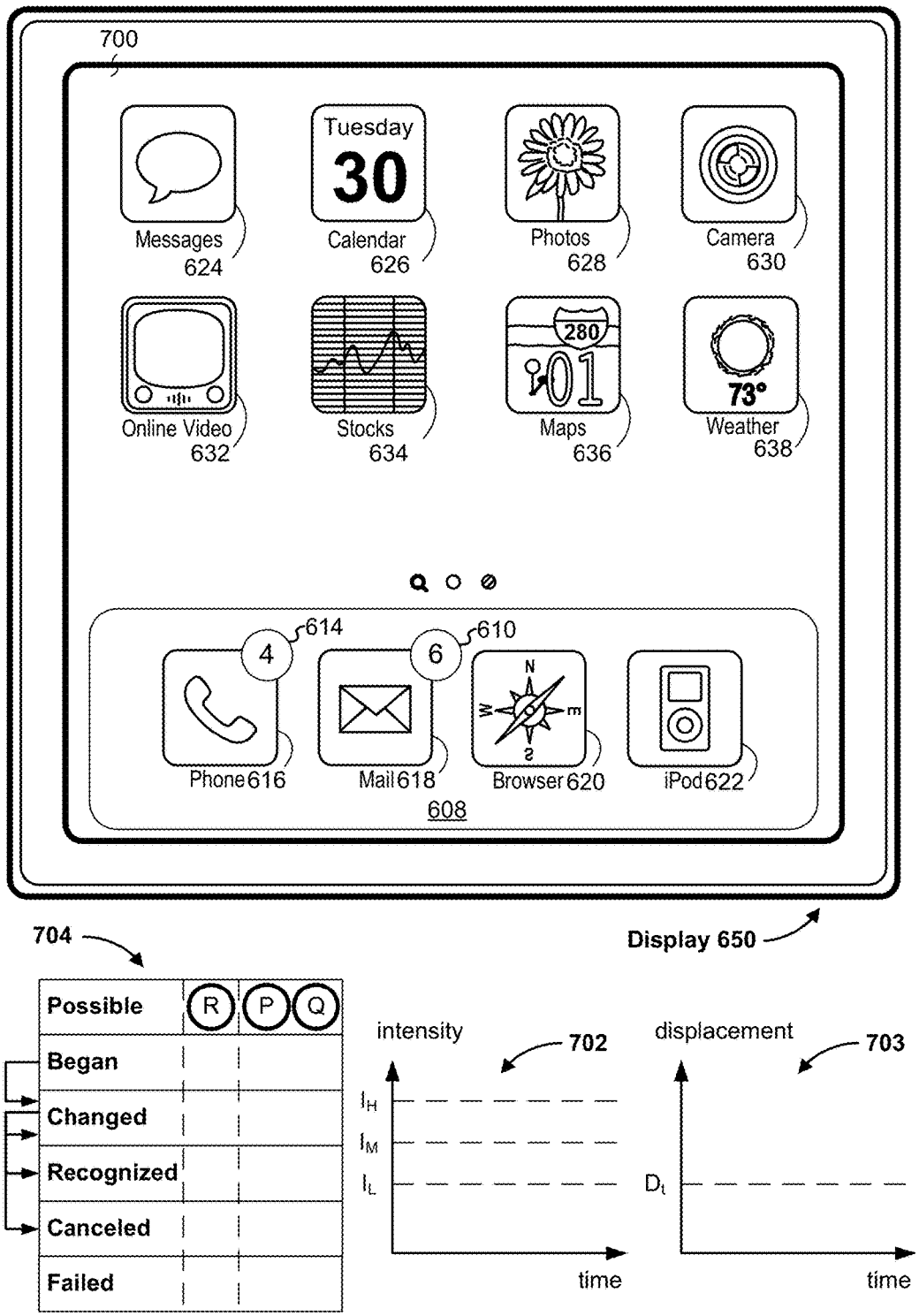

Although FIGS. 7A-7R illustrate intensity threshold $I_L$, the described operations can be performed with respect to a second intensity threshold $I_M$, a third intensity threshold $I_H$, or another intensity threshold that is distinct from the first intensity threshold $I_L$, the second intensity threshold $I_M$, or the third intensity threshold $I_H$, as shown in FIGS. 7S-7CC.

FIGS. 7S-7W illustrate an increase in the intensity of the user input without a lateral displacement of the user input in accordance with some embodiments. In FIGS. 7S-7W, because the user input has no lateral displacement, the detected intensity and the adjusted intensity are the same.

FIG. 7S also illustrates state machines 704 for gesture recognizers. In this example, state machines 704 for three gesture recognizers are shown. In addition to a reveal gesture recognizer (R) and a pan gesture recognizer (P), state machines 704 also include a quick action menu gesture recognizer (Q).

FIG. 7S illustrates that the three gesture recognizers are in the Possible state, when no user input is detected.

Figure 7T:
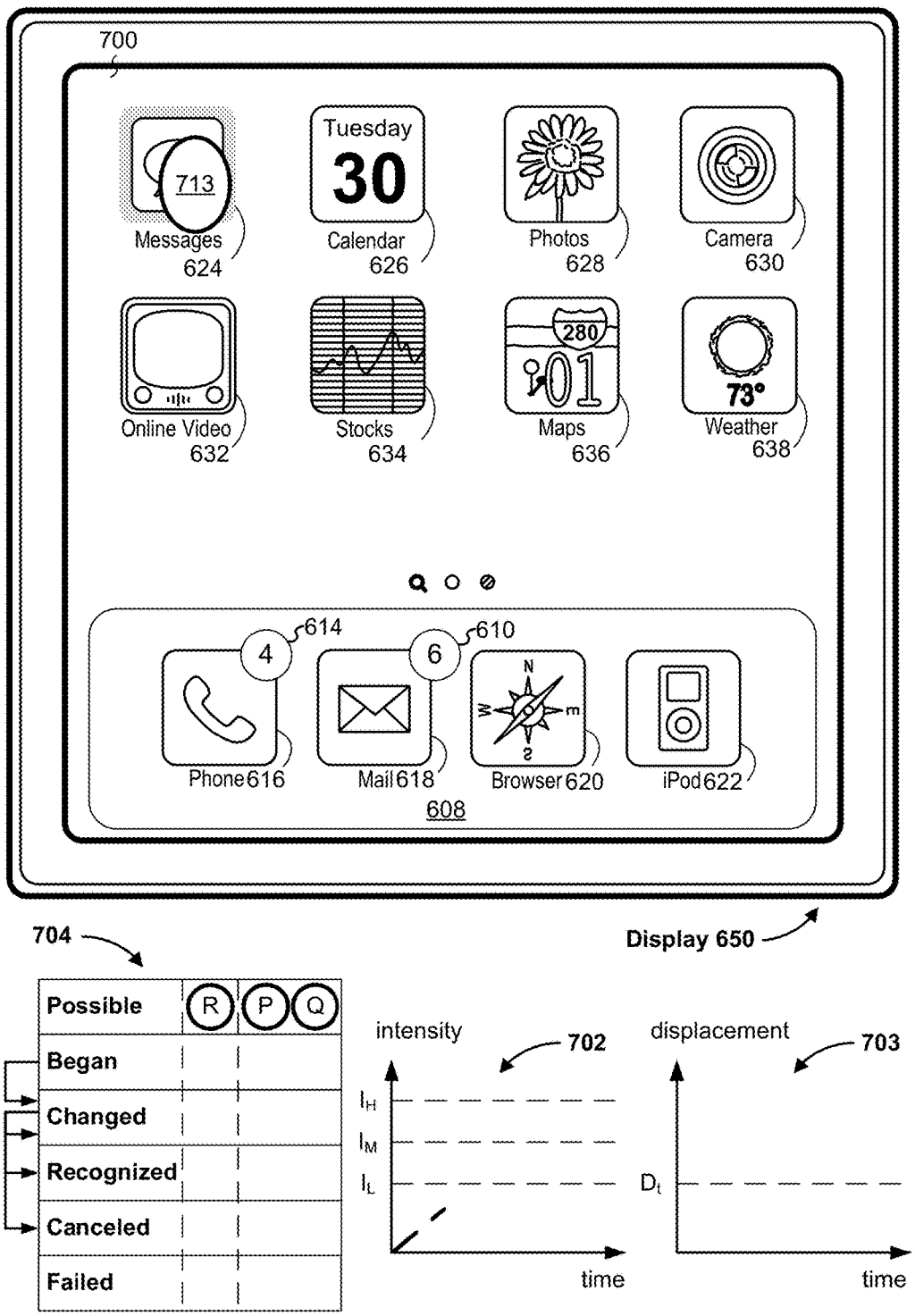

FIG. 7T shows the position of focus selector 713 positioned over user interface object 624 or feature in user interface 700. The position of focus selector 713 corresponds to the position of a corresponding user input on a touch-sensitive surface (e.g., touch-sensitive surface 651 or a touch-sensitive surface of touch-screen display 650, FIG. 6B).

As shown in user input intensity graph 702 in FIG. 7T, the intensity of the user input is initially below the intensity threshold $I_L$.

Figure 7U:
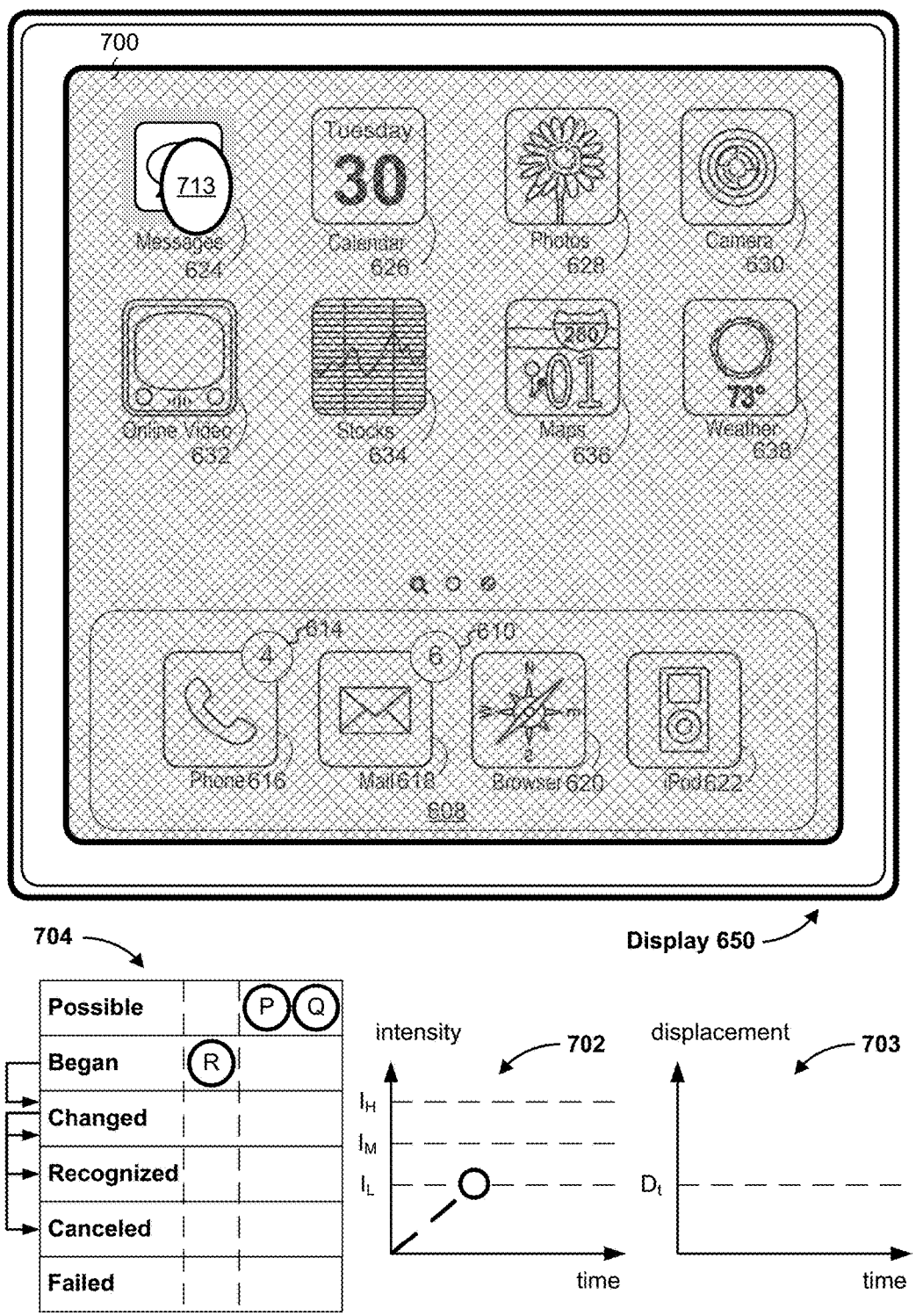

FIG. 7U illustrates a transition of user interface from the state of that user interface in FIG. 7T. In particular, in accordance with a determination that the intensity of the user input (e.g., the detected intensity or the adjusted intensity) satisfies intensity input criteria for the reveal gesture recognizer (R), the reveal gesture recognizer transitions to the Began state. In some embodiments, the intensity of the user input satisfies intensity input criteria for the reveal gesture recognizer (R) when the intensity of the user input reaches the intensity threshold $I_L$. In some embodiments, the intensity of the user input satisfies intensity input criteria for the reveal gesture recognizer (R) when the intensity of the user input exceeds the intensity threshold $I_L$. Alternatively, in some embodiments, a reduced intensity threshold $I_{L1}$ is used (e.g., the intensity of the user input satisfies intensity input criteria for the reveal gesture recognizer (R) when the intensity of the user input reaches or exceeds the reduced intensity threshold $I_{L1}$).

As explained above, in some embodiments, when the reveal gesture recognizer transitions to the Began state, focus selector 713 is displayed, or provided for display, with a different appearance than when the reveal gesture recognizer is in the Possible state. Furthermore, user interface 700 is blurred, or transitions to a blur state, excluding user interface object 624, corresponding to the position of the user input, which is not blurred. In this way, the user is notified that an action or operation with respect to user interface object 624 will occur if the user continues to increase the intensity of the user input.

Figure 7V:
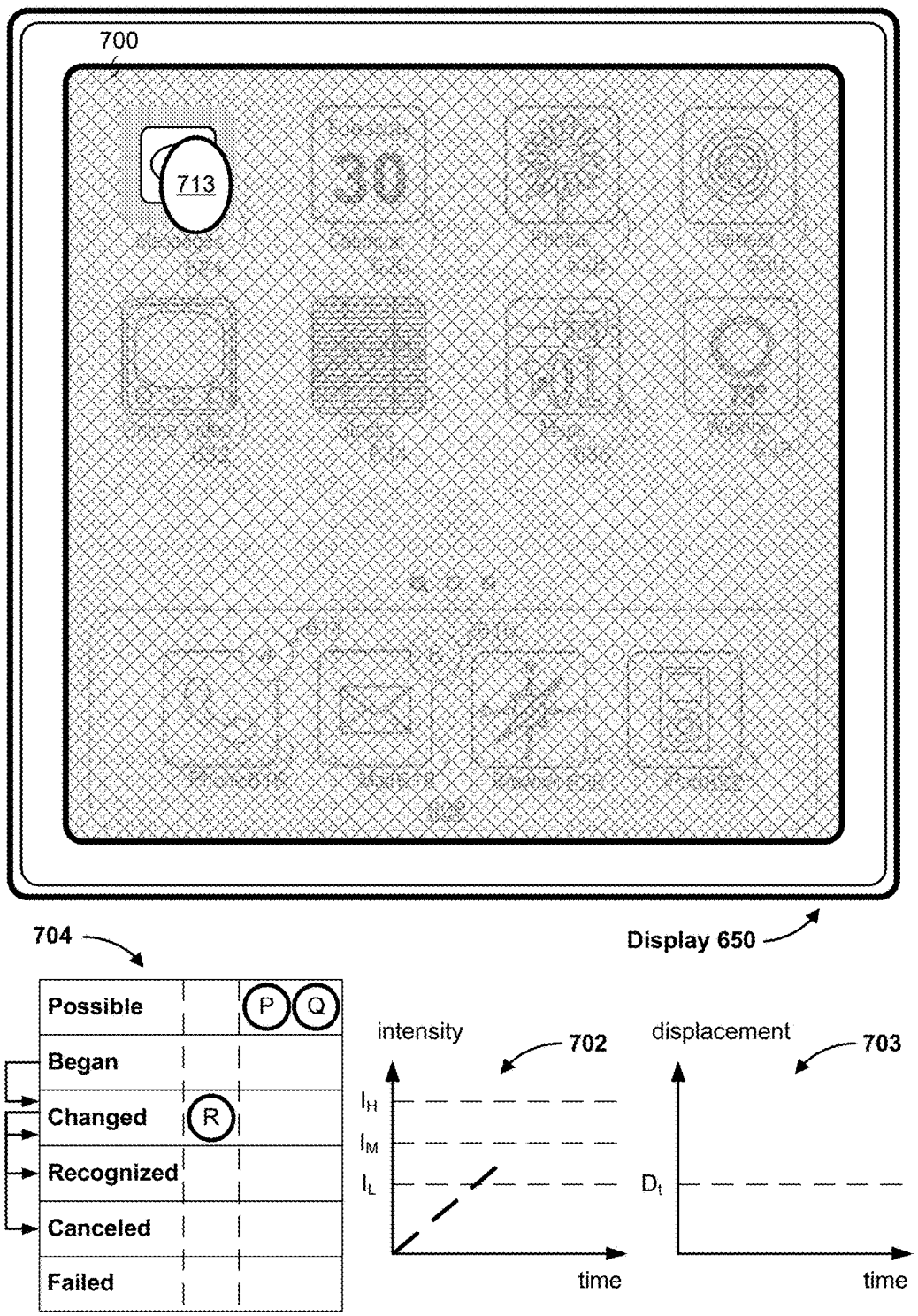

In FIG. 7V, the intensity of the user input has changed from an intensity shown in FIG. 7U (e.g., equal or approximately equal to the intensity threshold $I_L$ in user input intensity graph 702) to an intensity above the intensity threshold $I_L$. The state of the reveal gesture recognizer (R) transitions to the Changed state, and user interface 700, excluding user interface object 624 is blurred more.

Figure 7W:
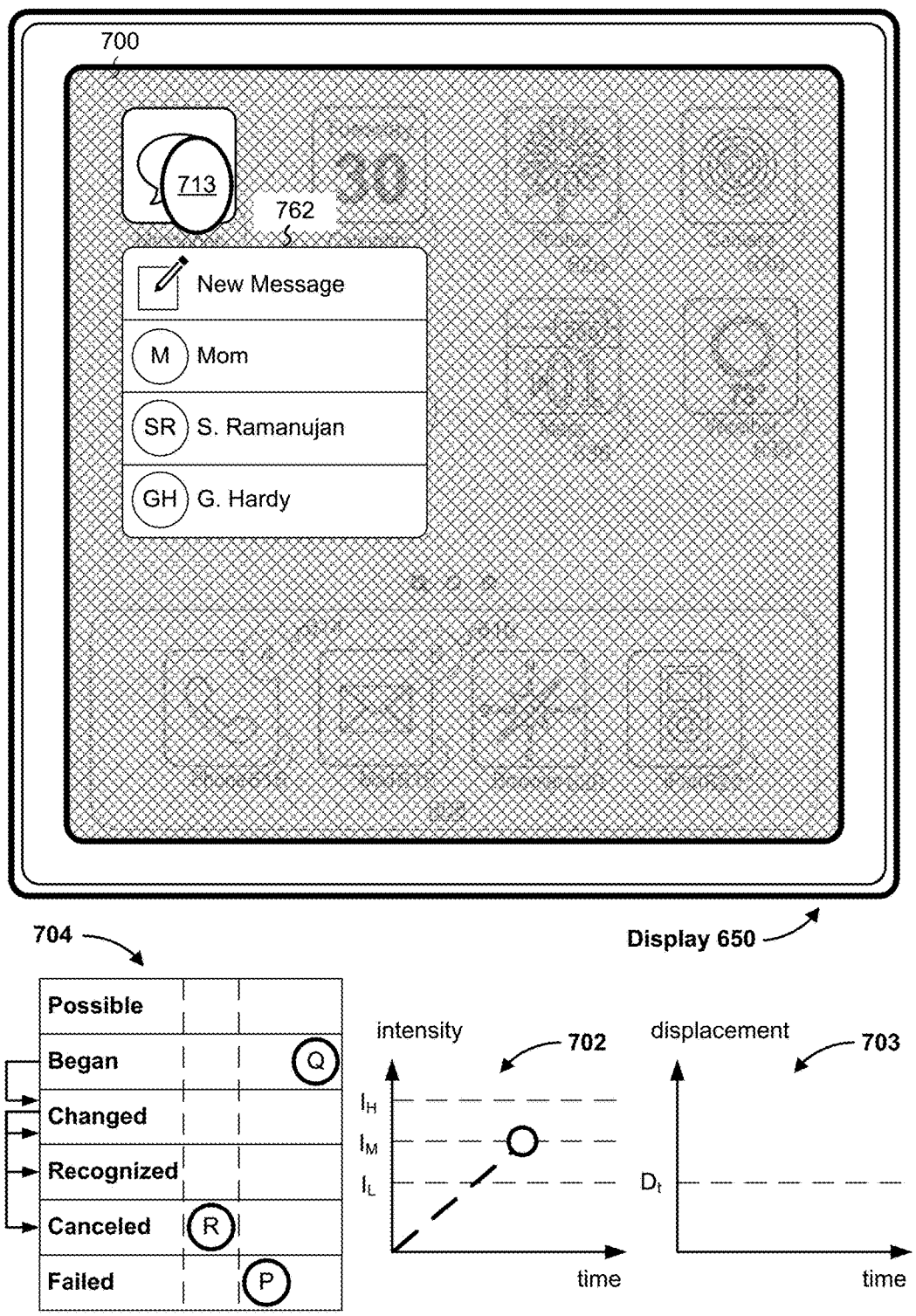

FIG. 7W illustrates that the intensity of the user input has increased to satisfy intensity input criteria for the quick action menu gesture recognizer (Q). In accordance with a determination that the intensity of the user input (e.g., the detected intensity or the adjusted intensity) satisfies intensity input criteria for the quick action menu gesture recognizer (Q), the quick action menu gesture recognizer transitions to the Began state. In some embodiments, the intensity of the user input satisfies intensity input criteria for the quick action menu gesture recognizer (Q) when the intensity of the user input reaches the intensity threshold $I_M$. In some embodiments, the intensity of the user input satisfies intensity input criteria for the quick action menu gesture recognizer (Q) when the intensity of the user input exceeds the intensity threshold $I_M$.

When the quick action menu gesture recognizer transitions to the Began state, quick action menu 762 is displayed, or provided for display.

Figure 7X:
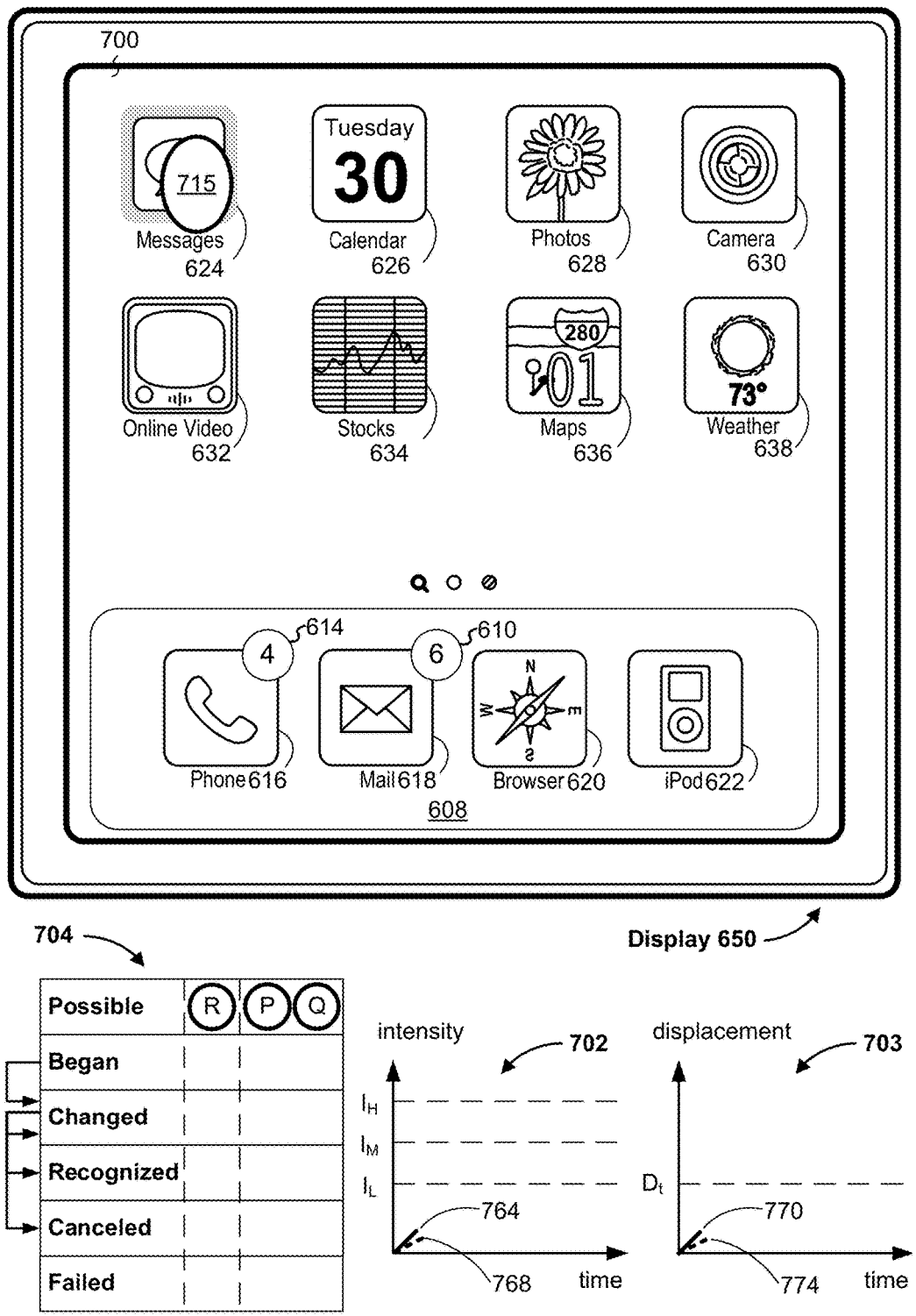

FIGS. 7X-7CC illustrate changes to intensity of a user input and a lateral displacement of the user input in accordance with some embodiments.

FIG. 7X shows the position of focus selector 715 positioned over user interface object 624 or feature in user interface 700. The position of focus selector 715 corresponds to the position of a corresponding user input on a touch-sensitive surface (e.g., touch-sensitive surface 651 or a touch-sensitive surface of touch-screen display 650, FIG. 6B). As shown in user input intensity graph 702 and user input lateral displacement graph 703, the intensity of the user input is initially below the intensity threshold $I_L$, and the lateral displacement of the user input is initially below the lateral displacement threshold $D_t$.

FIG. 7X also illustrates adjustment of both intensity and lateral displacement, in accordance with some embodiments. In FIG. 7X, detected intensity 764 of a user input is adjusted based on detected lateral displacement 770 of the user input and detected lateral displacement 770 of the user input is adjusted based on detected intensity 764 of the user input. In FIG. 7X, adjusted intensity 768 of the user input is determined with respect to detected intensity 764 of the user input and a first adjustment factor (that overlaps adjusted intensity 768 in FIG. 7X). Adjusted lateral displacement 774 of the user input corresponds to detected lateral displacement 770 of the user input reduced by a second adjustment factor (that overlaps adjusted lateral displacement 774 in FIG. 7X).

Figure 7Y:
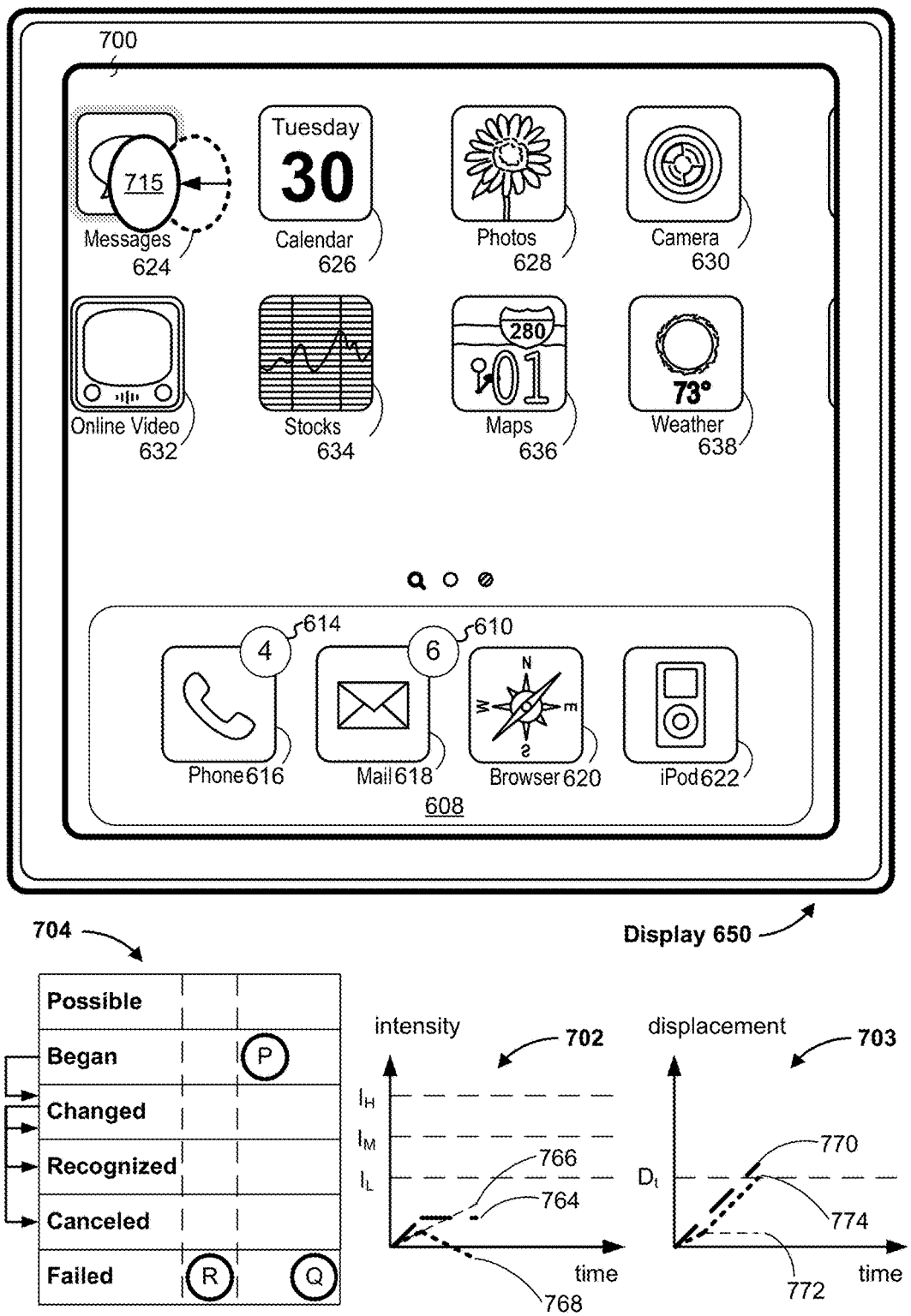

FIG. 7Y illustrates that detected intensity 764 of the user input remains the same and detected lateral displacement 770 of the user input increases. In FIG. 7Y, adjusted intensity 768 of the user input is determined with respect to detected intensity 764 of the user input and first adjustment factor 766 (e.g., adjusted intensity 768 corresponds to detected intensity 764 reduced by first adjustment factor 766). Adjusted lateral displacement 774 of the user input corresponds to detected lateral displacement 770 of the user input reduced by second adjustment factor 772.

FIG. 7Y also illustrates that adjusted lateral displacement 774 satisfies the lateral displacement threshold $D_t$, and adjusted intensity 768 remains below the intensity threshold $I_L$. In accordance with a determination that adjusted lateral displacement 774 satisfies the lateral displacement threshold $D_t$, the pan gesture recognizer (P) transitions to the Began state and user interface 700 is scrolled. In some embodiments, when the pan gesture recognizer (P) transitions to the Began state, the reveal gesture recognizer (R) and the quick action menu gesture recognizer (Q) transition to the Failed state.

Figure 7Z:
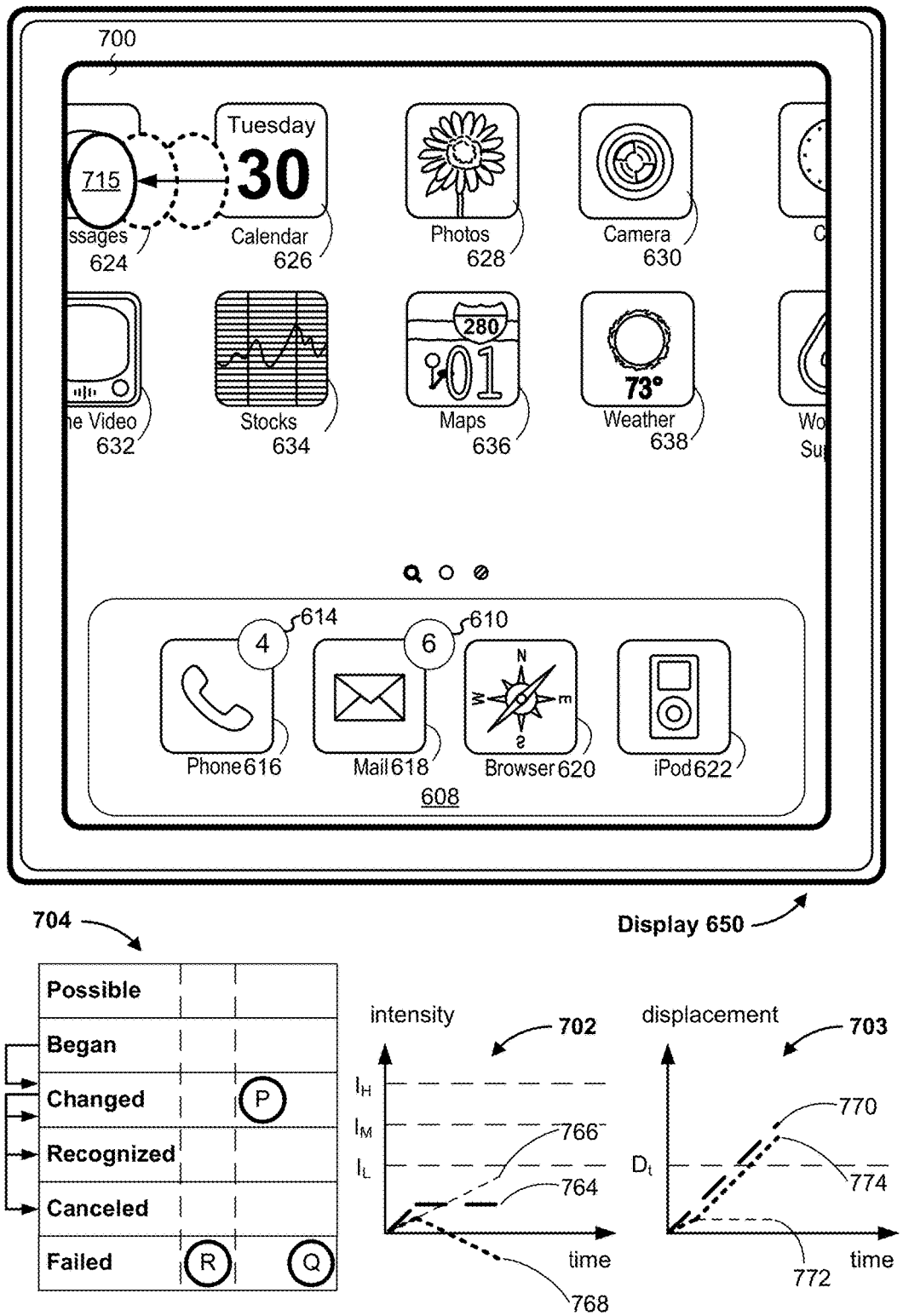
Figure 7A:
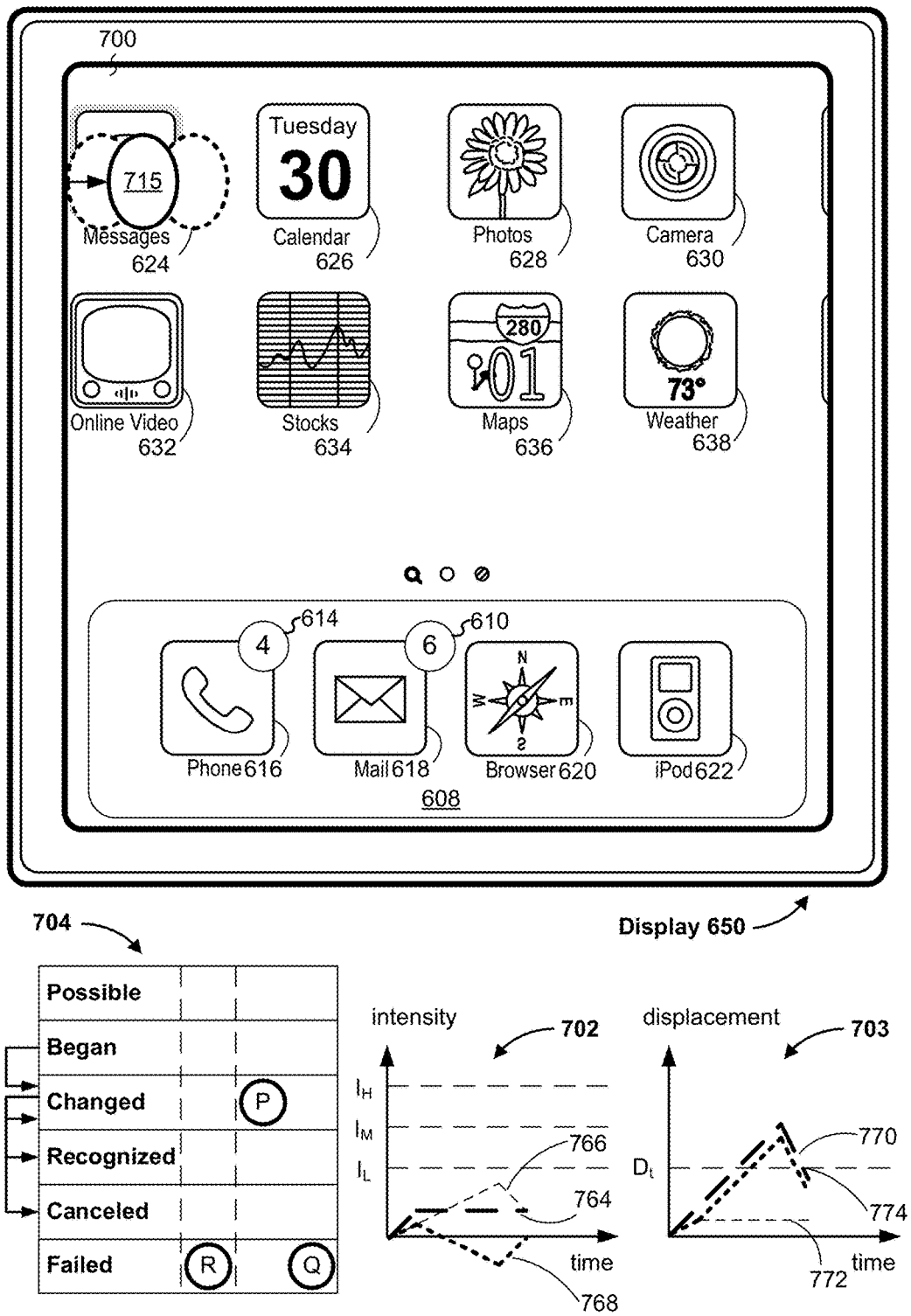
Figure 7B:
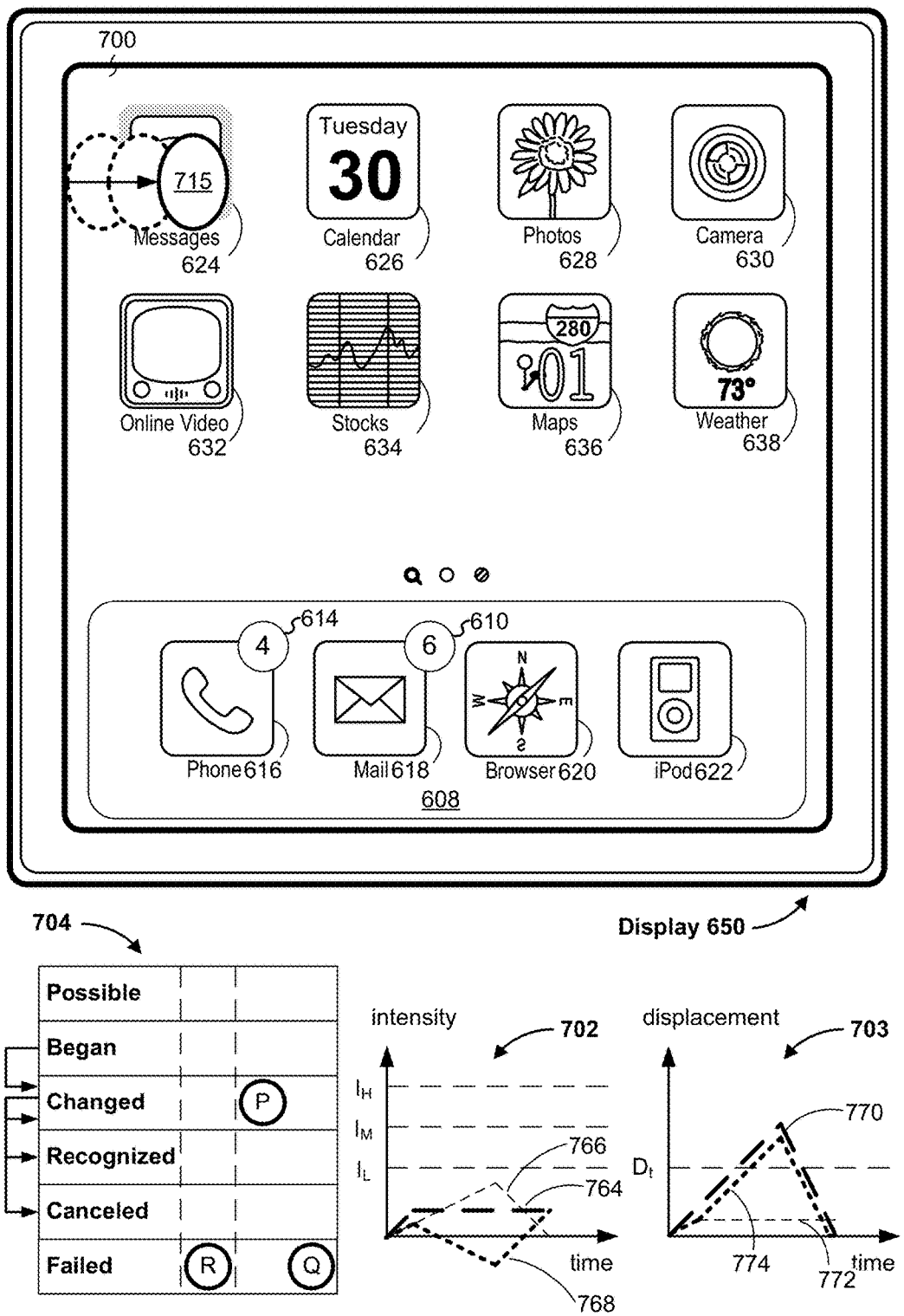
Figure 7C:
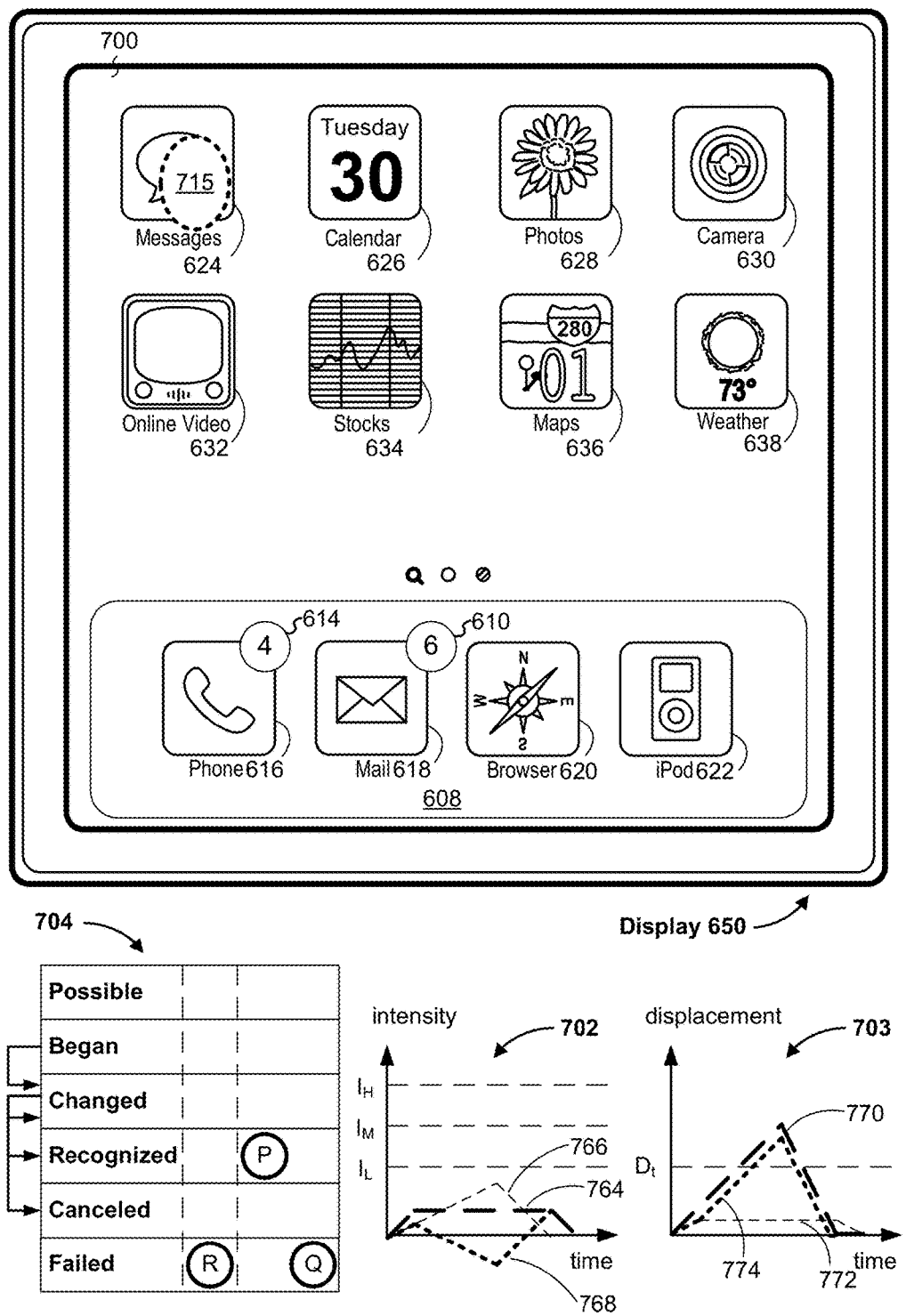
Figure 8A:
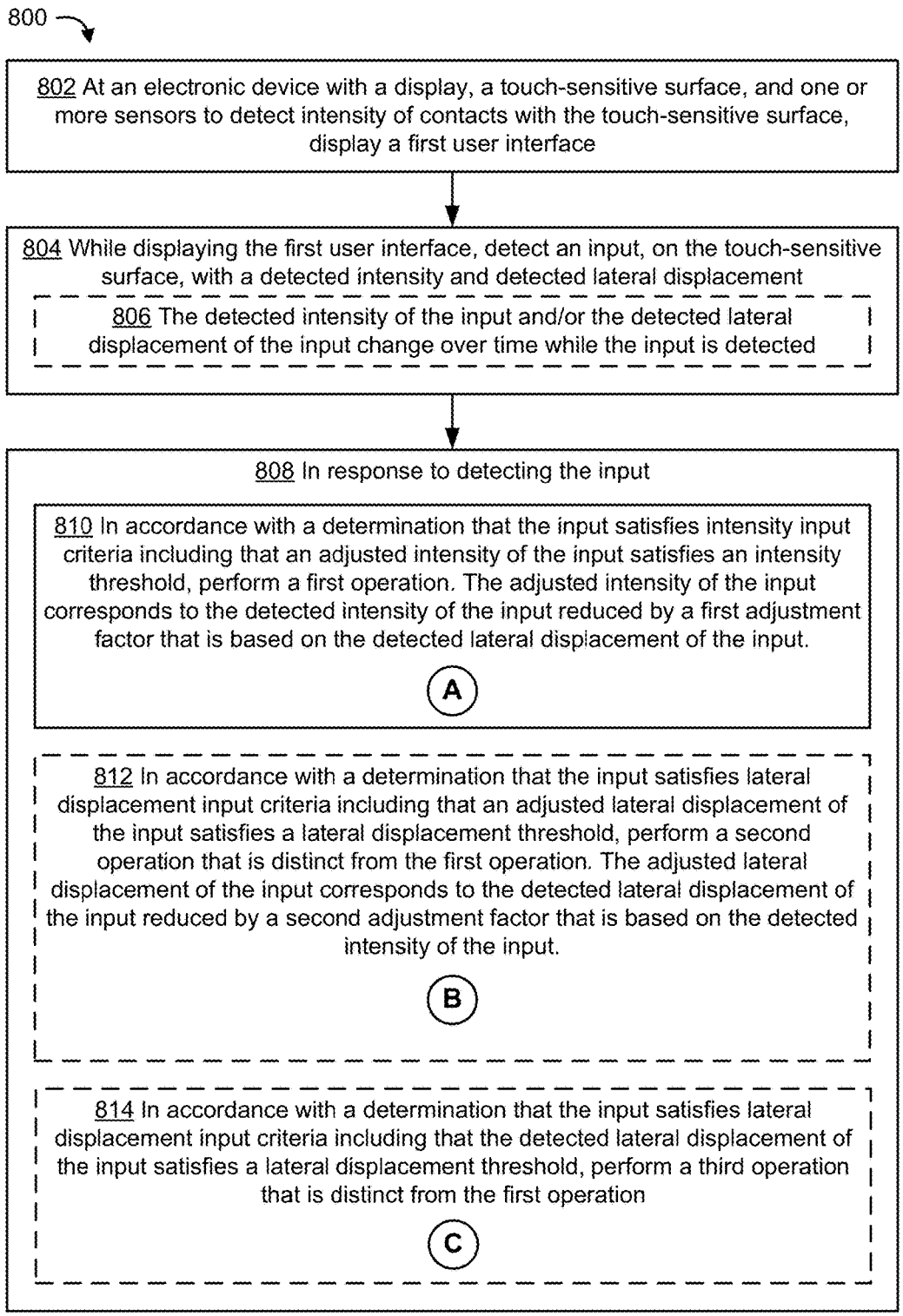

FIG. 7Z illustrates that detected intensity 764 of the user input remains the same and detected lateral displacement 770 of the user input increases further. Adjusted lateral displacement 774 of the user input also increases further, and adjusted intensity 768 decreases (and remains below the intensity threshold $I_L$). In accordance with a determination that adjusted lateral displacement 774 has changed (and still satisfies the lateral displacement threshold $D_t$), the pan gesture recognizer (P) transitions to the Changed state and user interface 700 is scrolled further.

FIG. 7AA illustrates that adjusted lateral displacement 774 decreases. In accordance with a determination that adjusted lateral displacement 774 has changed, user interface 700 scrolls back.

FIG. 7BB illustrates that adjusted lateral displacement 774 decreases further. In accordance with a determination that adjusted lateral displacement 774 has changed, user interface 700 scrolls back to its original position (as shown in FIG. 7X).

FIG. 7CC illustrates that the user input ceases to be detected, and the pan gesture recognizer (P) has transitioned to the Recognized state. Alternatively, in response to the user input ceasing, the pan gesture recognizer (P) resets and transitions to the Possible state (P), or transitions to the Canceled state (C).

FIGS. 8A-8D are flow diagrams illustrating a method of disambiguating a light press input and a pan gesture input in accordance with some embodiments.

Method 800 is performed at an electronic device (e.g., device 300, FIG. 3, or portable multifunction device 100, FIG. 1A) with a display, a touch-sensitive surface, and one or more sensors to detect intensity of contacts with the touch-sensitive surface. In some embodiments, the display is a touch-screen display and the touch-sensitive surface is on or integrated with the display. In some embodiments, the display is separate from the touch-sensitive surface (e.g., the touch-sensitive surface is a trackpad). Some operations in method 800 are, optionally, combined and/or the order of some operations is, optionally, changed.

As described below, method 800 provides an enhanced way to process touch inputs based on one or more adjusted input parameters. Method 800 improves efficiency in processing touch inputs.

The device displays (802) a first user interface (e.g., user interface 706 in FIG. 7A or user interface 700 in FIG. 7S). While displaying the first user interface, the device detects (804) an input, on the touch-sensitive surface, with a detected intensity and detected lateral displacement (e.g., the device detects a user input that corresponds to focus selector 705 in FIG. 7A or the device detects a user input that corresponds to focus selector 713 in FIG. 7T). In some embodiments, the first user interface includes a plurality of user interface objects, the input is detected while a focus selector (e.g., focus selector 705 in FIG. 7A) is over a first user interface object (e.g., user interface object 708 in FIG. 7A) of the plurality of user interface objects. In some embodiments, the first user interface object is associated with at least a first gesture recognizer (e.g., a reveal gesture recognizer) and a second gesture recognizer (e.g., a pan gesture recognizer).

In some embodiments, the detected intensity of the input and/or the detected lateral displacement of the input change (806) over time while the input is detected (e.g., as shown in user input intensity graph 702 and user input lateral displacement graph 703 of FIGS. 7A-7CC).

In response to detecting the input (808), the device performs (810) a first operation (e.g., blurring a user interface, as shown in FIG. 7H or FIG. 7U) in accordance with a determination that the input satisfies intensity input criteria including that an adjusted intensity of the input satisfies an intensity threshold. In some embodiments, in response to detecting the input (808), the device performs (812) a second operation (e.g., scrolling user interface 706 as shown in FIG.

7L or scrolling user interface 700 as shown in FIG. 7Y) that is distinct from the first operation in accordance with a determination that the input satisfies lateral displacement input criteria including that an adjusted lateral displacement of the input satisfies a lateral displacement threshold. Alternatively, in some embodiments, in response to detecting the input, the device performs (814) a third operation (e.g., scrolling user interface 706 as shown in FIG. 7O) that is distinct from the first operation, in accordance with a determination that the input satisfies lateral displacement input criteria including that the detected lateral displacement of the input satisfies a lateral displacement threshold. In some embodiments, the third operation is identical to the second operation. In some embodiments, the third operation is distinct from the second operation.

In some embodiments, the determination that the input satisfies the intensity input criteria for performing the first operation (810) has the following characteristics.

In some embodiments, the first adjustment factor does not exceed (816 in FIG. 8B) a first value (e.g., the first value $I_1$ in FIG. 7I). In some embodiments, the first value is 100 g.

In some embodiments, a magnitude of the first adjustment factor is (818) proportional to a magnitude of the detected lateral displacement of the input (e.g., as shown by adjustment factor 720 in FIG. 7H and adjustment factor 766 in FIG. 7Y). In some embodiments, the magnitude of the first adjustment factor corresponds to the magnitude of the detected lateral displacement of the input multiplied by a first conversion factor. In some embodiments, the first conversion factor is 50 g/mm.

In some embodiments, the first adjustment factor includes (820) a decay factor that decreases over time at a rate that is independent of movement (e.g., any movement or displacement) of the input (e.g., as shown by adjustment factor 730 in FIG. 7J). For example, the first adjustment factor decays over time even when the detected lateral displacement of the input does not change. In some embodiments, the first adjustment factor decays over time with a time constant that is independent of the detected lateral displacement of the input.

In some embodiments, the determination that the input satisfies the lateral displacement input criteria for performing the second operation (812) has the following characteristics.

In some embodiments, the determination that the input satisfies the intensity input criteria is made (822 in FIG. 8C) at a first gesture recognizer (e.g., reveal gesture recognizer (R) shown in FIGS. 7A-7CC) and the determination that the input satisfies the lateral displacement input criteria is made at a second gesture recognizer that is distinct from the first gesture recognizer (e.g., pan gesture recognizer (P) as shown in FIGS. 7A-7CC).

In some embodiments, the adjusted intensity of the input is provided (824) to the first gesture recognizer for the determination that the input satisfies the intensity input criteria and the adjusted lateral displacement of the input is provided to the second gesture recognizer for the determination that the input satisfies the lateral displacement input criteria. For example, instead of using the gesture recognizers in a software application to determine the adjusted intensity and/or the adjusted lateral displacement, contact/motion module 130 (e.g., FIG. 1C) determines the adjusted intensity and/or the adjusted lateral displacement and provides the adjusted intensity of the input to the first gesture recognizer and/or the adjusted lateral displacement of the input to the second gesture recognizer. As noted above, in some embodiments, contact/motion module 130 is application-independent in the sense that contact/motion module 130 is not designed specifically for a particular software application. This reduces the size and the complexity of the software application, improves the speed of processing and disambiguating user inputs, and also facilitates that user inputs are processed in a consistent manner across multiple software applications stored on the electronic device.

In some embodiments, the second adjustment factor does not exceed (826) a second value that is distinct from the first value (e.g., the second value $D_1$ as shown in FIG. 7M). In some embodiments, the second value is 2 mm.

In some embodiments, a magnitude of the second adjustment factor is (828) proportional to a magnitude of the detected intensity of the input (e.g., in FIG. 7K, the magnitude of adjustment factor 734 is proportional to the magnitude of detected intensity 716, and, in FIG. 7Y, the magnitude of adjustment factor 772 is proportional to the magnitude of detected intensity 764). In some embodiments, the magnitude of the second adjustment factor corresponds to the magnitude of the detected intensity of the input multiplied by a second conversion factor. In some embodiments, the second conversion factor is 0.02 mm/g.

In some embodiments, the second adjustment factor includes (830) a decay factor that decreases over time at a rate that is independent of an intensity of the input (e.g., as shown by adjustment factor 756 in FIG. 7N). For example, the second adjustment factor decays over time even when the detected intensity of the input does not change. In some embodiments, the second adjustment factor decays over time with a time constant that is independent of the detected intensity of the input (e.g., the time constant does not change based on a subsequent change to the lateral displacement of the input).

In some embodiments, the determination that the input satisfies the lateral displacement input criteria for performing the third operation (814) has the following characteristics.

In some embodiments, the determination that the input satisfies the intensity input criteria is made (832, FIG. 8D) at a first gesture recognizer (e.g., reveal gesture recognizer (R) as shown in FIGS. 7A-7CC) and the determination that the input satisfies the lateral displacement input criteria is made at a second gesture recognizer that is distinct from the first gesture recognizer (e.g., pan gesture recognizer (P) as shown in FIGS. 7A-7CC).

In some embodiments, the adjusted intensity of the input is provided (834) to the first gesture recognizer for the determination that the input satisfies the intensity input criteria and the detected lateral displacement of the input is provided to the second gesture recognizer for the determination that the input satisfies the lateral displacement input criteria. For example, as explained above with respect to operation 824, in some embodiments contact/motion module 130 (e.g., FIG. 1C) determines the adjusted intensity and/or the adjusted lateral displacement and provides the adjusted intensity of the input to the first gesture recognizer and/or the adjusted lateral displacement of the input to the second gesture recognizer.

It should be understood that the particular order in which the operations in FIGS. 8A-8D have been described is merely exemplary and is not intended to indicate that the described order is the only order in which the operations could be performed. One of ordinary skill in the art would recognize various ways to reorder the operations described herein. For example, in some embodiments, a method performed at an electronic device with a touch-sensitive surface, a display, and one or more sensors to detect intensity of contacts with the touch-sensitive surface includes displaying a first user interface; while displaying the first user interface, detecting an input, on the touch-sensitive surface, with a detected intensity and detected lateral displacement; and, in response to detecting the input, in accordance with a determination that the input satisfies lateral displacement input criteria including that an adjusted lateral displacement of the input satisfies a lateral displacement threshold, performing a fourth operation. The adjusted lateral displacement of the input corresponds to the detected lateral displacement of the input reduced by an adjustment factor (e.g., the second adjustment factor) that is based on the detected intensity of the input. For brevity, these details are not repeated herein.

Figure 9:
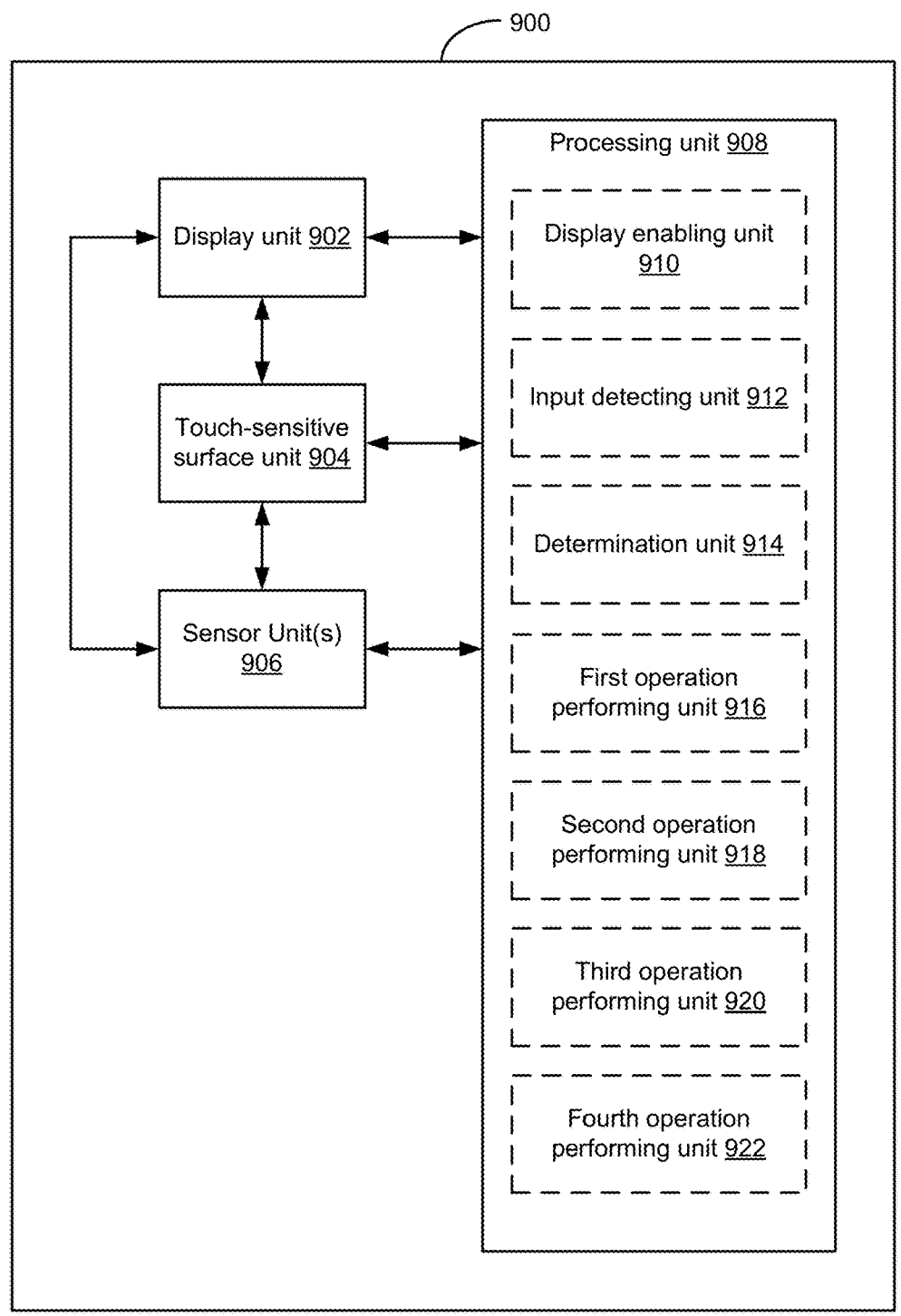
FIG. 9 is a functional block diagram of an electronic device in accordance with some embodiments.

In accordance with some embodiments, FIG. 9 shows a functional block diagram of electronic device 900 configured in accordance with the principles of the various described embodiments. The functional blocks of device 900 are, optionally, implemented by hardware, software, firmware, or a combination thereof to carry out the principles of the various described embodiments. It is understood by persons of skill in the art that the functional blocks described in FIG. 9 are, optionally, combined or separated into sub-blocks to implement the principles of the various described embodiments. Therefore, the description herein optionally supports any possible combination or separation or further definition of the functional blocks described herein.

As shown in FIG. 9, electronic device 900 includes display unit 902 configured to display one or more user interfaces; touch-sensitive surface unit 904 configured to receive user inputs; one or more sensor units 906 configured to detect intensity of contacts with touch-sensitive surface unit 904; and processing unit 908 coupled to display unit 902, touch-sensitive surface unit 904 and one or more sensor units 906. In some embodiments, processing unit 908 includes display enabling unit 910, input detecting unit 912, determination unit 914, first operation performing unit 916, second operation performing unit 918, third operation performing unit 920, and fourth operation performing unit 922.

In some embodiments, processing unit 908 is configured to enable display of a first user interface (e.g., with display enabling unit 910); detect an input, on touch-sensitive surface unit 904, with a detected intensity and detected lateral displacement (e.g., with input detecting unit 912, touch-sensitive surface unit 904, and/or sensor unit 906) while the first user interface is displayed, and in response to detecting the input, perform a first operation (e.g., with first operation performing unit 916) in accordance with a determination (e.g., by determination unit 914) that the input satisfies intensity input criteria including that an adjusted intensity of the input satisfies an intensity threshold, wherein the adjusted intensity of the input corresponds to the detected intensity of the input reduced by a first adjustment factor that is based on the detected lateral displacement of the input. In some embodiments, electronic device 900 is configured to perform any of the methods described above with reference to FIGS. 8A-8D.

In some embodiments, the detected intensity of the input and/or the detected lateral displacement of the input change over time while the input is detected.

In some embodiments, the first adjustment factor does not exceed a first value.

In some embodiments, a magnitude of the first adjustment factor is proportional to a magnitude of the detected lateral displacement of the input.

In some embodiments, the first adjustment factor includes a decay factor that decreases over time at a rate that is independent of a movement of the input.

In some embodiments, processing unit 908 is further configured to, in response to detecting the input, perform a second operation that is distinct from the first operation (e.g., with second operation performing unit 916) in accordance with a determination (e.g., by determination unit 914) that the input satisfies lateral displacement input criteria including that an adjusted lateral displacement of the input satisfies a lateral displacement threshold, wherein the adjusted lateral displacement of the input corresponds to the detected lateral displacement of the input reduced by a second adjustment factor that is based on the detected intensity of the input.

In some embodiments, the determination that the input satisfies the intensity input criteria is made at a first gesture recognizer and the determination that the input satisfies the lateral displacement input criteria is made at a second gesture recognizer that is distinct from the first gesture recognizer.

In some embodiments, the adjusted intensity of the input is provided to the first gesture recognizer for the determination that the input satisfies the intensity input criteria and the adjusted lateral displacement of the input is provided to the second gesture recognizer for the determination that the input satisfies the lateral displacement input criteria.

In some embodiments, the second adjustment factor does not exceed a second value that is distinct from the first value.

In some embodiments, a magnitude of the second adjustment factor is proportional to a magnitude of the detected intensity of the input.

In some embodiments, the second adjustment factor includes a decay factor that decreases over time at a rate that is independent of an intensity of the input.

In some embodiments, processing unit 908 is further configured to, in response to detecting the input, perform a third operation that is distinct from the first operation (e.g., with third operation performing unit 920) in accordance with a determination (e.g., by determination unit 914) that the input satisfies lateral displacement input criteria including that the detected lateral displacement of the input satisfies a lateral displacement threshold.

In some embodiments, the determination that the input satisfies the intensity input criteria is made at a first gesture recognizer and the determination that the input satisfies the lateral displacement input criteria is made at a second gesture recognizer that is distinct from the first gesture recognizer.

In some embodiments, the adjusted intensity of the input is provided to the first gesture recognizer for the determination that the input satisfies the intensity input criteria and the detected lateral displacement of the input is provided to the second gesture recognizer for the determination that the input satisfies the lateral displacement input criteria.

In accordance with some embodiments, processing unit 908 is configured to enable display of a first user interface (e.g., with display enabling unit 910) and detect an input, on the touch-sensitive surface unit, with a detected intensity and detected lateral displacement (e.g., with input detecting unit 912, touch-sensitive surface unit 904, and/or sensor unit 906) while the first user interface is displayed, and in response to detecting the input, perform a fourth operation (e.g., with fourth operation performing unit 922) in accordance with a determination (e.g., by determination unit 914) that the input satisfies lateral displacement input criteria including that an adjusted lateral displacement of the input satisfies a lateral displacement threshold, wherein the adjusted lateral displacement of the input corresponds to the detected lateral displacement of the input reduced by an adjustment factor that is based on the detected intensity of the input. In some embodiments, electronic device 900 is configured to perform any of the methods described above with reference to FIGS. 8A-8D.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 8A-8D are, optionally, implemented by components depicted in FIGS. 1A-1B. For example, input detection operation 804, first operation 810, second operation 812, and third operation 814 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method, comprising:
    at an electronic device with a display, a touch-sensitive surface, and one or more sensors to detect intensity of contacts with the touch-sensitive surface:
    displaying a first user interface;
    while displaying the first user interface, detecting an input comprising a contact on the touch-sensitive surface, including detecting an intensity of the contact on the touch-sensitive surface and detecting lateral displacement of the contact on the touch-sensitive surface, wherein the detected lateral displacement of the contact is based on movement of the contact across the touch-sensitive surface from an initial contact position on the touch-sensitive surface to a subsequent contact position on the touch-sensitive surface that is laterally displaced from the initial contact position; and
    in response to detecting the input:
        in accordance with a determination that the input satisfies intensity input criteria including that an adjusted intensity of the input satisfies an intensity threshold, performing a first operation, wherein the adjusted intensity of the input corresponds to the detected intensity of the contact reduced by a first adjustment factor that is based on the detected lateral displacement of the contact.

2. The method of claim 1, wherein the detected intensity of the contact and/or the detected lateral displacement of the contact change over time while the input is detected.

3. The method of claim 1, wherein the first adjustment factor does not exceed a first value.

4. The method of claim 1, wherein a magnitude of the first adjustment factor is proportional to a magnitude of the detected lateral displacement of the contact.

5. The method of claim 1, wherein the first adjustment factor includes a decay factor that decreases over time at a rate that is independent of the movement of the contact.

6. The method of claim 1, including:
    in response to detecting the input:
        in accordance with a determination that the input satisfies lateral displacement input criteria including that an adjusted lateral displacement of the input satisfies a lateral displacement threshold, performing a second operation that is distinct from the first operation, wherein the adjusted lateral displacement of the input corresponds to the detected lateral displacement of the contact reduced by a second adjustment factor that is based on the detected intensity of the contact.

7. The method of claim 6, wherein the determination that the input satisfies the intensity input criteria is made at a first gesture recognizer and the determination that the input satisfies the lateral displacement input criteria is made at a second gesture recognizer that is distinct from the first gesture recognizer.

8. The method of claim 7, wherein the adjusted intensity of the input is provided to the first gesture recognizer for the determination that the input satisfies the intensity input criteria and the adjusted lateral displacement of the input is provided to the second gesture recognizer for the determination that the input satisfies the lateral displacement input criteria.

9. The method of claim 6, wherein the first adjustment factor does not exceed a first value and the second adjustment factor does not exceed a second value that is distinct from the first value.

10. The method of claim 6, wherein a magnitude of the second adjustment factor is proportional to a magnitude of the detected intensity of the contact.

11. The method of claim 6, wherein the second adjustment factor includes a decay factor that decreases over time at a rate that is independent of an intensity of the contact.

12. The method of claim 1, including:
    in response to detecting the input:
        in accordance with a determination that the input satisfies lateral displacement input criteria including that the detected lateral displacement of the contact satisfies a lateral displacement threshold, performing a third operation that is distinct from the first operation.

13. The method of claim 12, wherein the determination that the input satisfies the intensity input criteria is made at a first gesture recognizer and the determination that the input satisfies the lateral displacement input criteria is made at a second gesture recognizer that is distinct from the first gesture recognizer.

14. The method of claim 13, wherein the adjusted intensity of the input is provided to the first gesture recognizer for the determination that the input satisfies the intensity input criteria and the detected lateral displacement of the contact is provided to the second gesture recognizer for the determination that the input satisfies the lateral displacement input criteria.

15. An electronic device, comprising:
a display;
a touch-sensitive surface;
one or more sensors to detect intensity of contacts with the touch-sensitive surface;
one or more processors; and
memory storing one or more programs configured to be executed by the one or more processors, the one or more programs including instructions for:
displaying a first user interface;
while displaying the first user interface, detecting an input comprising a contact on the touch-sensitive surface, including detecting an intensity of the contact on the touch-sensitive surface and detecting lateral displacement of the contact on the touch-sensitive surface, wherein the detected lateral displacement of the contact is based on movement of the contact across the touch-sensitive surface from an initial contact position on the touch-sensitive surface to a subsequent contact position on the touch-sensitive surface that is laterally displaced from the initial contact position; and,
in response to detecting the input:
in accordance with a determination that the input satisfies intensity input criteria including that an adjusted intensity of the input satisfies an intensity threshold, performing a first operation, wherein the adjusted intensity of the input corresponds to the detected intensity of the contact reduced by a first adjustment factor that is based on the detected lateral displacement of the contact.

16. The electronic device of claim 15, wherein the detected intensity of the contact and/or the detected lateral displacement of the contact change over time while the input is detected.

17. The electronic device of claim 15, wherein the first adjustment factor does not exceed a first value.

18. The electronic device of claim 15, wherein a magnitude of the first adjustment factor is proportional to a magnitude of the detected lateral displacement of the contact.

19. The electronic device of claim 15, wherein the first adjustment factor includes a decay factor that decreases over time at a rate that is independent of the movement of the contact.

20. The electronic device of claim 15, wherein the one or more programs include instructions for:
in response to detecting the input:
in accordance with a determination that the input satisfies lateral displacement input criteria including that an adjusted lateral displacement of the input satisfies a lateral displacement threshold, performing a second operation that is distinct from the first operation, wherein the adjusted lateral displacement of the input corresponds to the detected lateral displacement of the contact reduced by a second adjustment factor that is based on the detected intensity of the contact.

21. The electronic device of claim 20, wherein the determination that the input satisfies the intensity input criteria is made at a first gesture recognizer and the determination that the input satisfies the lateral displacement input criteria is made at a second gesture recognizer that is distinct from the first gesture recognizer.

22. The electronic device of claim 21, wherein the adjusted intensity of the input is provided to the first gesture recognizer for the determination that the input satisfies the intensity input criteria and the adjusted lateral displacement of the input is provided to the second gesture recognizer for the determination that the input satisfies the lateral displacement input criteria.

23. The electronic device of claim 20, wherein the first adjustment factor does not exceed a first value and the second adjustment factor does not exceed a second value that is distinct from the first value.

24. The electronic device of claim 20, wherein a magnitude of the second adjustment factor is proportional to a magnitude of the detected intensity of the contact.

25. The electronic device of claim 20, wherein the second adjustment factor includes a decay factor that decreases over time at a rate that is independent of an intensity of the contact.

26. The electronic device of claim 15, wherein the one or more programs include instructions for:
in response to detecting the input:
in accordance with a determination that the input satisfies lateral displacement input criteria including that the detected lateral displacement of the contact satisfies a lateral displacement threshold, performing a third operation that is distinct from the first operation.

27. The electronic device of claim 26, wherein the determination that the input satisfies the intensity input criteria is made at a first gesture recognizer and the determination that the input satisfies the lateral displacement input criteria is made at a second gesture recognizer that is distinct from the first gesture recognizer.

28. The electronic device of claim 27, wherein the adjusted intensity of the input is provided to the first gesture recognizer for the determination that the input satisfies the intensity input criteria and the detected lateral displacement of the contact is provided to the second gesture recognizer for the determination that the input satisfies the lateral displacement input criteria.

29. A non-transitory computer readable storage medium storing one or more programs, the one or more programs comprising instructions, which, when executed by an electronic device with a display, a touch-sensitive surface, and one or more sensors to detect intensity of contacts with the touch-sensitive surface, cause the device to:
display a first user interface;
while displaying the first user interface, detect an input comprising a contact on the touch-sensitive surface, including detecting an intensity of the contact on the touch-sensitive surface and detecting lateral displacement of the contact on the touch-sensitive surface, wherein the detected lateral displacement of the contact is based on movement of the contact across the touch-sensitive surface from an initial contact position on the touch-sensitive surface to a subsequent contact position on the touch-sensitive surface that is laterally displaced from the initial contact position; and, in response to detecting the input:
  in accordance with a determination that the input satisfies intensity input criteria including that an adjusted intensity of the input satisfies an intensity threshold, perform a first operation, wherein the adjusted intensity of the input corresponds to the detected intensity of the contact reduced by a first adjustment factor that is based on the detected lateral displacement of the contact.

30. The non-transitory computer readable storage medium of claim 29, wherein the detected intensity of the contact and/or the detected lateral displacement of the contact change over time while the input is detected.

31. The non-transitory computer readable storage medium of claim 29, wherein the first adjustment factor does not exceed a first value.

32. The non-transitory computer readable storage medium of claim 29, wherein a magnitude of the first adjustment factor is proportional to a magnitude of the detected lateral displacement of the contact.

33. The non-transitory computer readable storage medium of claim 29, wherein the first adjustment factor includes a decay factor that decreases over time at a rate that is independent of the movement of the contact.

34. The non-transitory computer readable storage medium of claim 29, wherein the one or more programs include instructions, which, when executed by the electronic device, cause the device:
  in response to detecting the input:
    in accordance with a determination that the input satisfies lateral displacement input criteria including that an adjusted lateral displacement of the input satisfies a lateral displacement threshold, to perform a second operation that is distinct from the first operation, wherein the adjusted lateral displacement of the input corresponds to the detected lateral displacement of the contact reduced by a second adjustment factor that is based on the detected intensity of the contact.

35. The non-transitory computer readable storage medium of claim 34, wherein the determination that the input satisfies the intensity input criteria is made at a first gesture recognizer and the determination that the input satisfies the lateral displacement input criteria is made at a second gesture recognizer that is distinct from the first gesture recognizer.

36. The non-transitory computer readable storage medium of claim 35, wherein the adjusted intensity of the input is provided to the first gesture recognizer for the determination that the input satisfies the intensity input criteria and the adjusted lateral displacement of the input is provided to the second gesture recognizer for the determination that the input satisfies the lateral displacement input criteria.

37. The non-transitory computer readable storage medium of claim 34, wherein the first adjustment factor does not exceed a first value and the second adjustment factor does not exceed a second value that is distinct from the first value.

38. The non-transitory computer readable storage medium of claim 34, wherein a magnitude of the second adjustment factor is proportional to a magnitude of the detected intensity of the contact.

39. The non-transitory computer readable storage medium of claim 34, wherein the second adjustment factor includes a decay factor that decreases over time at a rate that is independent of an intensity of the contact.

40. The non-transitory computer readable storage medium of claim 29, wherein the one or more programs include instructions, which, when executed by the electronic device, cause the device:
  in response to detecting the input:
    in accordance with a determination that the input satisfies lateral displacement input criteria including that the detected lateral displacement of the contact satisfies a lateral displacement threshold, to perform a third operation that is distinct from the first operation.

41. The non-transitory computer readable storage medium of claim 40, wherein the determination that the input satisfies the intensity input criteria is made at a first gesture recognizer and the determination that the input satisfies the lateral displacement input criteria is made at a second gesture recognizer that is distinct from the first gesture recognizer.

42. The non-transitory computer readable storage medium of claim 41, wherein the adjusted intensity of the input is provided to the first gesture recognizer for the determination that the input satisfies the intensity input criteria and the detected lateral displacement of the contact is provided to the second gesture recognizer for the determination that the input satisfies the lateral displacement input criteria.

* * * * *